(12) United States Patent  
Niki

(10) Patent No.: US 8,688,632 B2  
(45) Date of Patent: Apr. 1, 2014

(54) INFORMATION PROCESSING SYSTEM AND METHOD OF CONTROLLING THE SAME

(75) Inventor: Yosuke Niki, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 311 days.

(21) Appl. No.: 13/321,990

(22) PCT Filed: Nov. 9, 2011

(86) PCT No.: PCT/JP2011/006256
§ 371 (c)(1),
(2), (4) Date: Nov. 22, 2011

(87) PCT Pub. No.: WO2013/069055
PCT Pub. Date: May 16, 2013

(65) Prior Publication Data
US 2013/0117223 A1    May 9, 2013

(51) Int. Cl.
*G06F 7/00*    (2006.01)
(52) U.S. Cl.
USPC .......................................... 707/610
(58) Field of Classification Search
None
See application file for complete search history.

(56) References Cited

U.S. PATENT DOCUMENTS

| | | |
|---|---|---|
| 6,269,382 B1 | 7/2001 | Cabrera et al. |
| 2004/0267830 A1 | 12/2004 | Wong et al. |
| 2009/0125522 A1 | 5/2009 | Kodama et al. |
| 2009/0300079 A1 | 12/2009 | Shitomi |
| 2011/0167045 A1 | 7/2011 | Okamoto |
| 2011/0246416 A1* | 10/2011 | Prahlad et al. ................ 707/610 |
| 2011/0246430 A1 | 10/2011 | Prahlad et al. |

FOREIGN PATENT DOCUMENTS

WO    2008/046670 A1    4/2008

* cited by examiner

*Primary Examiner* — Usmaan Saeed
*Assistant Examiner* — Michele Choi
(74) *Attorney, Agent, or Firm* — Volpe and Koenig, P.C.

(57) ABSTRACT

In an information processing system 1 including first to third storage systems 50a to 50c, the first storage system 50a performs stubbing by managing entity data of a file in the second storage apparatus 10b, migration by replicating the data of the file to the second storage apparatus 10b, and recall by writing the entity data of the file from the second storage apparatus 10b back to the first storage apparatus 10a. Moreover, the second storage system 50b performs remote copy by replicating metadata of the migrated file from the first storage apparatus 10a to the third storage apparatus 10c at timing of the migration (synchronously), and replicating the entity data of the file to the third storage apparatus 10c at timing independent of the timing of the migration (asynchronously).

19 Claims, 37 Drawing Sheets

Fig. 12

BASIC METADATA STRUCTURE

| FILE NAME 1211 | OWNER 1212 | ACCESS RIGHT 1213 | UPDATE DATE/TIME 1214 | SIZE 1215 | HASH 1216 | DATA STORAGE ADDRESS 1217 |
|---|---|---|---|---|---|---|
| aaa | user01 | wrx----- | 20xx/xx/xx | 128 | ... | ... |
| ... | ... | ... | ... | ... | ... | ... |

Fig. 14

METADATA STRUCTURE SPECIFIC TO SECOND AND THIRD STORAGE SYSTEMS

| 1411 | 1412 | 1413 | 1414 | 1415 | 1416 |
|---|---|---|---|---|---|
| SITE-TO-SITE REPLICATION REQUIRING FLAG | DIFFERENCE INFORMATION | FILE SIGNIFICANCE | STUBBING PRIORITY | NUMBER OF DATA RETAINED IN SYSTEM | RETAINING SYSTEM |
| ON or OFF | PRESENT/NOT PRESENT | 1 TO N | 0 TO N | 0 OR MORE | X,Y,Z… |
| … | … | … | … | NULL | … |

Fig. 29

STUBBING DETERMINATION TABLE (FILE SIZE) 324

| STUBBING-EXEMPT SIZE | XXX | 3241 |
|---|---|---|
| FORCED STUBBING TARGET SIZE | YYY | 3242 |
| READJUSTMENT RANGE OF STUBBING-EXEMPT FILE SIZE | XYZ | 3243 |

Fig. 30

STUBBING DETERMINATION TABLE (ACCESS FREQUENCY) 325

| MEASUREMENT PERIOD | XX month | 3251 |
|---|---|---|
| FORCED STUBBING TARGET THRESHOLD | 1.0 | 3252 |
| STUBBING-EXEMPT THRESHOLD | 3.0 | 3253 |

STUBBING EXECUTION TARGET LIST 362

| FILE NAME (3621) | PATH (3622) | STUBBING PRIORITY (3623) | SIZE (3624) |
|---|---|---|---|
| aaa | /mnt/aaa/ | N | XXX |
| bbb | /mnt/bbb/ | N+1 | YYY |
| : | : | N-1 | : |
| : | : | 1 | : |
| : | : | 0 | : |
| : | : | : | : |

STUBBING PROCESS S3400
FIRST STORAGE SYSTEM 50a

MIGRATION DESTINATION WEIGHT SETTING TABLE 327

| MIGRATION DESTINATION (SECOND STORAGE SYSTEM) | WEIGHT COEFFICIENT | REMARKS |
|---|---|---|
| STORAGE SYSTEM 1 | 2 | REDUNDANT |
| STORAGE SYSTEM 2 | 3 | HIGH PERFORMANCE |
| STORAGE SYSTEM 3 | 1 | INEXPENSIVE |
| : | : | : |

Fig. 39

METADATA STRUCTURE

| FILE NAME (1211) | ... | NUMBER OF DATA RETAINED IN SYSTEM (1415) | RETAINING SYSTEM (1416) |
|---|---|---|---|
| FILE A | ... | 3 | 1, 3, 4 |
| FILE B | ... | 3 | 1, 2, 3 |
| FILE C | ... | 4 | 1, 2, 3, 4 |
| : | ... | : | : |
| FILE F | ... | 2 | 1, 4 |
| : | ... | : | : |
| FILE I | ... | 1 | 1 |
| FILE J | ... | 3 | 1, 2, 3 |
| : | ... | : | : |

INFORMATION PROCESSING SYSTEM AND METHOD OF CONTROLLING THE SAME

TECHNICAL FIELD

The present invention relates to an information processing system and a method of controlling an information processing system.

BACKGROUND ART

PTL 1 discloses, in a case an information apparatus creates a file in a storage apparatus for the purpose of protecting privacy information of a user without hampering the convenience when the user accesses a file stored in a storage apparatus from the information apparatus. The information apparatus separates the privacy information specifying the user who creates the file from information required to create the file in the storage apparatus, and creates the file in the storage apparatus using information converted from the separated privacy information.

PTL 2 discloses a tiered storage system including a first site having a first storage system in an upper tier and a second storage system in a lower tier, and a second site having a third storage system in an upper tier and a fourth storage system in a lower tier. In the tiered storage system, when a first file in the first storage system is migrated to the second storage system, a second file showing a storage location of the first file in the second storage system is generated in the first storage system, and is stored at the position of the first file. Moreover, when a replica of the second file is copied to the third storage system and a replica of the first file is copied to the fourth storage system, information for linking the replica of the second file in the third storage system to the replica of the first file in the fourth storage system is transmitted to the second storage site.

CITATION LIST

Patent Literature

PTL 1: Japanese Patent Application Publication No. 2009-110401
PTL 2: Japanese Patent Application Publication No. 2009-289252

SUMMARY OF INVENTION

Technical Problem

There is an information processing system having a configuration in which metadata of a file is left in an upper layer storage system and the entity data of the file is managed in a lower layer storage system for the purpose of securing a storage area of the upper storage system and other purposes. Then, the entity data is written back to the upper layer storage system upon receipt of an I/O request requiring the entity data. In such an information processing system, it is important to secure the reliability and serviceability of the file data managed in the information processing system in consideration of a file management form in the lower layer storage system, a failure that could occur in the lower layer storage system, and the like.

The present invention has been made in consideration of the foregoing problems. It is a main object of the present invention to provide an information processing system and a method for controlling an information processing system, which can secure reliability and serviceability of file data.

Solution to Problem

An aspect of the present invention to attain the above object is an information processing system including a first storage system that performs processing for a file stored in a first storage apparatus in response to an I/O request received from a client apparatus, a second storage system communicatively coupled to the first storage system and performs processing for a file stored in a second storage apparatus, and a third storage system communicatively coupled to the second storage system and performs processing for a file stored in a third storage apparatus, wherein the first storage system performs stubbing by storing metadata of data in a file, stored in the first storage apparatus, into the first storage apparatus and storing entity data of the data in the file into the second storage apparatus, and deleting the entity data from the first storage apparatus to manage the file, migration by replicating the data of the file stored in the first storage apparatus into the second storage apparatus to perform the stubbing, and recall by writing the entity data from the second storage apparatus back to the first storage apparatus when receiving the I/O request requiring the entity data from the client apparatus, and the second storage system performs remote copy by replicating the metadata in the file replicated from the first storage apparatus by the migration to the third storage apparatus at timing of the migration, and replicating the entity data in the file replicated from the first storage apparatus by the migration to the third storage apparatus at a timing independent of the timing of the migration.

Other problems disclosed in the present application and solutions thereto will become apparent from the following embodiments of the invention and the drawings.

Advantageous Effects of Invention

According to the present invention, reliability and serviceability of the file data can be secured in the information processing system.

BRIEF DESCRIPTION OF DRAWINGS

FIG. 9 is a diagram showing main functions included in a first storage system 50a and main data managed by the first storage system 50a.

FIG. 12 is a diagram showing a basic data structure of metadata on files managed by first to third storage apparatuses 10a to 10c, respectively.

FIG. 13 is a diagram showing a data structure specific to metadata 321 on files managed in the first storage system 50a.

FIG. 14 is a diagram showing a data structure specific to metadata 351 and 381 on files managed in the second and third storage systems 50b and 50c.

FIG. 29 is a diagram showing an example of a stubbing determination table (file size) 324.

FIG. 30 is a diagram showing an example of a stubbing determination table (access frequency) 325.

FIG. 39 is a diagram showing an example of metadata on files managed in a main storage system.

DESCRIPTION OF EMBODIMENTS

Embodiments of the present invention are described below with reference to the drawings.

Figure 1:
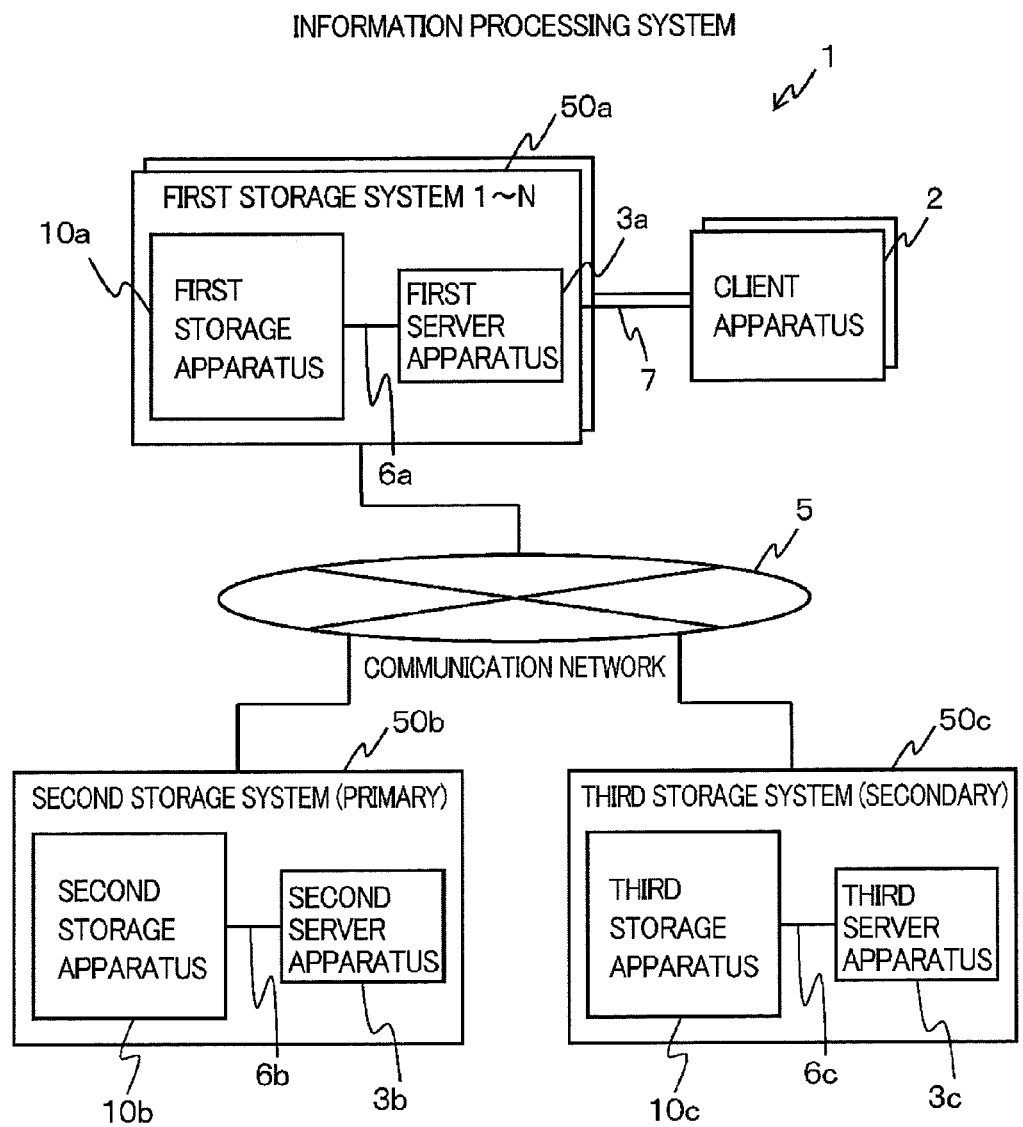
FIG. 1 is a diagram showing a schematic configuration of an information processing system 1.

FIG. 1 shows a schematic configuration of an information processing system 1 to be described as an embodiment. As shown in FIG. 1, the information processing system 1 includes at least one first storage system 50a, at least one client apparatus 2 communicatively coupled to the first storage system 50a, at least one second storage system 50b, and at least one third storage system 50c. These storage systems are communicatively coupled to each other through a communication network 5.

Note that, in the following description, the first storage system 50a is also referred to as an upper storage system. Moreover, in the following description, the second storage system 50b or the third storage system 50c is also referred to as a lower storage system.

The first storage system 50a provides the client apparatus 2 with an information processing service. The first storage system 50a is provided, for example, on the user side (edge).

The second storage system 50b (hereinafter also referred to as a primary system) and the third storage system 50c (hereinafter also referred to as a secondary system) provide the first storage system 50a with the environment for the usage and management of data. The second and third storage systems 50b and 50c are provided, for example, on the side (core) that provides a cloud service or an information processing service (application server/storage system or the like), such as a data center or a system service center.

The first storage system 50a includes a first server apparatus 3a and a first storage apparatus 10a. Note that the first server apparatus 3a and the first storage apparatus 10a do not necessarily have to be independent in hardware or software manner, but may be implemented with the same hardware, for example.

The second storage system 50b includes a second server apparatus 3b and a second storage apparatus 10b. Note that the second server apparatus 3b and the second storage apparatus 10b do not necessarily have to be independent in hardware or software manner, but may be implemented with the same hardware, for example.

The third storage system 50c includes a third server apparatus 3c and a third storage apparatus 10c. Note that the third server apparatus 3c and the third storage apparatus 10c do not necessarily have to be independent in hardware or software manner, but may be implemented with the same hardware, for example.

Note that, in the following description, when the first to third server apparatuses 3a to 3c do not necessarily have to be distinguished from one another, those server apparatuses are collectively referred to as the server apparatus 3. Also, when the first to third storage apparatuses 10a to 10c do not necessarily have to be distinguished from one another, those storage apparatuses are collectively referred to as the storage apparatus 10.

The first server apparatus 3a is communicatively coupled to the first storage apparatus 10a through a first storage network 6a. Also, the first server apparatus 3a is communicatively coupled to the client apparatus 2 through a communication network 7.

The first server apparatus 3a provides the client apparatus 2, the second storage system 50b and the third storage system 50c with the environment for file-by-file usage of data. The first server apparatus 3a serves as a window for using the cloud service provided by the second storage system 50b, for example. Note that the first server apparatus 3a may be implemented as a virtual machine by a virtualization control mechanism (such as a host OS type or a hypervisor type).

The second server apparatus 3b is communicatively coupled to the second storage apparatus 10b through a second storage network 6b.

The second server apparatus 3b provides the first storage system 50a and the third storage system 50c with the environment for file-by-file usage of data. Note that, although described later, the second storage system 50b serves as a primary site for remote copy to be performed between the second storage system 50b and the third storage system 50c. The second server apparatus 3b may be implemented as a virtual machine by a virtualization control mechanism (such as a host OS type or a hypervisor type).

The third server apparatus 3c is communicatively coupled to the third storage apparatus 10c through a third storage network 6c.

The third server apparatus 3c provides the first storage system 50a and the second storage system 50b with the environment for file-by-file usage of data. Note that, although described later, the third storage system 50c serves as a secondary site for remote copy to be performed between the second storage system 50b and the third storage system 50c. The third server apparatus 3c may be implemented as a virtual machine by a virtualization control mechanism (such as a host OS type or a hypervisor type).

The communication network 5 is, for example, a wide area network, the Internet, a public telecommunication network, a dedicated line network, a wired or wireless LAN (Local Area Network), a WAN (Wide Area Network), or the like.

Each of the first to third storage networks 6a to 6c is configured using, for example, a LAN, a WAN, a SAN (Storage Area Network), the Internet, a public telecommunication network, a dedicated line network, or the like.

The communications performed through the communication network 5, the communication network 7, the first storage network 6a, the second storage network 6b and the third storage network 6c are performed according to protocols such as TCP/IP, iSCSI (internet Small Computer System Interface), fibre channel protocol, FICON (Fibre Connection) (registered trademark), and ESCON (Enterprise System Connection) (registered trademark), for example.

Note that, in the following description, when the first to third storage networks 6a to 6c do not necessarily have to be distinguished from one another, those storage networks are collectively referred to as the storage network 6.

Figure 2:
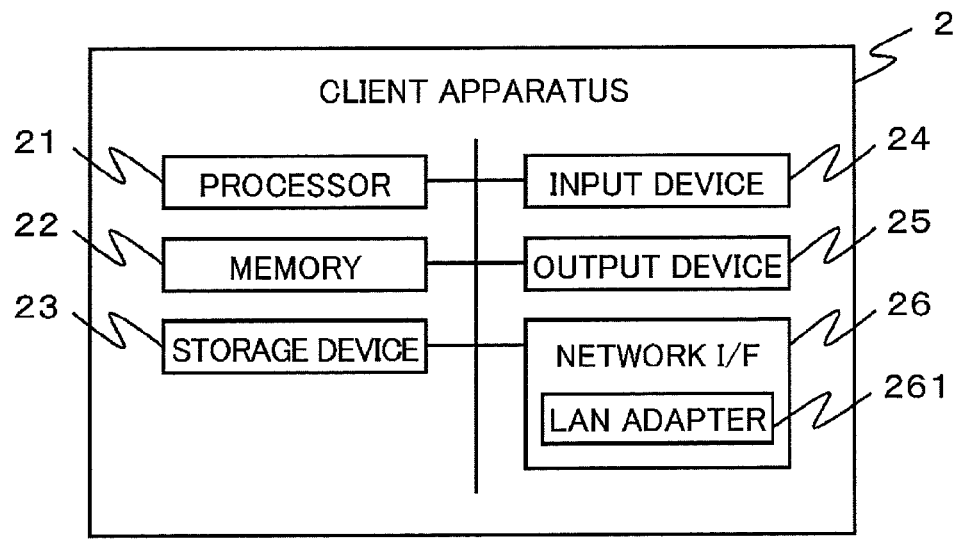
FIG. 2 is a diagram showing a hardware configuration example of a client apparatus 2.

FIG. 2 shows a hardware configuration example of the client apparatus 2. The client apparatus 2 is, for example, a personal computer, an office computer or the like. The client apparatus 2 executes applications and an operating system (including a file system, a kernel and a driver).

As shown in FIG. 2, the client apparatus 2 includes a processor 21, a volatile or non-volatile memory 22 (such as a RAM, a ROM, and an NVRAM (Non Volatile RAM)), a storage device 23 (such as a hard disk drive and an SSD (Solid State Drive)), an input device 24 (such as a keyboard, a mouse and a touch panel), an output device 25 (such as a liquid crystal monitor and a printer), and a network interface (referred to as a network I/F 26) such as an NIC (Network Interface Card) (hereinafter referred to as a LAN adapter 261).

The server apparatus 3 transmits, to the storage apparatus 10, a data frame (hereinafter abbreviated as a frame) including a data I/O request (such as a data write request and a data read request) when accessing a storage area provided by the storage apparatus 10. The frame is, for example, a fibre channel (FC) frame.

Figure 3:
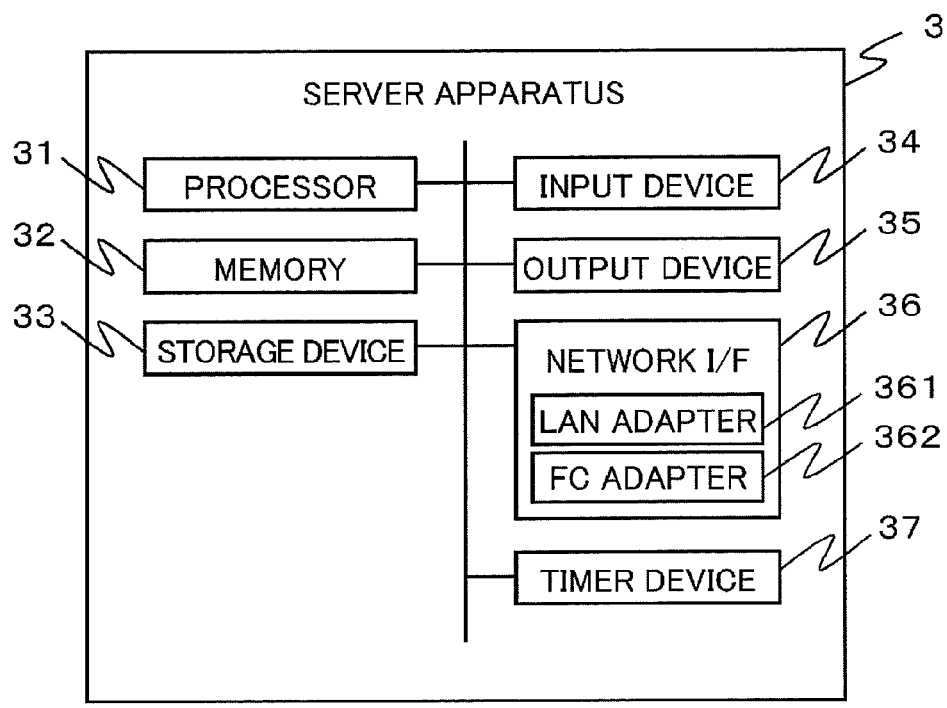
FIG. 3 is a diagram showing a hardware configuration example of a server apparatus 3.

FIG. 3 shows a hardware configuration example of the server apparatus 3. The server apparatus 3 is, for example, a personal computer, a main frame, an office computer or the like. As shown in FIG. 3, the server apparatus 3 includes a processor 31, a volatile or nonvolatile memory 32 (such as a RAM, a ROM, and an NVRAM), a storage device 33 (such as a hard disk drive and an SSD), an input device 34 (such as a keyboard and a mouse), an output device 35 (such as a liquid crystal monitor and a printer), a network interface (hereinafter referred to as a network I/F 36) (such as an NIC (hereinafter referred to as a LAN adapter 361) and an HBA (Host Bus Adaptor) (hereinafter referred to as an FC adapter 362)), and a timer device 37 configured using a timer circuit, an RTC (Real Time Clock) and the like.

Figure 4:
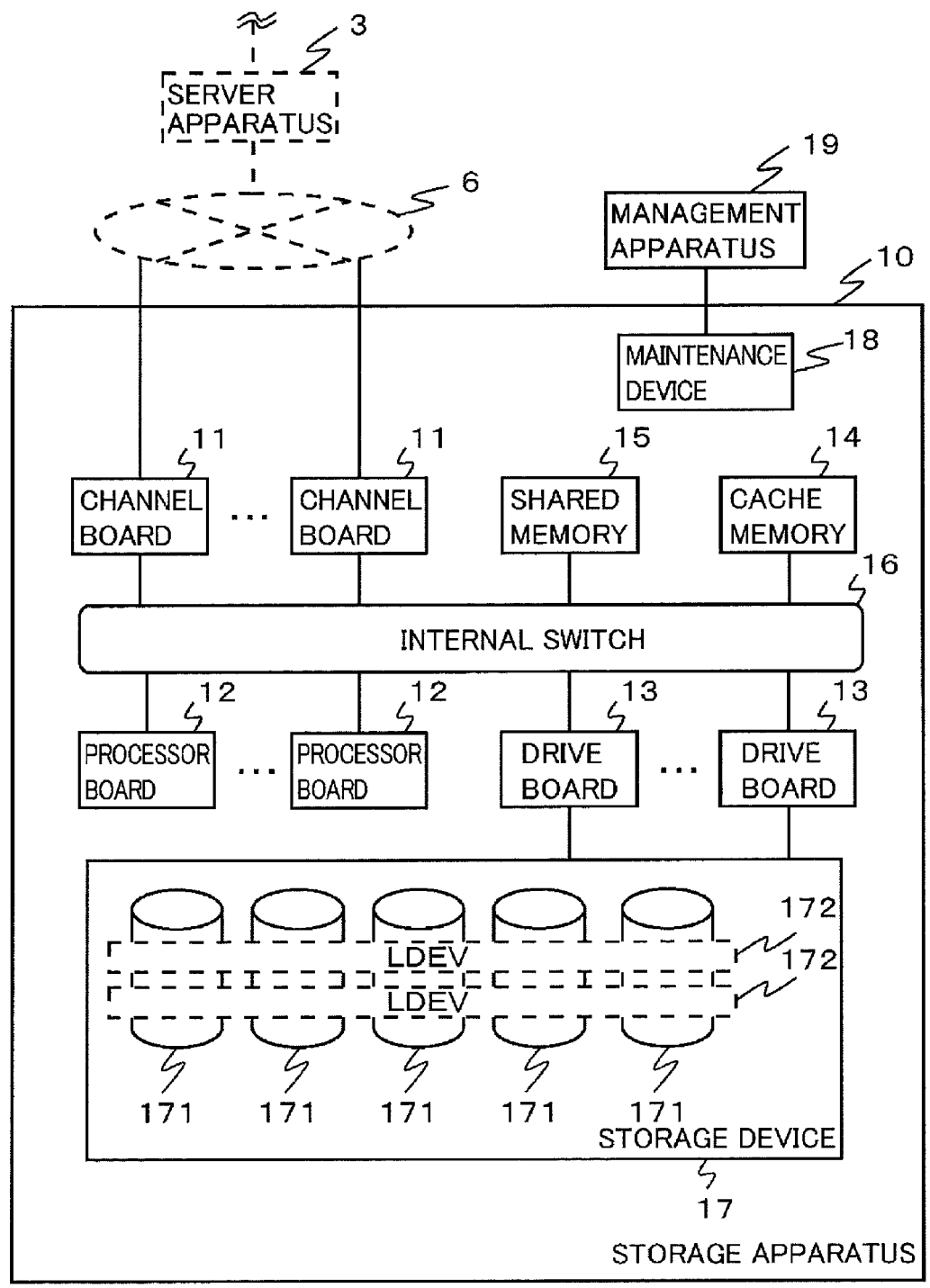
FIG. 4 is a diagram showing a hardware configuration example of a storage apparatus 10.

FIG. 4 shows a hardware configuration example of the storage apparatus 10. The storage apparatus 10 receives the data I/O request transmitted by the server apparatus 3, accesses a storage medium in response to the received data I/O request, and then transmits data or a processing result (response) to the server apparatus 3. The storage apparatus 10 is, for example, a disk array apparatus.

As shown in FIG. 4, the storage apparatus 10 includes at least one channel board 11 (also referred to as a channel package), at least one processor board 12 (also referred to as a processor package), at least one drive board 13 (also referred to as a drive package), a cache memory 14, a shared memory 15, an internal switch 16, a storage device 17, and a maintenance device 18 (SVP: SerVice Processor). The channel board 11, the processor board 12, the drive board 13, the cache memory 14 and the shared memory 15 are communicatively coupled to each other through the internal switch 16.

The channel board 11 receives a frame transmitted by the server apparatus 3, and transmits, back to the server apparatus 3, a frame including a processing (data I/O) response (e.g., read data, read completion report, and write completion report) to the data I/O request included in the received frame.

The processor board 12 performs processing related to data transfer (high-speed bulk data transfer using DMA (Direct Memory Access) and the like) performed between the channel board 11, the drive board 13, the cache memory 14 and the like, in response to the data I/O request included in the frame received by the channel board 11. The processes performed by the processor board 12 include: transfer (handover) of data (data read from the storage device 17 or data to be written into the storage device 17) between the channel board 11 and the drive board 13; staging of data stored in the cache memory 14 (read of data from the storage device 17); destaging (write into the storage device 17); and the like.

The cache memory 14 is configured using a fast accessible RAM (Random Access Memory). The cache memory 14 stores data to be written into the storage device 17 (hereinafter referred to as write data), data read from the storage device 17 (hereinafter referred to as read data), and the like. The shared memory 15 stores various kinds of information to be used for controlling the storage apparatus 10.

The drive board 13 communicates with the storage device 17 in data reading from the storage device 17 or data writing into the storage device 17. The internal switch 16 is configured using, for example, a high-speed cross bar switch. Note that communication performed through the internal switch 16 is performed according to protocols such as fibre channel, iSCSI and TCP/IP, for example.

The storage device 17 is configured including a plurality of storage drives 171. Each of the storage drives 171 is, for example, an SAS (Serial Attached SCSI), SATA (Serial ATA), FC (Fibre Channel) or PATA (Parallel ATA) hard disk drive, SSD or the like.

The storage device 17 provides the server apparatus 3 with a storage area using a logical storage area provided by controlling the storage drives 171 using RAID (Redundant Arrays of Inexpensive (or Independent) Disks) or the like, as a unit. The logical storage area is provided, for example, as a storage area of a logical device (LDEV 172) configured using a RAID group (parity group).

The storage apparatus 10 provides the server apparatus 3 with a logical storage area (hereinafter also referred to as an LU (Logical Unit or Logical Volume) which is formed using the LDEV 172. Each LU is given an identifier (hereinafter referred to as LUN). The storage apparatus 10 stores correspondence between the LU and the LDEV 172. The storage apparatus 10 specifies the LDEV 172 corresponding to the LU or specifies the LU corresponding to the LDEV 172 based on the correspondence.

Note that the first storage apparatus 10a may include a function to provide the server apparatus 3 with a virtualized LU (hereinafter referred to as a virtual LU) which is provided by thin provisioning, in addition to the LU described above.

Figure 5:
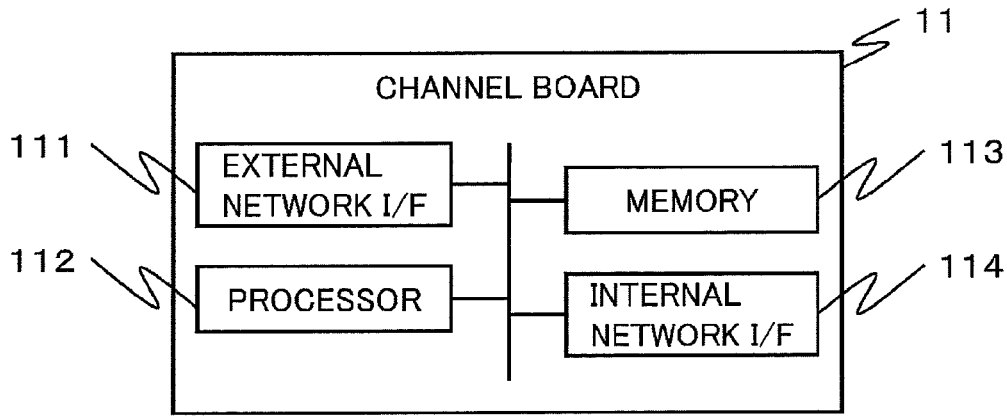
FIG. 5 is a diagram showing a hardware configuration example of a channel board 11.

FIG. 5 shows a hardware configuration example of the channel board 11. As shown in FIG. 5, the channel board 11 includes an external network interface (hereinafter referred to as an external network I/F 111) having a port (communication port) for communicating with the server apparatus 3, a processor 112 (including a frame processing chip and a frame transfer chip), a memory 113, an internal network interface (hereinafter referred to as an internal network I/F 114) having a port (communication port) for communicating with the processor board 12, and the like.

The external network I/F 111 is configured using an NIC, an HBA and the like. The processor 112 is configured using a CPU (Central Processing Unit), an MPU (Micro Processing Unit) and the like. The memory 113 is a RAM (Random Access Memory) or a ROM (Read Only Memory). The memory 113 stores micro programs. Various functions provided by the channel board 11 are implemented by the processor 112 reading the micro programs from the memory 113 and executing them. The internal network I/F 114 communicates with the processor board 12, the drive board 13, the cache memory 14 and the shared memory 15 through the internal switch 16.

Figure 6:
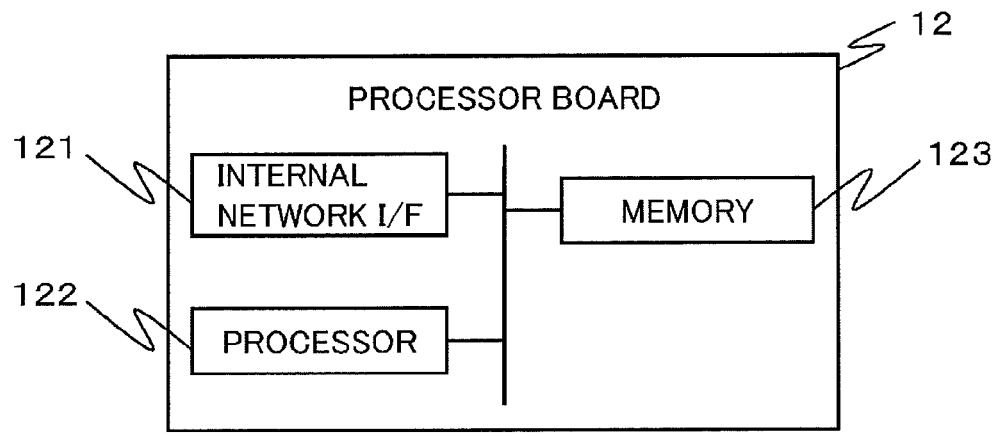
FIG. 6 is a diagram showing a hardware configuration example of a processor board 12.

FIG. 6 shows a hardware configuration example of the processor board 12. The processor board 12 includes an internal network interface (hereinafter referred to as an internal network I/F 121), a processor 122, and a (fast accessible) memory 123 (local memory) which has high access performance from the processor 122 than the shared memory 15. The memory 123 stores micro programs. Various functions provided by the processor board 12 are implemented by the processor 122 reading the micro programs from the memory 123 and executing them.

The internal network I/F 121 communicates with the channel board 11, the drive board 13, the cache memory 14 and the shared memory 15 through the internal switch 16. The processor 122 is configured using a CPU, an MPU, a DMA (Direct Memory Access) and the like. The memory 123 is a RAM or a ROM. The processor 122 can access both the memory 123 and the shared memory 15.

Figure 7:
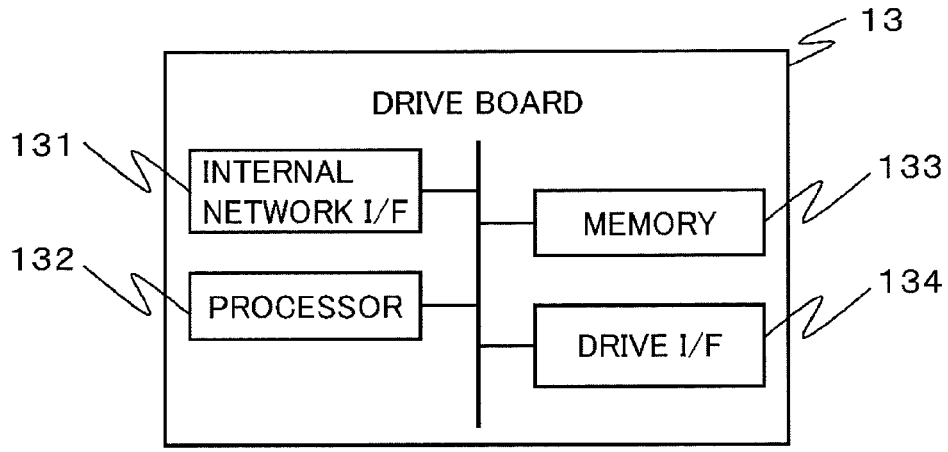
FIG. 7 is a diagram showing a hardware configuration example of a drive board 13.

FIG. 7 shows a hardware configuration example of the drive board 13. The drive board 13 includes an internal communication interface (hereinafter referred to as an internal network I/F 131), a processor 132, a memory 133, and a drive interface (hereinafter referred to as a drive I/F 134). The memory 133 stores micro programs. Various functions provided by the drive board 13 are implemented by the processor 132 reading the micro programs from the memory 133 and executing them.

The internal network I/F 131 communicates with the channel board 11, the processor board 12, the cache memory 14 and the shared memory 15 through the internal switch 16. The processor 132 is configured using a CPU, an MPU and the like. The memory 133 is a RAM or a ROM. The drive I/F 134 communicates with the storage device 17.

The maintenance device 18 shown in FIG. 4 performs setting and control of the respective components in the storage apparatus 10, and monitors the states thereof. The maintenance device 18 is implemented using an information processing device such as a personal computer or an office computer. The maintenance device 18 acquires information such as configuration information and operation information from the respective components in the storage apparatus 10, such as the channel board 11, the processor board 12, the drive board 13, the cache memory 14, the shared memory 15 and the internal switch 16, by communicating therewith as needed through a communication means such as the internal switch 16 or a LAN prepared for exclusive use. Then, the maintenance device 18 provides a management apparatus 19 with the acquired information. Moreover, the maintenance device 18 performs setting, control and maintenance (including installation and update of software) of the respective components based on control information received from the management apparatus 19.

The management apparatus 19 shown in FIG. 4 is a computer communicatively coupled to the maintenance device 18 through a LAN or the like. The management apparatus 19 is implemented using, for example, a personal computer, an office computer or the like. The management apparatus 19 includes an interface (GUI (Graphical User Interface), CLI (Command Line Interface) or the like) for a user to control or monitor the storage apparatus 10.

Figure 8:
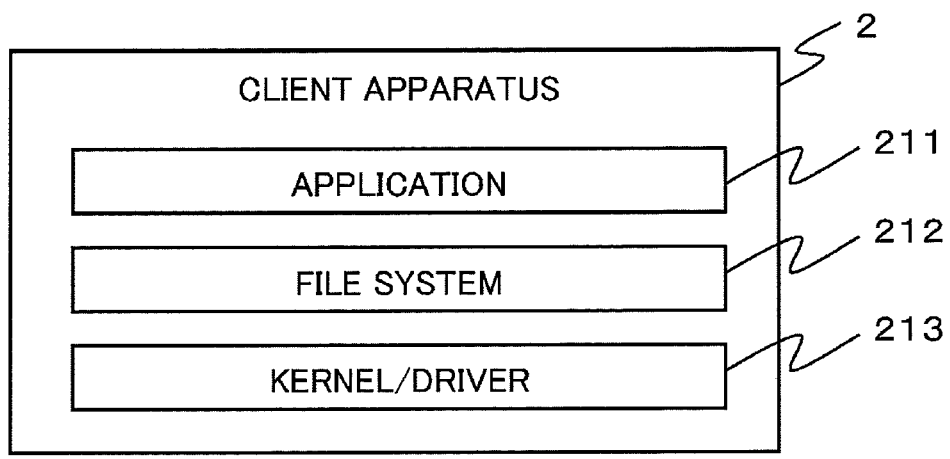
FIG. 8 is a diagram showing main functions included in the client apparatus 2.

FIG. 8 shows main functions of the client apparatus 2. As shown in FIG. 8, the client apparatus 2 includes functions such as an application 211, a file system 212 and a kernel/driver 213. Note that these functions are implemented by the processor 21 in the client apparatus 2 reading the programs stored in the memory 22 or the storage device 23 and executing them.

<First Storage System>

Figure 9:
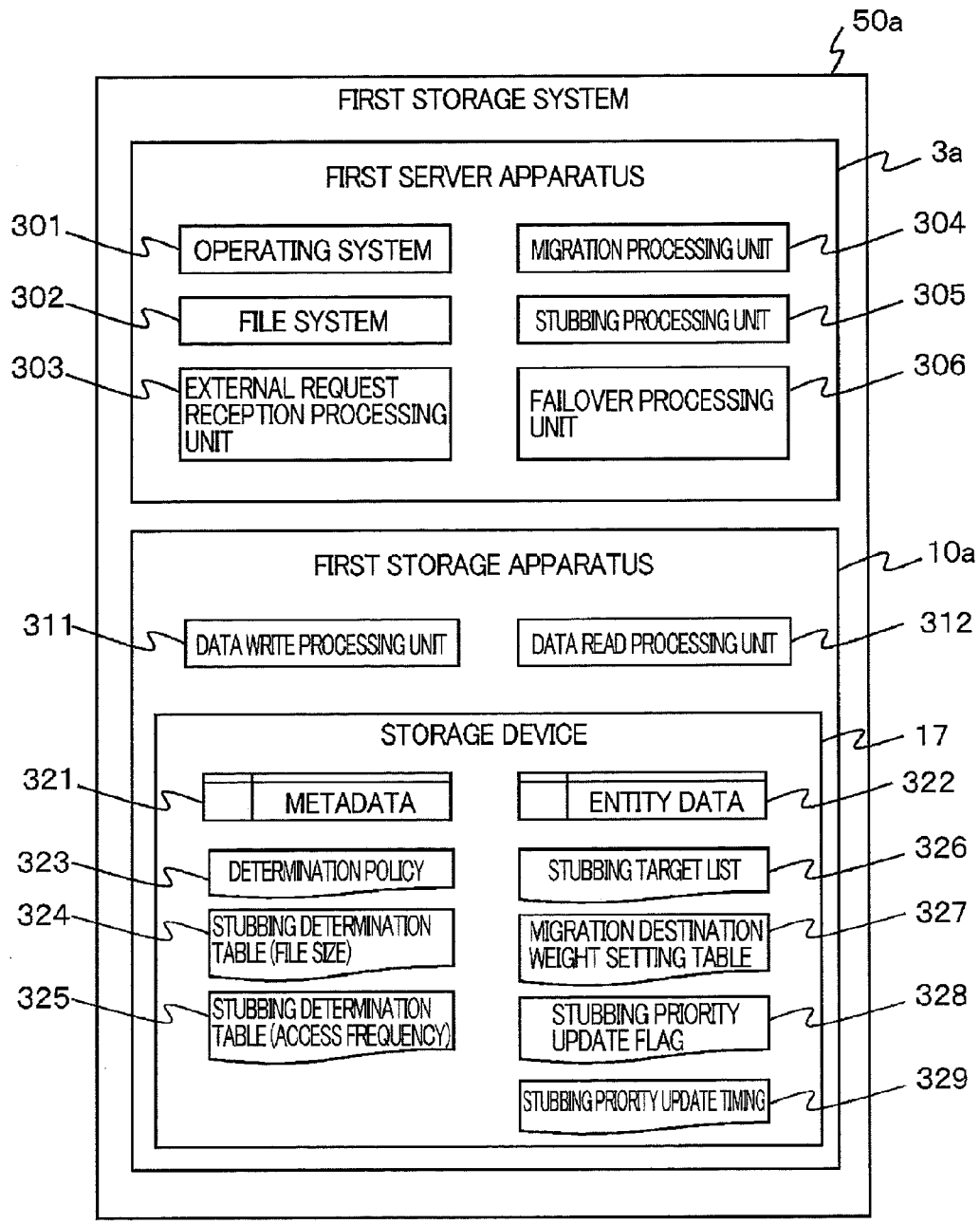

FIG. 9 shows main functions included in the first storage system 50a and main data managed by the first storage system 50a.

As shown in FIG. 9, the first server apparatus 3a includes functions of an operating system 301, a file system 302, an external request reception processing unit 303, a migration processing unit 304, a stubbing processing unit 305, and a failover processing unit 306. Note that the functions included in the first server apparatus 3a are implemented by the hardware of the first server apparatus 3a or the processor 31 of the first server apparatus 3a reading the programs stored in the memory 32 and then executing them.

The operating system 301 is implemented by executing a kernel module or a driver module. The kernel module includes programs for implementing basic functions included in the operating system, such as process management, process scheduling, storage area management, and handling of an interrupt request from the hardware, for the software executed in the first server apparatus 3a. The driver module includes programs to allow the kernel module to communicate with the hardware configuring the first server apparatus 3a and external devices used by being coupled to the first server apparatus 3a.

The file system 302 provides the client apparatus 2 with an I/O function for files managed in the logical volume (LU) provided by the first storage apparatus 10a. Note that, in the following description, in the cases where a file is referred, the file also includes a directory. The file system 302 is, for example, FAT, NTFS, HFS, ext2, ext3, ext4, UDF, HPFS, JFS, UFS, VTOC, XFS or the like. Moreover, the file system 302 provides the client apparatus 2 with a file sharing environment according to protocols of an NFS (Network File System), CIFS (Common Internet File System), AFS (Andrew File System) or the like.

The external request reception processing unit 303 receives a processing request transmitted by the client apparatus 2, and then performs processing for the received processing request (e.g., transmitting an I/O request to the storage apparatus 10a and receiving a response thereto). Also, the external request reception processing unit 303 receives a processing request transmitted by the second storage system 50b (primary system) or the third storage system 50c (secondary system), and then performs processing for the received processing request.

The migration processing unit 304 performs processing related to copying (hereinafter also referred to as migration) of data stored in the storage device 17 in the first storage apparatus 10a to data on files (metadata and entity data; hereinafter also referred to as file data) in the storage device 17 in the second storage apparatus 10b. This copying of the file data is a prerequisite to stubbing to be described later.

The stubbing processing unit 305 performs processing related to stubbing of data stored in the first storage apparatus 10a. Here, stubbing means leaving metadata among file data (i.e., keeping the metadata stored) in the storage device 17 in the first storage apparatus 10a and managing the entity data by storing the data in the storage device 17 in the second storage apparatus 10b without storing the data in the storage device 17 in the first storage apparatus 10a. Note that stub means the metadata left in the first storage apparatus 10a in such a case. The stubbing is performed for the purpose of, for example, securing free space (remaining capacity) of the storage device 17 in the first storage apparatus 10a, and the like.

When the first server apparatus 3a receives an I/O request requiring entity data of a stubbed file from the client apparatus 2, the entity data of the file is written back into the first storage apparatus 10a from the second storage apparatus 10b (this write back is hereinafter also referred to as recall). As described later, for example, the stubbing processing unit 305 sets files as stubbing targets in ascending order of access frequency from the client apparatus 2 or files in ascending order of importance judged by the user.

The failover processing unit 306 performs processing related to alternative processing (failover), in the third storage system 50c (secondary system), of the processing performed by the second storage system 50b (primary system).

As shown in FIG. 9, the first storage apparatus 10a includes functions of a data write processing unit 311 and a data read processing unit 312. These functions are implemented by the hardware included in the channel board 11, processor board 12 or drive board 13 or by the processor 112, 122 or 132 reading the micro programs stored in the memory 113, 123 or 133 and executing the programs.

The data write processing unit 311 performs processing related to data write into the storage device 17. This processing is performed, for example, as described below. First, when a data write request transmitted by the server apparatus 3 arrives at the channel board 11, the processor board 12 is notified to that effect. Upon receipt of such a notification, the processor board 12 generates a drive write request, transmits it to the drive board 13, and stores write data attached to the data write request in the memory 14. Upon receipt of the drive write request from the processor board 12, the drive board 13 registers the received drive write request in a write processing queue.

The drive board 13 reads the drive write request from the write processing queue as needed. Moreover, the drive board 13 reads write data specified by the read drive write request from the memory 14, and writes the read write data into the storage drive 171. Furthermore, the drive board 13 sends a report to the effect that writing of the write data for the drive write request has completed (completion report) to the processor board 12. Upon receipt of the completion report from the drive board 13, the processor board 12 notifies the channel board 11 to that effect. Upon receipt of such a notification, the channel board 11 transmits a completion notification to the server apparatus 3.

The data read processing unit 312 performs processing related to data read from the storage device 17. This processing is performed, specifically, as described below. First, when a data read request transmitted by the server apparatus 3 arrives at the channel board 11, the channel board 11 notifies the drive board 13 to that effect. Upon receipt of such a notification, the drive board 13 reads data specified by the data read request (e.g., data specified by an LBA (Logical Block Address) or a data length) from the storage drive 171. However, when read data already exists (staged) in the memory 14, reading from the storage drive 171 is omitted accordingly.

The processor board 12 writes the data read by the drive board 13 into the memory 14 (staging), and transfers the data written in the memory 14 to the channel board 11 as needed. The channel board 11 receives the read data transmitted from the processor board 12, and transmits the received read data to the server apparatus 3.

As shown in FIG. 9, the storage device 17 in the first storage apparatus 10a stores the file data (metadata 321 and entity data 322) described above. The storage device 17 in the first storage apparatus 10a also stores a determination policy 323, a stubbing determination table (file size) 324, a stubbing determination table (access frequency) 325, a stubbing execution target list 326, a migration destination weight setting table 327, a stubbing priority update flag 328, and a stubbing priority update timing 329. These tables and data are described in detail later.

<Second Storage System>

Figure 10:
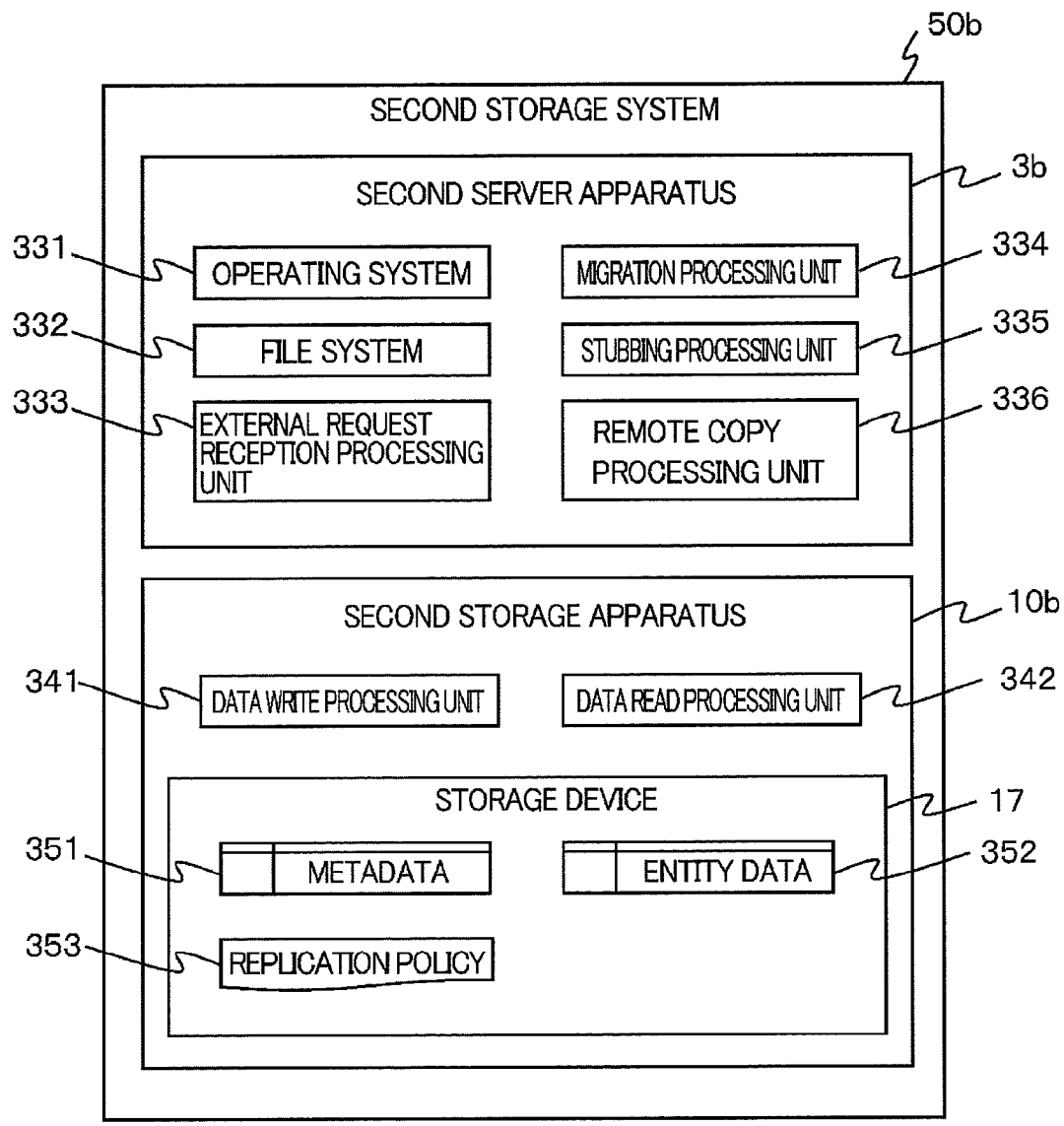
FIG. 10 is a diagram showing main functions included in a second storage system 50b and main data managed by the second storage system 50b.

FIG. 10 shows main functions included in the second storage system 50b and main data managed by the second storage system 50b.

As shown in FIG. 10, the second server apparatus 3b includes functions of an operating system 331, a file system 332, an external request reception processing unit 333, a migration processing unit 334, a stubbing processing unit 335, and a remote copy processing unit 336. Note that the functions included in the second server apparatus 3b are implemented by the hardware of the second server apparatus 3b or the processor 31 of the second server apparatus 3b reading the programs stored in the memory 32 and executing them.

The functions of operating system 331 and file system 332 in the second server apparatus 3b are the same as those of the operating system 301 and file system 302 in the first server apparatus 3a, respectively.

The external request reception processing unit 333 receives a processing request transmitted from the first storage system 50a or the third storage system 50c, and then performs processing for the received processing request.

The migration processing unit 334 performs processing related to the copying (migration) described above. The stubbing processing unit 335 performs processing related to the stubbing described above.

The remote copy processing unit 336 performs processing related to a function to copy (hereinafter also referred to as the remote copy function) a replica of the file data stored in the storage device 17 (hereinafter also referred to as the primary device) in the second storage apparatus 10b to the storage device 17 (hereinafter also referred to as the secondary device) in the third storage apparatus 10c. The remote copy function is used for the purpose of, for example, acquiring backup of the data stored in the second storage apparatus 10b, securing an alternative (failover) destination (third storage apparatus 10c) when a failure occurs in the second storage apparatus 10b, securing safety and integrity of the file data managed by the information processing system 1, and the like.

The remote copy function uses synchronous transfer or asynchronous transfer to manage the consistency between the data in the primary device and the data in the secondary device. In the synchronous transfer, for example, when the data in the primary device is updated in response to the data write request transmitted from the requestor such as the first storage apparatus 10a, the updated contents are immediately transmitted to the secondary device. Then, a completion notification is transmitted to the first storage apparatus 10a after the update of the data in the secondary device is confirmed.

In the synchronous transfer, the completion notification is transmitted to the requestor after the data write in both the primary device and the secondary device is confirmed. For this reason, the data consistency between the primary device and the secondary device is always guaranteed at the time the requestor receives the completion notification.

On the other hand, in asynchronous transfer, for example, upon receipt of a data write request from a requestor, the primary device updates the data in the primary device in response to the data write request, and transmits a completion notification to the requestor after the completion of the update. Thereafter, the primary device transmits the updated contents to the secondary device after transmitting the completion notification. Then, the secondary device updates its own data according to the updated contents.

As described above, in the asynchronous transfer, the primary device transmits a completion notification to the requestor, regardless of whether or not the secondary device updates the data, after the primary device updates its own data. For this reason, the completion notification can be quickly sent to the requestor even though the data consistency between the primary device and the secondary device cannot always be guaranteed as in the case of the synchronous transfer.

As shown in FIG. 10, the second storage apparatus 10b includes functions of a data write processing unit 341 and a data read processing unit 342. These functions are realized by the hardware included in the channel board 11, processor board 12 or drive board 13 in the second storage apparatus 10b or by the processor 112, 122 or 132 reading the micro programs stored in the memory 113, 123 or 133 and executing the programs. Note that these functions are the same as those of the data write processing unit 311 and data read processing unit 312 in the first storage apparatus 10a, respectively.

As shown in FIG. 10, the storage device 17 in the second storage apparatus 10b stores the file data (metadata 351 and entity data 352) described above. The storage device 17 in the second storage apparatus 10b also stores a replication policy 353. In the replication policy 353, the user or operator sets any of the values, "normal", "efficiency-priority" and "importance priority", by operating the client apparatus 2 or the management apparatus 19. The replication policy 353 is described in detail later.

<Third Storage System>

Figure 11:
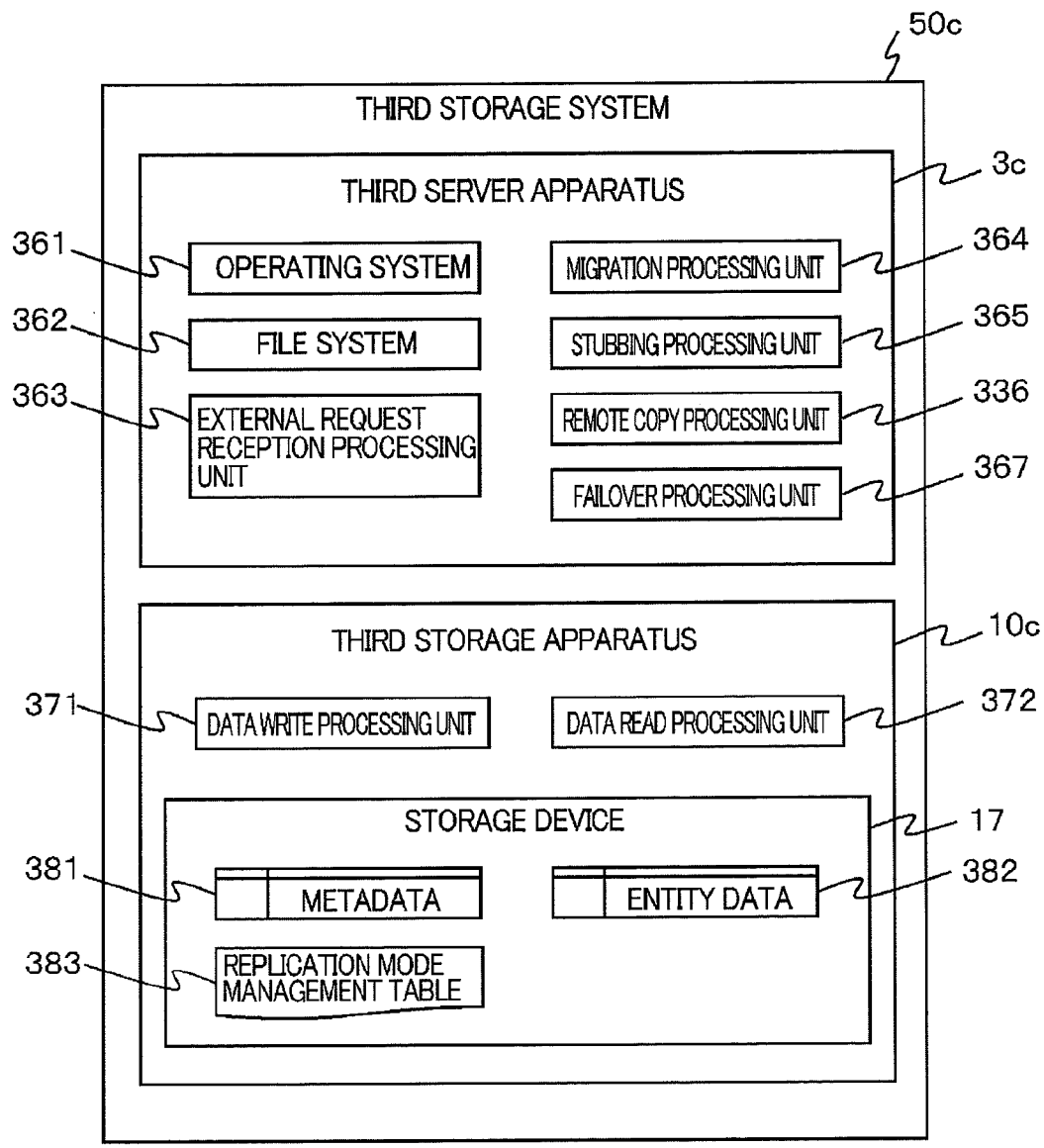
FIG. 11 is a diagram showing main functions included in a third storage system 50c and main data managed by the third storage system 50c.

FIG. 11 shows main functions included in the third server apparatus 3c and the third storage apparatus 10b in the third storage system 50c and main data managed by the third server apparatus 3c and the third storage apparatus 10c.

As shown in FIG. 11, the third server apparatus 3c includes functions of an operating system 361, a file system 362, an external request reception processing unit 363, a migration processing unit 364, a stubbing processing unit 365, a remote copy processing unit 336, and a failover processing unit 367. Note that the functions included in the third server apparatus 3c are implemented by the hardware of the third server apparatus 3c or the processor 31 of the third server apparatus 3c reading the programs stored in the memory 32 and executing them.

The functions of the operating system 361 and file system 362 in the third server apparatus 3c are the same as those of the operating system 331 and file system 332 in the second server apparatus 3b, respectively.

The external request reception processing unit 363 receives a processing request transmitted from the first storage system 50a or the second storage system 50b, and then performs processing for the received processing request.

The migration processing unit 364 performs processing related to the copying (migration) described above. The stubbing processing unit 365 performs processing related to the stubbing described above. The remote copy processing unit 336 performs processing related to the remote copy function described above.

As shown in FIG. 11, the third storage apparatus 10c includes functions of a data write processing unit 371 and a data read processing unit 372. These functions are implemented by the hardware included in the channel board 11, processor board 12 or drive board 13 in the third storage apparatus 10c or by the processor 112, 122 or 132 reading the micro programs stored in the memory 113, 123 or 133 and executing the programs. The respective functions of the data write processing unit 371 and the data read processing unit 372 in the third storage apparatus 10c are the same as those of the data write processing unit 341 and data read processing unit 342 in the second storage apparatus 10b, respectively.

As shown in FIG. 11, the storage device 17 in the third storage apparatus 10c stores the file data (metadata 381 and entity data 382) described above. The storage device 17 in the third storage apparatus 10c also stores a replication mode management table 383. The table is described in detail later.

<Basic Metadata Structure>

FIG. 12 shows a basic data structure commonly provided to metadata (metadata 322, metadata 352 and metadata 382) of files managed by the first to third storage apparatuses 10a to 10c, respectively.

As shown in FIG. 12, the metadata includes information corresponding to such items as file name 1211, owner 1212, access right 1213, update date/time 1214, size 1215, hash 1216 and data storage address 1217.

In file name 1211 among the items described above, a name of a file corresponding to the metadata is set. In the owner 1212, information indicating the owner of the file corresponding to the metadata is set. In the access right 1213, information indicating the access right set for the file corresponding to the metadata is set.

In update date/time 1214, the final update date/time of the file corresponding to the metadata is set. The contents in the update date/time 1214 is updated when the entity data is updated, and is also updated when the metadata is updated.

In size 1215, the size of the file (size of file data, hereinafter referred to as the file size) corresponding to the metadata is set.

In hash 1215, a hash value is set, which is obtained by carrying out an operation using a hash function for the entity data of the file corresponding to the metadata.

In data storage address 1216, information (address) indicating a storage location of the entity data of the file corresponding to the metadata is set.

<Metadata Structure Specific to First Storage System>

Figure 13:
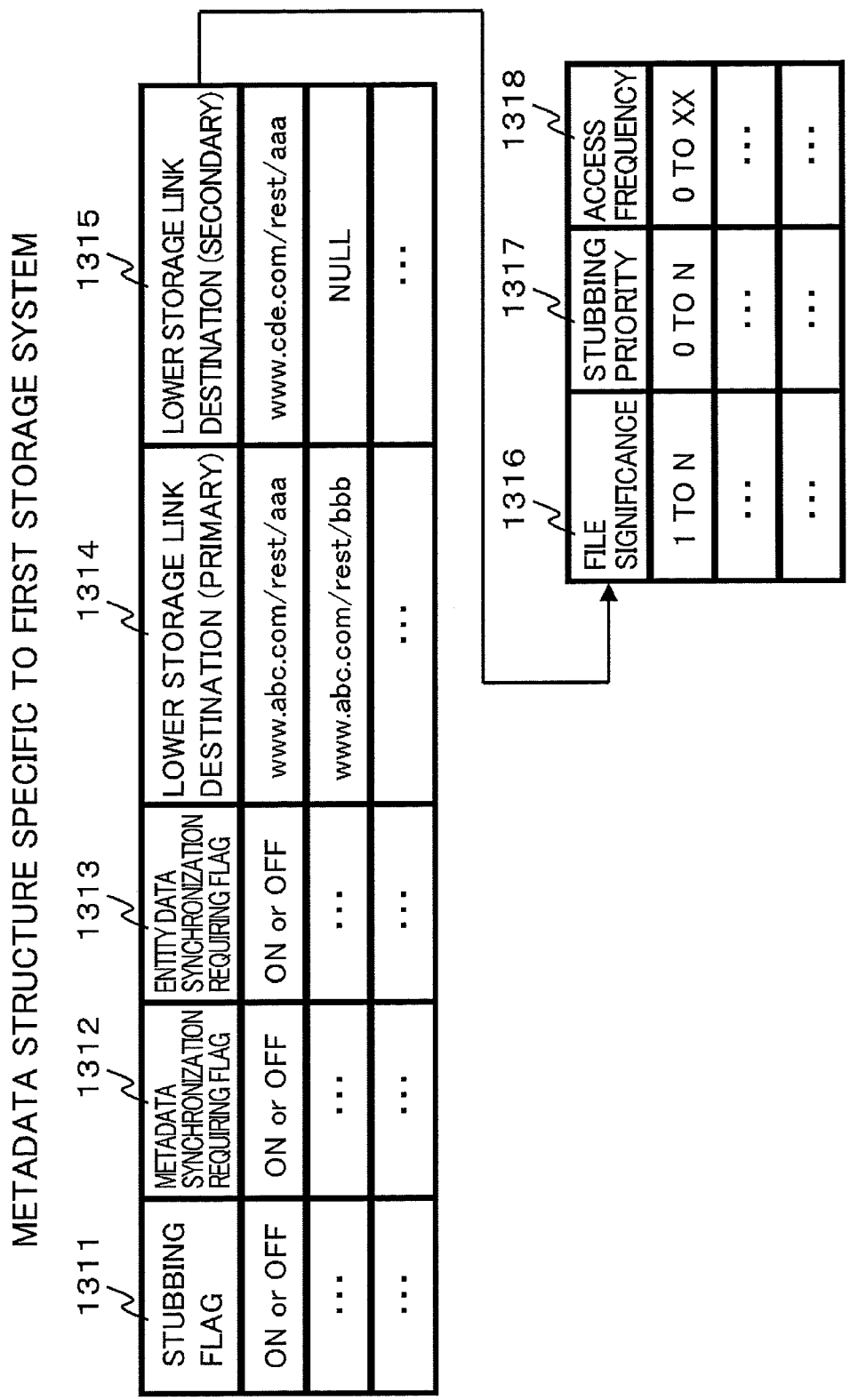

FIG. 13 shows a data structure specific to the metadata 352 of files managed in the first storage system 50*a*.

In stubbing flag 1311 among the items shown in FIG. 13, information indicating whether or not the file corresponding to the metadata is currently stubbed. In the present embodiment, "ON" is set if the file corresponding to the metadata is currently stubbed, and "OFF" is set if the file corresponding to the metadata is not currently stubbed.

In metadata synchronization requiring flag 1312, information indicating whether or not the contents of the metadata 322 stored in the upper storage system and the contents of the metadata 352 and 382 stored in the lower storage system as a copy replica of the metadata 322 need to be identical with each other is set. In the present embodiment, "ON" is set if the both need to be identical with each other, otherwise "OFF" is set.

In entity data synchronization requiring flag 1313, information indicating whether or not the contents of the entity data of the file corresponding to the metadata 322 managed in the upper storage system and the contents of the entity data 351 and 381 managed by the lower storage system as a replica of the entity data of the file corresponding to the metadata 322 need to be identical with each other is set. In the present embodiment, "ON" is set if the both need to coincide with each other, otherwise "OFF" is set.

In lower storage link destination (primary) 1314, information indicating a storage location of entity data of a file as a replication source in the remote copy function described above (i.e., information (e.g., URL) specifying a storage area of the storage device 17 in the second storage apparatus 10*b*) is set.

In upper storage link destination (secondary) 1315, information indicating a storage location of entity data of a file as a replication destination in the remote copy function described above (i.e., information (e.g., URL) specifying a storage area of the storage device 17 in the third storage apparatus 10*c*) is set.

In file significance 1316, significance of a file (hereinafter referred to as file significance) is set, which is set by the user or operator for the file corresponding to the metadata. As will described later, the file significance is referred to as information for determining stubbing priority to be described later.

In stubbing priority 1317, priority in extracting a stubbing target file to be described later (hereinafter referred to as stubbing priority) is set, which is set for the file corresponding to the metadata. A higher-priority file is preferentially extracted as the stubbing target file to be described later. In the present embodiment, files are stubbed in descending order of value of stubbing priority.

In access frequency 1318, an access frequency of the file corresponding to the metadata (the number of I/O requests issued per unit time for the file) is set. As will described later, the access frequency is referred to as information for determining the stubbing priority.

<Metadata Structure Specific to Second and Third Storage Systems>

FIG. 14 shows a metadata structure specific to metadata 352 and 382 of files managed in the second and third storage systems 50*b* and 50*c*. Note that the contents of the metadata 352 and 382 are updated to the same contents by communication between the storage systems as needed.

In site-to-site replication requiring flag 1411 among the items shown in FIG. 14, information indicating whether or not the entity data of the file managed by the second storage system 50*b* (primary system) needs to be replicated into the third storage system 50*c* (secondary system) in the remote copy function described above is set. As described later, the content of the site-to-site replication requiring flag 1411 is set to "ON" in leading transfer of metadata of the file from the second storage system 50*b* to the third storage system 50*c* during file replication in the remote copy function, and is set to "ON" in subsequent transfer of entity data of the file from the second storage system 50*b* to the third storage system 50*c*.

In difference information 1412 among the items shown in FIG. 14, information indicating whether or not the metadata and the entity data are consistent is set for the file managed by the third storage system. In this embodiment, "not present" is set if the metadata and the entity data are consistent, and "present" is set if the metadata and the entity data are not consistent.

Here, the determination of whether or not the metadata and the entity data are consistent is made by checking if, for example, the content of the hash 1216 of the metadata matches the hash value obtained from the entity data of the file corresponding to the metadata. Moreover, it is determined that the metadata and the entity data are not consistent, based on, for example, the fact that corresponding data is not stored in the position set in the data storage destination address 1217 of the metadata or the fact that the size 1215 does not match even though the corresponding data is stored.

Note that, as described later, the situation where the metadata and the entity data are not consistent occurs, for example, when the metadata updated by updating the file in the first storage system 50*a* is transferred to the third storage system 50*c* by the remote copy function, but the entity data of the file is not yet transferred to the third storage system 50*c*.

In file significance 1413, file significance set for the file corresponding to the metadata is set.

In stubbing priority 1414, stubbing priority set for the file corresponding to the metadata is set.

In number of data retained in system 1415, information indicating redundancy of entity data of the file (how many storage systems manage the data) is set. The number of data retained in system 1415 is described in detail later.

In retaining system 1416, an identifier of the storage system storing the entity data of the file is set. The retaining system 1416 is described in detail later.

=Possible Problem in Remote Copy Function and Solution Thereto=

Next, description is given of a possible problem and a solution thereto in application of the remote copy function described above in the information processing system 1 according to the present embodiment.

Figure 15:
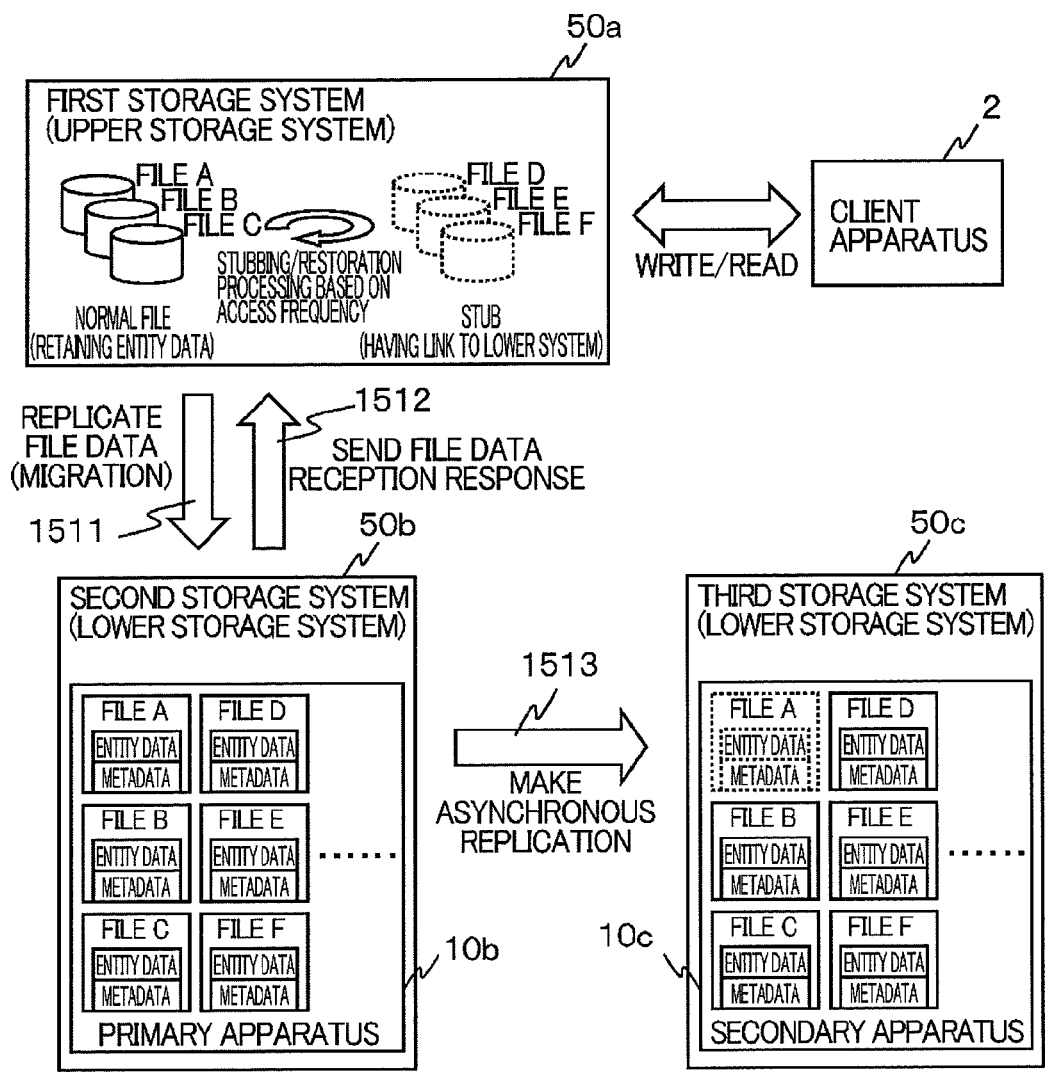
FIG. 15 is a diagram explaining one aspect of a method for realizing a remote copy function.

FIG. 15 shows one aspect of a method for implementing the remote copy function described above. As shown in FIG. 15, the file data of the files stored in the first storage system 50*a* is replicated to the second storage system 50*b* by the migration described above (reference numeral 1511). Moreover, the second storage system 50*b* receives the file data from the first storage system 50*a*, stores the data in its own storage device 17, and then sends a reception response thereof to the first storage system 50a (reference numeral 1512).

The second storage system 50b transmits the file data, which is stored in its own storage device 17 by migration, to the third storage system 50c asynchronously with the reception response (by asynchronous transfer) (reference numeral 1513). The third storage system 50c receives the file data transmitted by the second storage system 50b, and stores the received file data in its own storage device 17.

Figure 16:
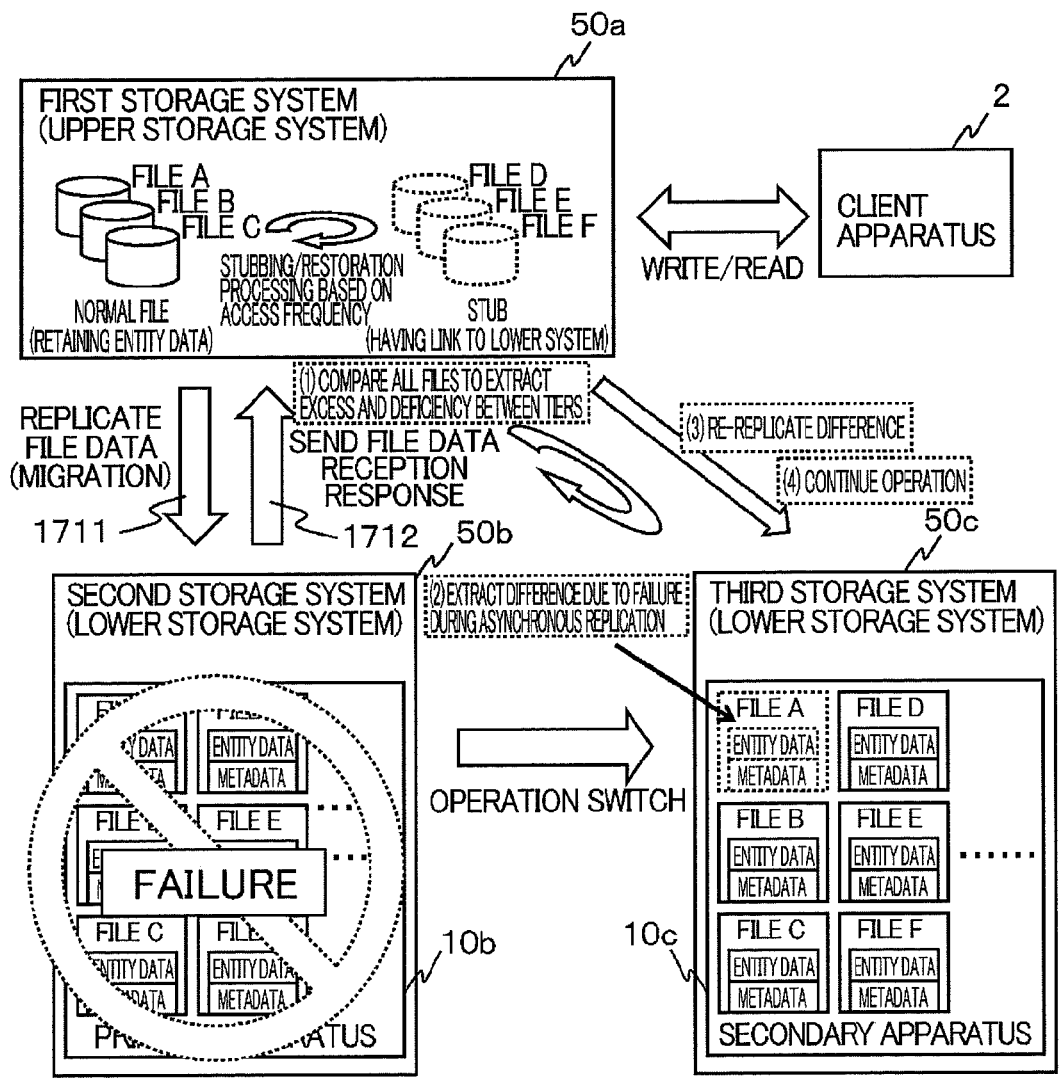
FIG. 16 is a diagram explaining a problem when the remote copy function is realized.

Here, a problem such as the following occurs when the remote copy function is realized in such a manner. Specifically, as shown in FIG. 16, when a failure occurs in the second storage system 50b, it is impossible to know how much replication of the file data to the third storage system 50c is completed at the time of occurrence of the failure. Thus, when, for example, when an attempt to use the third storage system 50c as an alternative (failover) destination of the second storage system 50b, replication of the file data from the first storage system 50a to the third storage system 50c needs to be performed from the beginning, or all the files of which replication is not guaranteed to be completed need to be replicated all over again.

Moreover, stubbing performed in the first storage system 50a (upper storage system) is performed independently of replication by the remote copy function performed in the lower storage systems (second storage system 50b and third storage system 50c). This may cause stubbing of data, of which replication by the remote copy function on the lower storage system side is incomplete. Moreover, when replication of the stubbed file data is interrupted by the failure in the lower storage system, there arises a risk of loss of entity data. To solve such problems, the information processing system 1 of the present embodiment implements the remote copy function in the following manner.

Figure 17:
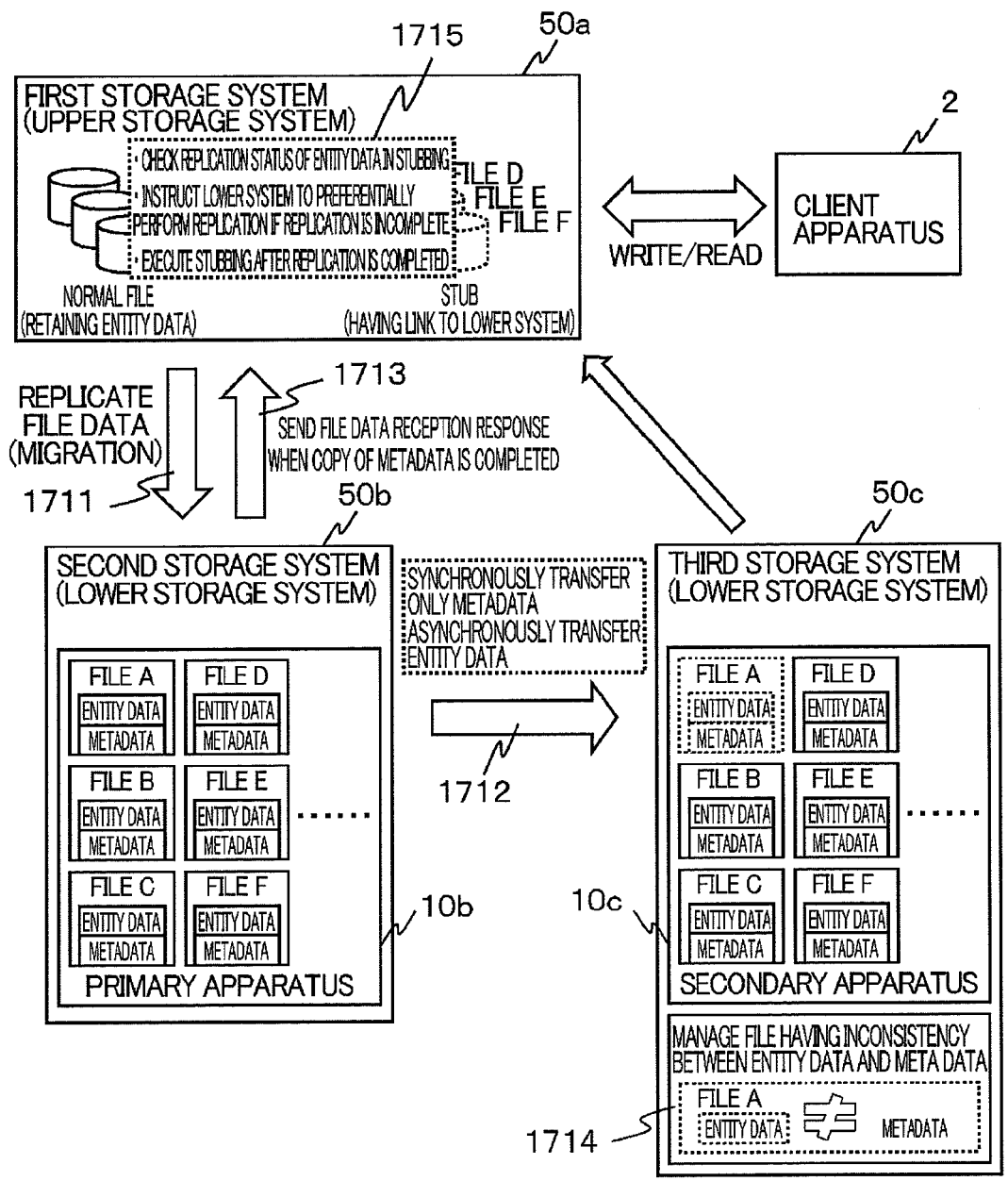
FIG. 17 is a diagram explaining processing when the information processing system 1 is in normal operation.

FIG. 17 schematically shows processing when the information processing system 1 of this embodiment is in normal operation. Unlike the case shown in FIG. 15, the second storage system 50b does not return a reception response immediately to the first storage system 50a even when receiving file data obtained by migration from the first storage system 50a (reference numeral 1711), but first transmits only metadata among the file data to the third storage system 50c immediately using the remote copy function (by synchronous transfer) (reference numeral 1712). Then, after confirming the receipt of a metadata reception response from the third storage system 50c, the second storage system 50b returns a reception response to the first storage system 50a (reference numeral 1713). Thereafter, the second storage system 50b transmits entity data of the file data to the third storage system 50c by asynchronous transfer independently of the metadata (reference numeral 1712).

Meanwhile, the third storage system 50c manages information indicating whether or not the metadata and the entity data are consistent, in other words, whether or not replication of the file data from the second storage system 50b to the third storage system 50c is completed (hereinafter referred to as difference information) for the file data of the files stored in the storage device 17 of its own (reference numeral 1714). In stubbing of the file, the first storage system 50a checks if the metadata and entity data in the file data of the files in the third storage system 50c are consistent, and executes stubbing of the file if the two are consistent but does not execute stubbing of the file if the two are not consistent (reference numeral 1715).

Figure 18:
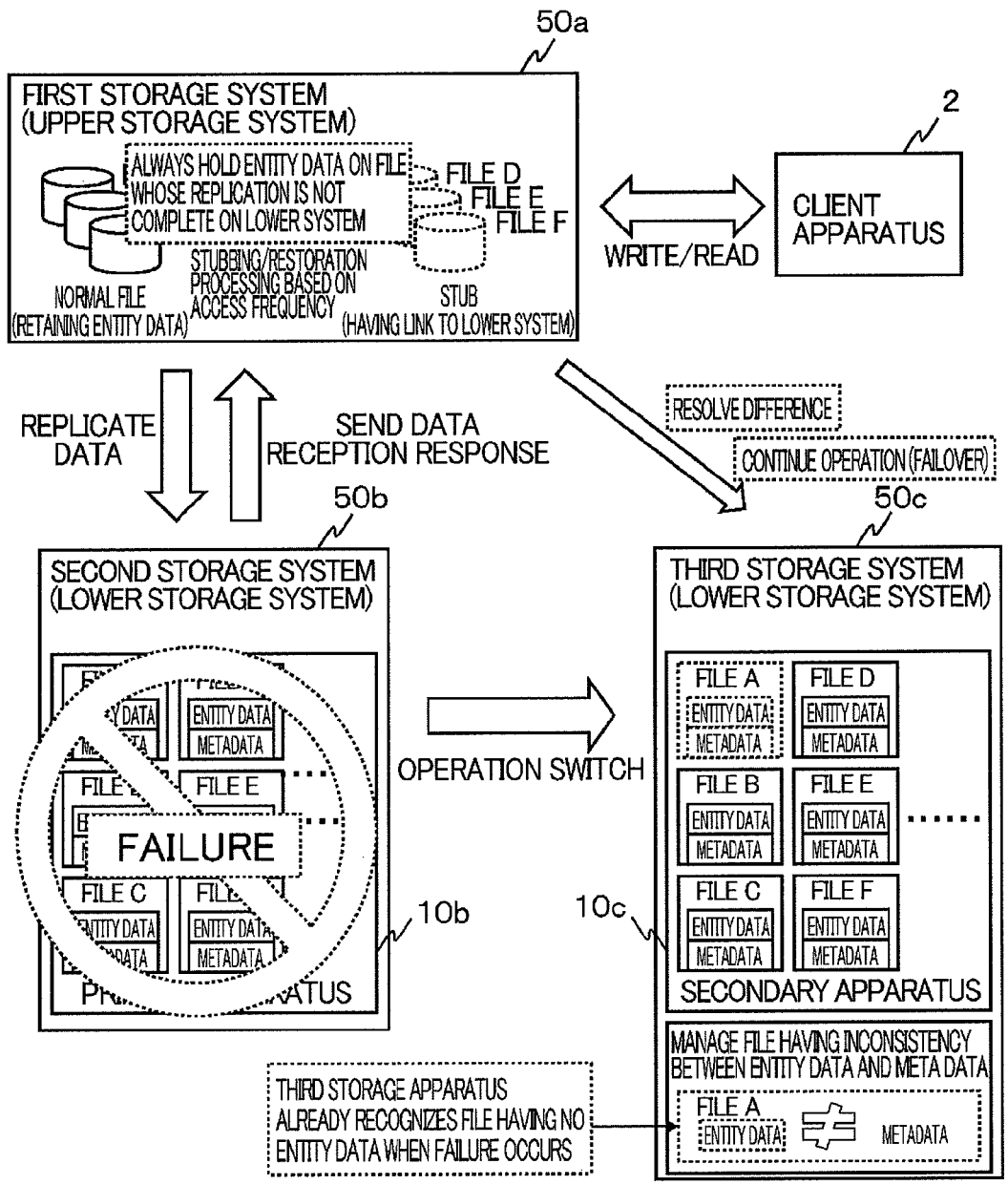
FIG. 18 is a diagram explaining alternative processing (failover) performed when a failure occurs in the second storage system 50b.

Note that, when the remote copy function is implemented in such a manner, substitution (failover) from the function of the second storage system 50b to the third storage system 50c can be quickly completed by quickly locating a file having file data inconsistent between the first and third storage systems 50a and 50c based on the difference information and making the file data consistent between the first and third storage systems 50a and 50c even when a failure occurs in the second storage system 50b as shown in FIG. 18.

Moreover, stubbing of the file is not executed in the first storage system 50a unless replication of the entity data (i.e., migration of the file data) from the second storage system 50b to the third storage system 50c is completed. Therefore, the entity data is always retained in the storage device 17 in the first storage system 50a, which can avoid a situation in which the entity data gets lost.

Hereinafter, detailed description is given of processing performed in the information processing system 1 of the present embodiment configured to implement the remote copy function in such a manner as described above.

=Process Description=

<Read Process>

Figure 19:
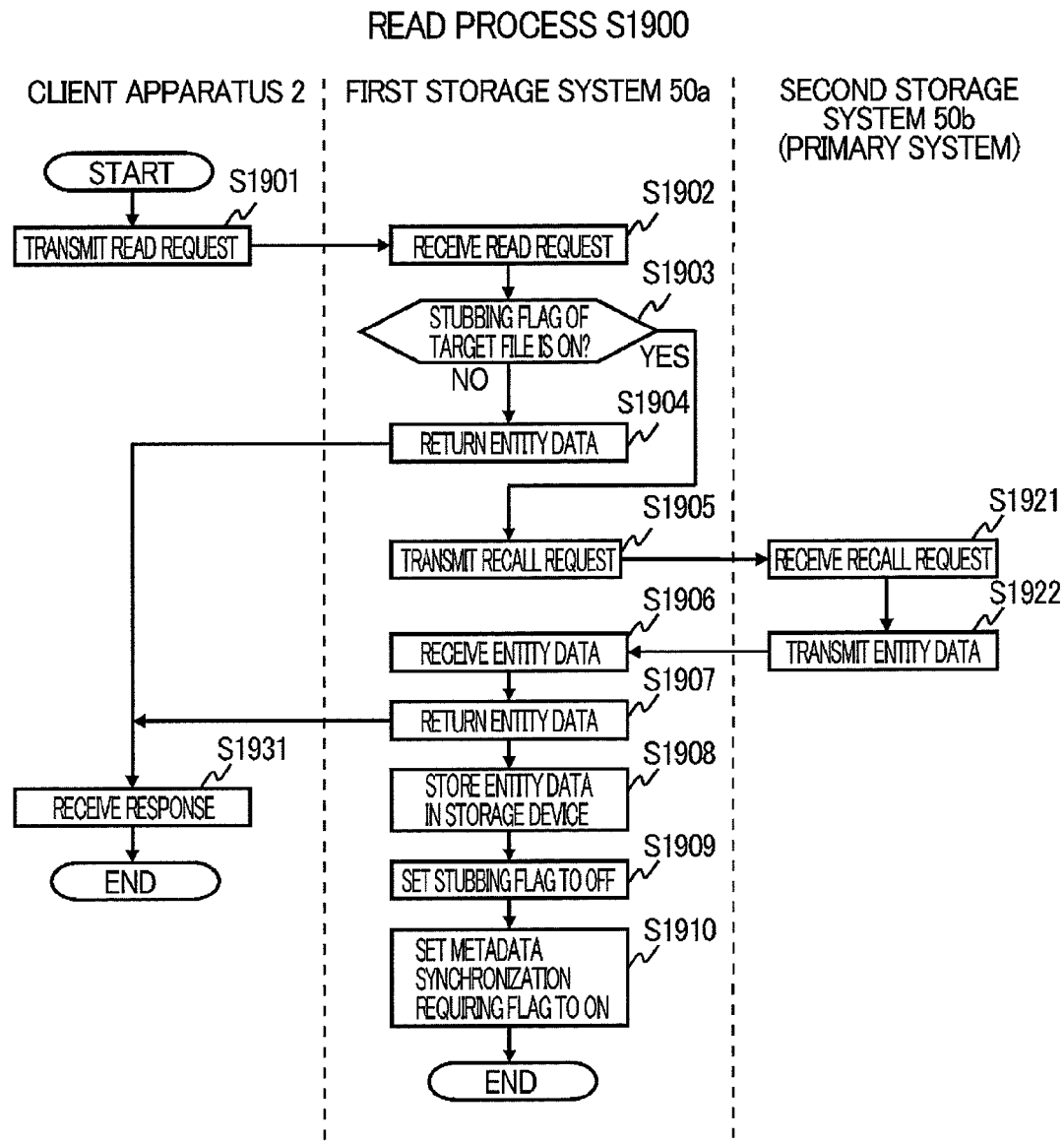
FIG. 19 is a flowchart showing a read process S1900.

FIG. 19 is a flowchart showing a process (hereinafter referred to as a read process S1900) performed in the information processing system 1 when a data read request (hereinafter referred to as a read request) is transmitted from the client apparatus 2 to the first storage system 50a.

Upon receipt of the read request from the client apparatus 2 (S1901, S1902), the first storage system 50a determines whether or not a stubbing flag 1311 of a file as a target of the read request (hereinafter referred to as the target file) is "ON" (whether or not the target file is already stubbed) by referring to the metadata of the target file (S1903). If the stubbing flag 1311 of the target file is "ON" (S1903: YES), the processing proceeds to S1905. On the other hand, if the stubbing flag 1311 of the target file is "OFF" (S1903: NO), the processing proceeds to S1904.

In S1904, the first storage system 50a reads the entity data stored in its own storage device 17, and transmits the read entity data to the client apparatus 2 as a response to the received read request.

In S1905, the first storage system 50a transmits a request to provide entity data of the target data (hereinafter referred to as a recall request) to the second storage system 50b. Upon receipt of the recall request (S1921), the second storage system 50b transmits entity data specified by the recall request to the first storage system 50a (S1922). Note that when transmitting the recall request, the first storage system 50a notifies the second storage system 50b of the information indicating a storage location of the entity data of the target file by referring to the metadata of the target file.

Upon receipt of the entity data from the second storage system 50b, the first storage system 50a transmits the received entity data to the client apparatus 2 as a response to the read request (S1907). Moreover, the first storage system 50a stores the received entity data in its own storage device 17 as the entity data of the target file (S1908). Thereafter, the first storage system 50a sets the stubbing flag 1311 of the target file to "OFF" (S1909), and sets a metadata synchronization requiring flag 1312 of the target file to "ON" (S1910).

The client apparatus 2 receives the entity data transmitted from the first storage system 50a through the processing in S1904 or S1907, as a response to the read request (S1931).

<Write Process>

Figure 20:
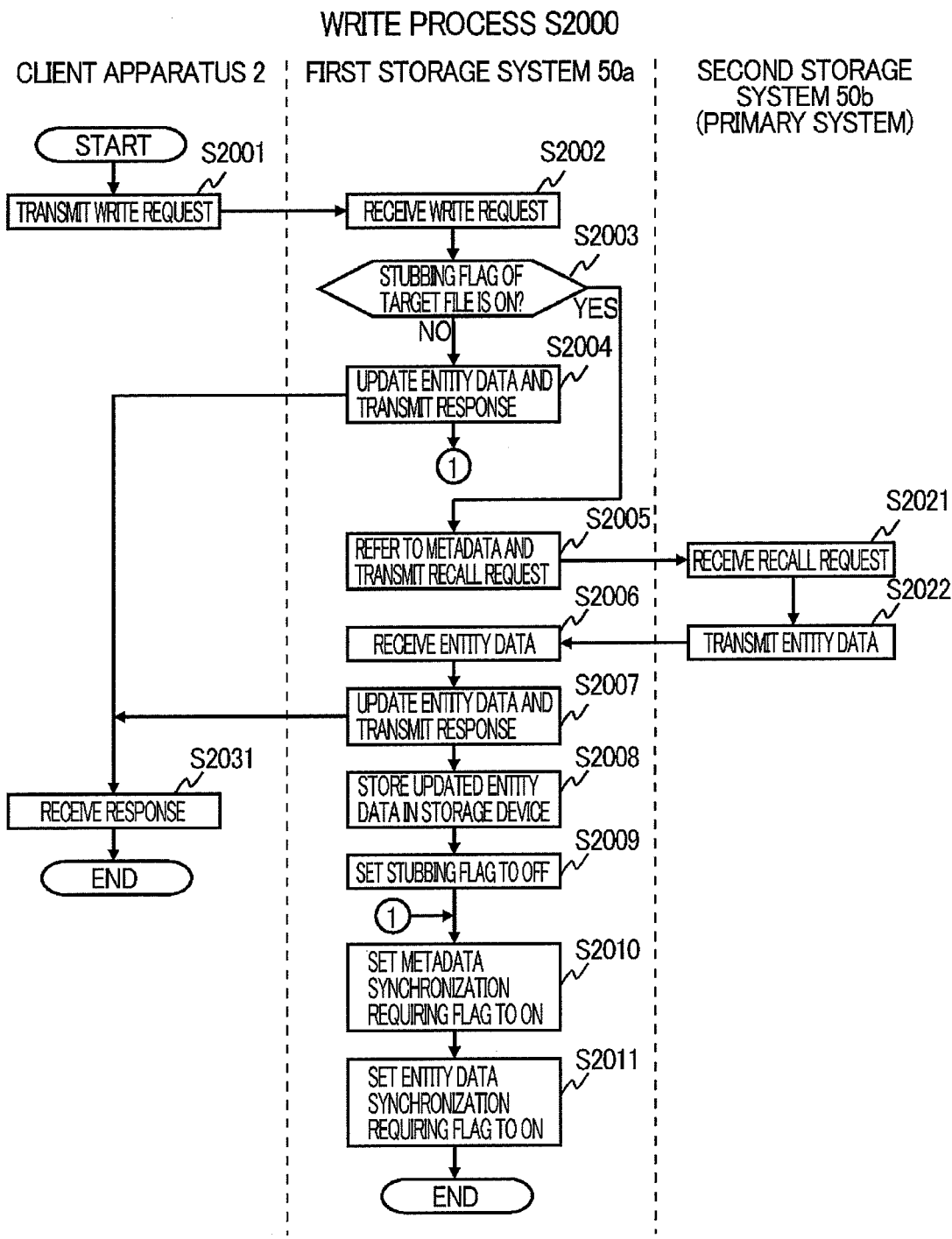
FIG. 20 is a flowchart showing a write process S2000.

FIG. 20 is a flowchart showing a process (hereinafter referred to as a write process S2000) performed in the information processing system 1 when a data write request (hereinafter referred to as a write request) is transmitted from the client apparatus 2 to the first storage system 50a.

Upon receipt of the write request from the client apparatus 2 (S2001, S2002), the first storage system 50a determines whether or not a stubbing flag 1311 of a file as a target of the write request (hereinafter referred to as the target file) is "ON" (whether or not the target file is already stubbed) by referring to the metadata of the target file (S2003). If the stubbing flag 1311 of the target file is "ON" (S2003: YES), the processing proceeds to S2005. On the other hand, if the stubbing flag 1311 of the target file is "OFF" (S2003: NO), the processing proceeds to S2004.

In S2004, the first storage system 50a updates the entity data stored in its own storage device 17, and transmits a response to the write request (completion notification) to the client apparatus 2. The first storage system 50a also executes processing in S2010 and S2011 to be described later.

In S2005, the first storage system 50a transmits a request to provide entity data of the target data (hereinafter referred to as a recall request) to the second storage system 50b. Upon receipt of the recall request (S2021), the second storage system 50b transmits relevant entity data to the first storage system 50a (S2022). Note that when transmitting the recall request, the first storage system 50a notifies the second storage system 50b of the information indicating a storage location of the entity data of the target file by referring to the metadata of the target file.

Upon receipt of the entity data from the second storage system 50b, the first storage system 50a updates the received entity data according to the write request and transmits a response to the write request (completion notification) to the client apparatus 2 (S2007). Moreover, the first storage system 50a stores the updated entity data in its own storage device 17 as the entity data of the target file (S2008), and sets the stubbing flag 1311 of the target file to "OFF" (S2009). Moreover, the first storage system 50a sets a metadata synchronization requiring flag 1910 of the target file to "ON" (S2010), and also sets an entity data synchronization requiring flag 1313 of the target file to "ON" (S2011).

The client apparatus 2 receives the response transmitted by the first storage system 50a through the processing in S2004 or S2007, as a response to the write request (S2031).

<Migration Process (Metadata)>

Figure 21:
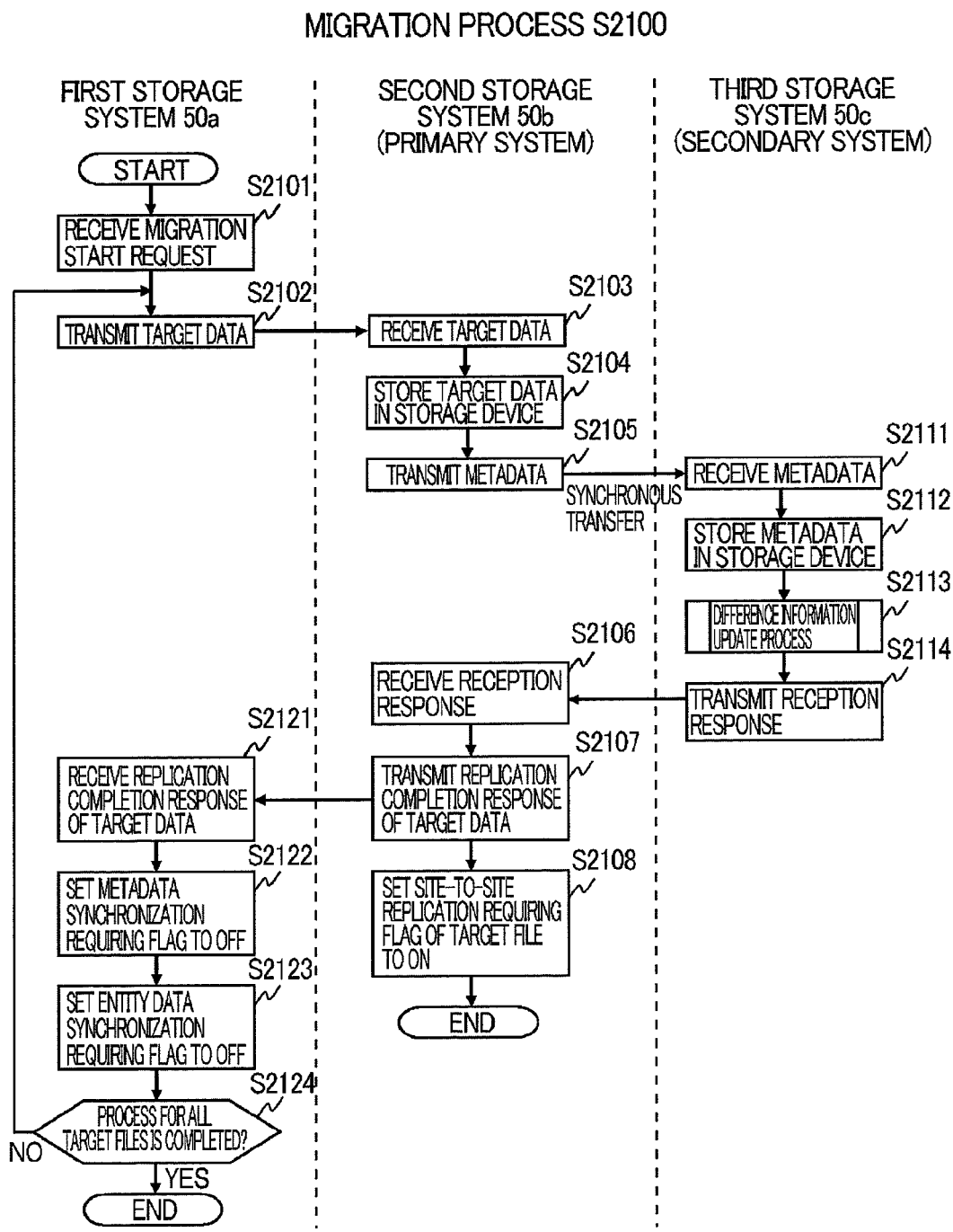
FIG. 21 is a flowchart showing a migration process S2100.

FIG. 21 is a flowchart showing a process of migrating files stored in the storage device 17 in the first storage system 50a to the storage device 17 in the second storage system 50b (primary system) (hereinafter referred to as a migration process S2100). The migration process S2100 is started, for example, when there is a request from the client apparatus 2 or the management apparatus 19. Also, the migration process S2100 is started in response to a request generated inside the first storage system 50a, for example. Description will follow with reference to FIG. 21.

Upon receipt of a request to start the migration process S2100 (S2101), the first storage system 50a transmits file data (hereinafter referred to as target data) of a file (hereinafter referred to as a target file) to be a target of migration, which is specified by the start request, to the second storage system 50b (primary system) (S2102). Note that the target file is specified, for example, by a user or operator operating the client apparatus 2 or the management apparatus 19.

Upon receipt of the target data from the first storage system 50a (S2103), the second storage system 50b stores the target data in its own storage device 17 (S2104). Then, the second storage system 50b transmits (by synchronous transfer) only the metadata immediately to the third storage system 50c (secondary system) (S2105).

Upon receipt of the metadata from the second storage system 50b (S2111), the third storage system 50c stores the received metadata in its own storage device 17 (S2112).

Next, the third storage system 50c executes a process of updating difference information 1412 in the metadata of the target file (hereinafter referred to as a difference information update process S2113). The difference information update process S2113 is described in detail later. After the execution of the difference information update process S2113, the third storage system 50c transmits a metadata reception response to the second storage system 50b (S2114).

Upon receipt of the metadata reception response from the third storage system 50c (S2106), the second storage system 50b transmits, to the first storage system 50a, a response to the effect that replication of the target data is completed (S2107). In this event, the second storage system 50b sets a site-to-site replication requiring flag 1411 of the target data to "ON" (S2108). Note that the site-to-site replication requiring flag 1411 of the target data is set to "ON" as a mark to show that the file is a file to be a target for replicating the entity data in a remote copy process S2300 to be described later.

Upon receipt of the response to the effect that replication of the target data is completed from the second storage system 50b (S2121), the first storage system 50a sets the metadata synchronization requiring flag 1312 of the target file to "OFF", and also sets the entity data synchronization requiring flag of the target file to "OFF" (S2123).

Next, the first storage system 50a determines whether or not the above processing is completed for all the target files specified by the start request received in S2101 (S2124). If the above processing is not completed for all the target files (S2124: NO), the processing returns to S2102 to repeat the above processing for the remaining target files. On the other hand, if the processing is completed for all the target files (S2124: YES), the processing is completed.

As described above, in the migration process S2100, the second storage system 50b, upon receipt of the data (target data) for migration from the first storage system 50a, transmits only the metadata by synchronous transfer to the third storage system 50c for the remote copy function rather than transmitting both the metadata and the entity data to the third storage system 50c (S2105). Then, the second storage system 50b returns a migration completion response to the first storage system 50a when copying of the metadata from the second storage system 50b to the third storage system 50c is completed (S2107).

Here, since the metadata is usually smaller in data size than the entity data, copying from the second storage system 50b to the third storage system 50c can be performed with a lighter load than the case of copying the entire file data (metadata and entity data). Thus, the migration completion response from the second storage system 50b to the first storage system 50a can be returned promptly.

Figure 22:
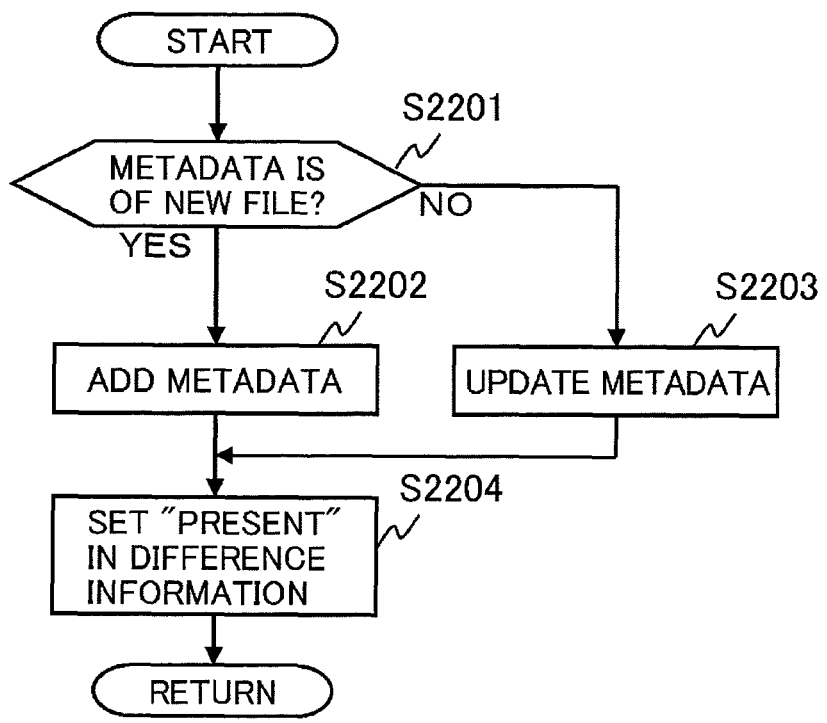
FIG. 22 is a flowchart showing details of a difference information update process S2113.

FIG. 22 is a flowchart showing details of the difference information update process S2113 shown in FIG. 21. The difference information update process S2113 is described below with reference to FIG. 22.

First, the third storage system 50c (secondary system) determines whether or not the metadata received from the second storage system 50b is metadata of a new file (S2201). Note that whether or not the received metadata is the metadata of the new file is determined, for example, by checking whether or not valid metadata corresponding to the received metadata is stored in its own storage device 17.

If the received metadata is the metadata of the new file (S2201: YES), the processing proceeds to S2202. On the other hand, if the received metadata is not the metadata of the new file (S2201: NO), the processing proceeds to S2203.

In S2202, the third storage system 50c stores the received metadata in its own storage device 17 as the metadata of the new file. Thereafter, the processing proceeds to S2204.

In S2203, the third storage system 50c updates the metadata corresponding to the received metadata, which is stored in the storage device 17, to the contents of the received metadata. Thereafter, the processing proceeds to S2204.

In S2204, the third storage system 50c sets "present" in the difference information 1412 of the received metadata.

<Remote Copy of Entity Data>

Figure 23:
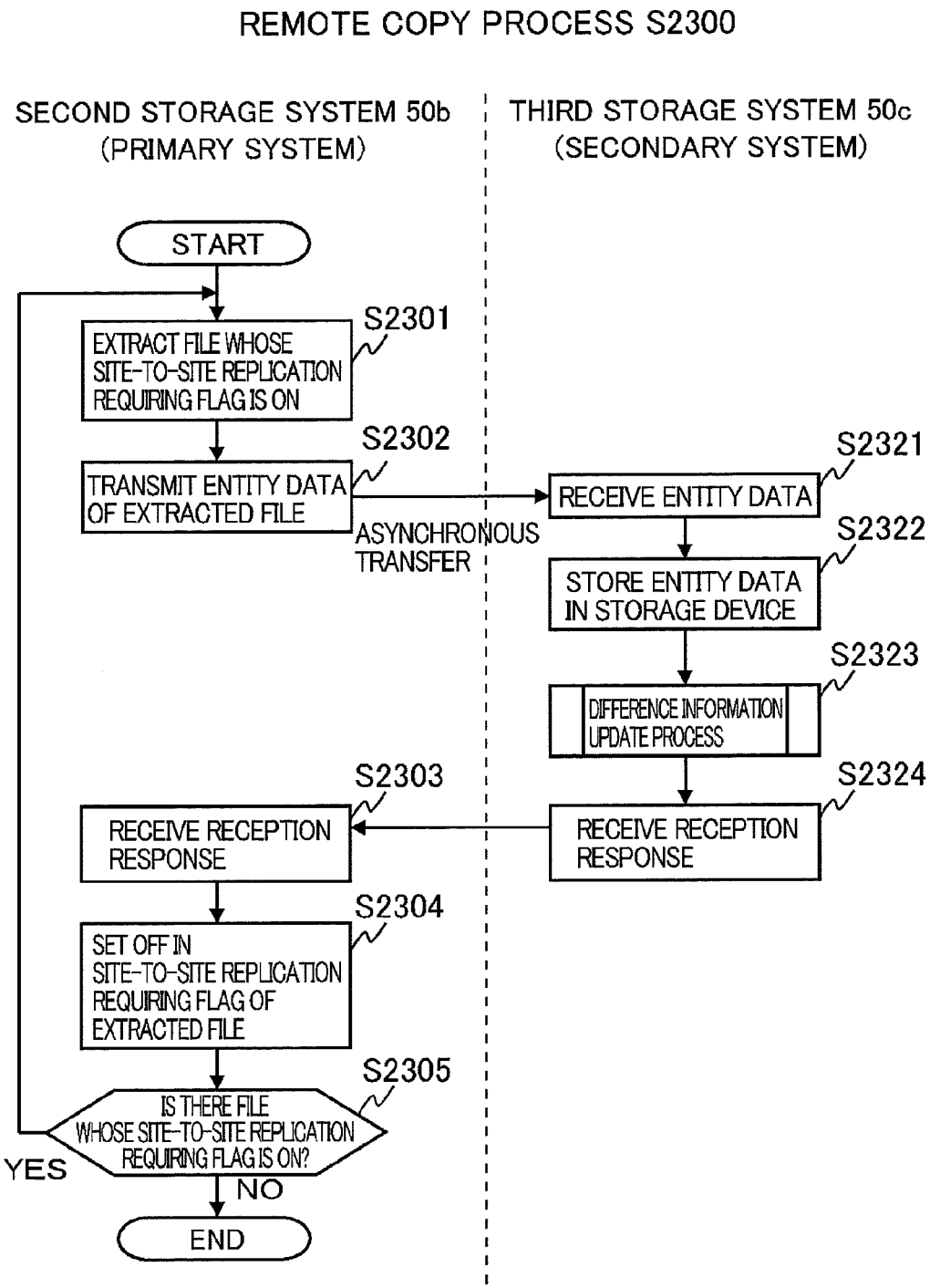
FIG. 23 is a flowchart showing a remote copy process S2300.

FIG. 23 is a flowchart showing a process (hereinafter referred to as a remote copy process S2300) of the second storage system 50b (primary system) migrating the entity data of the file having the site-to-site replication requiring flag 1411 set to "ON" (i.e., the file in which the metadata is migrated to the third storage system 50c (secondary system) through the migration process S2100 in FIG. 21 but the migration of the entity data to the third storage system 50c is not completed) among the target files stored in its own storage device 17.

Note that the remote copy process S2300 is not necessarily started at the timing of reception of the target data from the first storage system 50a (S2103) unlike the metadata described above. The remote copy process S2300 is performed at timing independent of the timing of the reception of the target data from the first storage system 50a, i.e., the process is performed asynchronously. The remote copy process S2300 is described below with reference to FIG. 23.

First, the second storage system 50b (primary system) extracts a file having the site-to-site replication requiring flag 1411 set to "ON" from the files stored in its own storage device 17 (S2301), and transmits entity data of the file extracted (hereinafter referred to as the extracted file) to the third storage system 50c (S2302). Note that, in the extraction, the file may be extracted based on the stubbing priority (the value in stubbing priority 1414). Moreover, the entity data may be transmitted to the third storage system 50c in the order of stubbing priorities.

Upon receipt of the entity data from the second storage system 50b (S2321), the third storage system 50c (secondary system) stores the received entity data in its own storage device 17 (S2322). Then, the third storage system 50c executes a process of updating the difference information 1412 in the metadata of the extracted file (hereinafter referred to as a difference information update process S2323). The difference information update process S2323 is described in detail later.

After executing the difference information update process S2323, the third storage system 50c transmits an entity data reception response to the second storage system 50b (S2324).

Upon receipt of the entity data reception response from the third storage system 50c (S2303), the second storage system 50b sets the site-to-site replication requiring flag 1411 of the extracted file to "OFF" (S2304).

Then, the second storage system 50b determines whether or not there is any file remaining, in its own storage device 17, having the site-to-site replication requiring flag 1411 set to "ON" (S2305). If there is such file remaining (S2305: YES), the processing returns to S2301 to repeat the above processing. On the other hand, if there is no such file remaining (S2305: NO), the processing is terminated.

Figure 24:
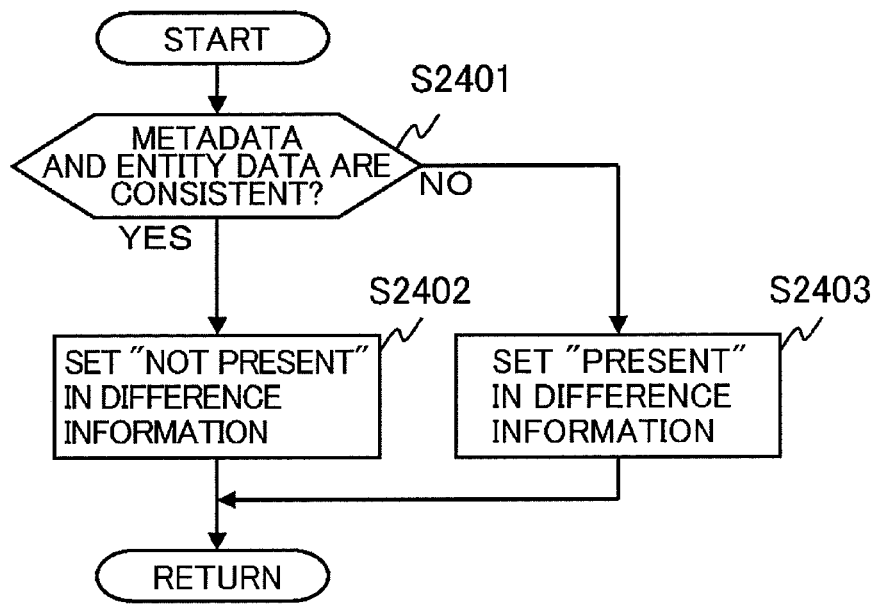
FIG. 24 is a flowchart showing details of a difference information update process S2323.

FIG. 24 is a flowchart showing details of the difference information update process S2323 shown in FIG. 23. The difference information update process S2323 is described below with reference to FIG. 24.

First, the third storage system 50c (secondary system) determines whether or not the entity data stored in its own storage device 17 in S2322 is consistent with the metadata of the entity data stored in its own storage device 17 (S2401). Here, whether or not the entity data and the metadata are consistent is determined, for example, by checking whether or not the hash value obtained for the entity data is identical to the hash value of the metadata (the value in the hash 1216). If the entity data and the metadata are consistent (S2401: YES), "not present" is set in the difference information 1412 (S2402). On the other hand, if the entity data and the metadata are not consistent (S2401: NO), "present" is set in the difference information 1412 (S2403).

<Stubbing Process (Part 1)>

Figure 25:
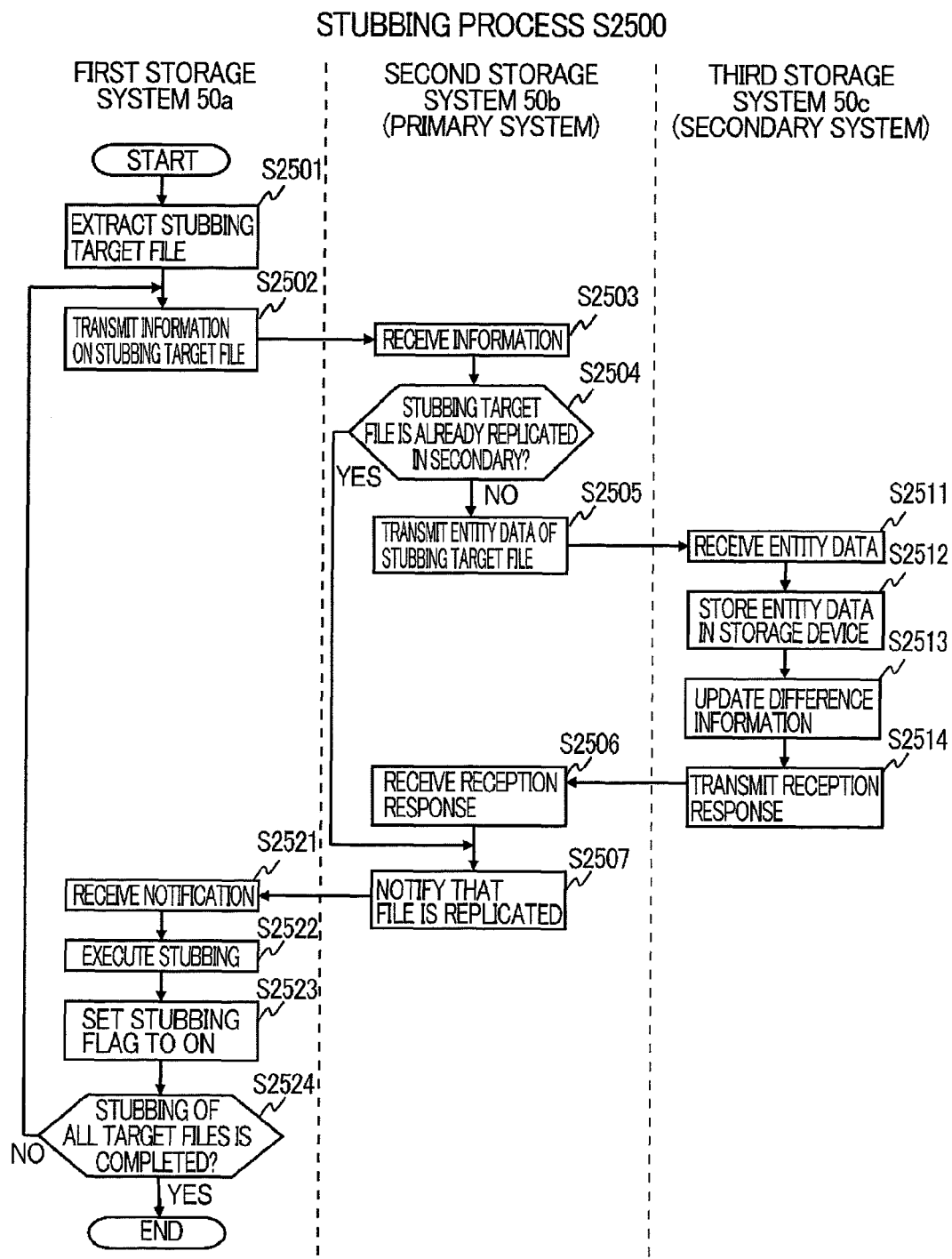
FIG. 25 is a flowchart showing a stubbing process S2500.

FIG. 25 is a flowchart showing an example of a process performed in the information processing system 1 in stubbing of files stored in the storage device 17 of the first storage system 50a (hereinafter referred to as a stubbing process S2500).

The stubbing process S2500 is executed, for example, when, as a trigger, the storage device 17 in the first storage system 50a is running out of free space, and is executed until a free space of a predetermined data size or more is reserved in the storage device 17, for example. Moreover, the stubbing process S2500 is executed when, as a trigger, the user or operator performs a predetermined operation with the client apparatus 2 or the management apparatus 19 or when, as a trigger, the first storage system 50a detects that the remaining capacity of the storage device 17 has reached a preset threshold or less. The stubbing process S2500 is described below with reference to FIG. 25.

First, the first storage system 50a extracts a file as a target of stubbing (hereinafter referred to as a stubbing target file) (S2501). Note that the first storage system 50a extracts the stubbing target files in the order of the final update date/time (the value in the update date/time 1214) starting from the oldest date/time. Moreover, the first storage system 50a extracts the stubbing target files according to the stubbing priority, for example.

After extracting the stubbing target files, the first storage system 50a transmits information specifying the extracted stubbing target file (e.g., contents of metadata of the stubbing target file) to the second storage system 50b (primary system) (S2502).

Upon receipt of the information specifying the stubbing target file from the first storage system 50a (S2503), the second storage system 50b reads the metadata of the stubbing target file from its own storage device 17, and determines whether or not the file data of the stubbing target file is already replicated to the third storage system 50c by referring to the difference information 1412 in the read metadata (S2504). If the file data (metadata and entity data) of the stubbing target file is already replicated (S2504: YES), the processing proceeds to S2507. On the other hand, if the file data of the stubbing target file is not replicated yet (S2504: NO), the entity data of the stubbing target file is transmitted to the third storage system 50c (secondary system) (S2505).

Upon receipt of the entity data of the stubbing target file from the second storage system 50b (S2511), the third storage system 50c stores the received entity data in its own storage device 17 (S2512). Next, the third storage system 50c sets "not present" in the difference information 1412 in the metadata of the stubbing target file stored in its own storage device 17 (S2513), and transmits an entity data reception response to the second storage system 50b (S2514).

The second storage system 50b receives the reception response transmitted from the third storage system 50c (S2506). Thereafter, the processing proceeds to S2507.

In S2507, the second storage system 50b notifies the first storage system 50a that the file data of the stubbing target file is already replicated.

Upon receipt of the notification (S2521), the first storage system 50a executes stubbing of the stubbing target file (S2522), and sets the stubbing flag 1311 of the stubbing target file to "ON" (S2522). Note that the stubbing is performed, for example, by invalidating the entity data of the stubbing target file stored in the storage device 17 in the first storage system 50a (i.e., by releasing the storage area).

Next, the first storage system 50a determines whether or not the processing is completed for all the stubbing target files extracted in S2501 (S2524). If the processing is not completed (S2524: NO), the processing returns to S2502 to repeat the same processing for the stubbing target file yet to be stubbed. On the other hand, if the processing is completed (S2524: YES), the stubbing process S2500 is completed.

As described above, in the stubbing process S2500, the second storage system 50b determines whether or not the file data of the stubbing target file is already replicated to the third storage system 50c (S2504), and the entity data of the stubbing target file is replicated to the third storage system 50c (S2505, S2511, S2512) if the file data thereof is not replicated yet (S2504: NO). Thus, in stubbing of the stubbing target files, replication of the file data can be completed at the same time. Moreover, such stubbing of files in the first storage system 50a is performed only when it is confirmed that the entity data is replicated to the third storage system 50c. Thus, the entity data is always retained in the information processing system 1. This makes it possible to avoid a situation in which the entity data is lost, even when a failure occurs in the second storage system 50b, for example.

<Stubbing Process (Part 2)>

Figure 26:
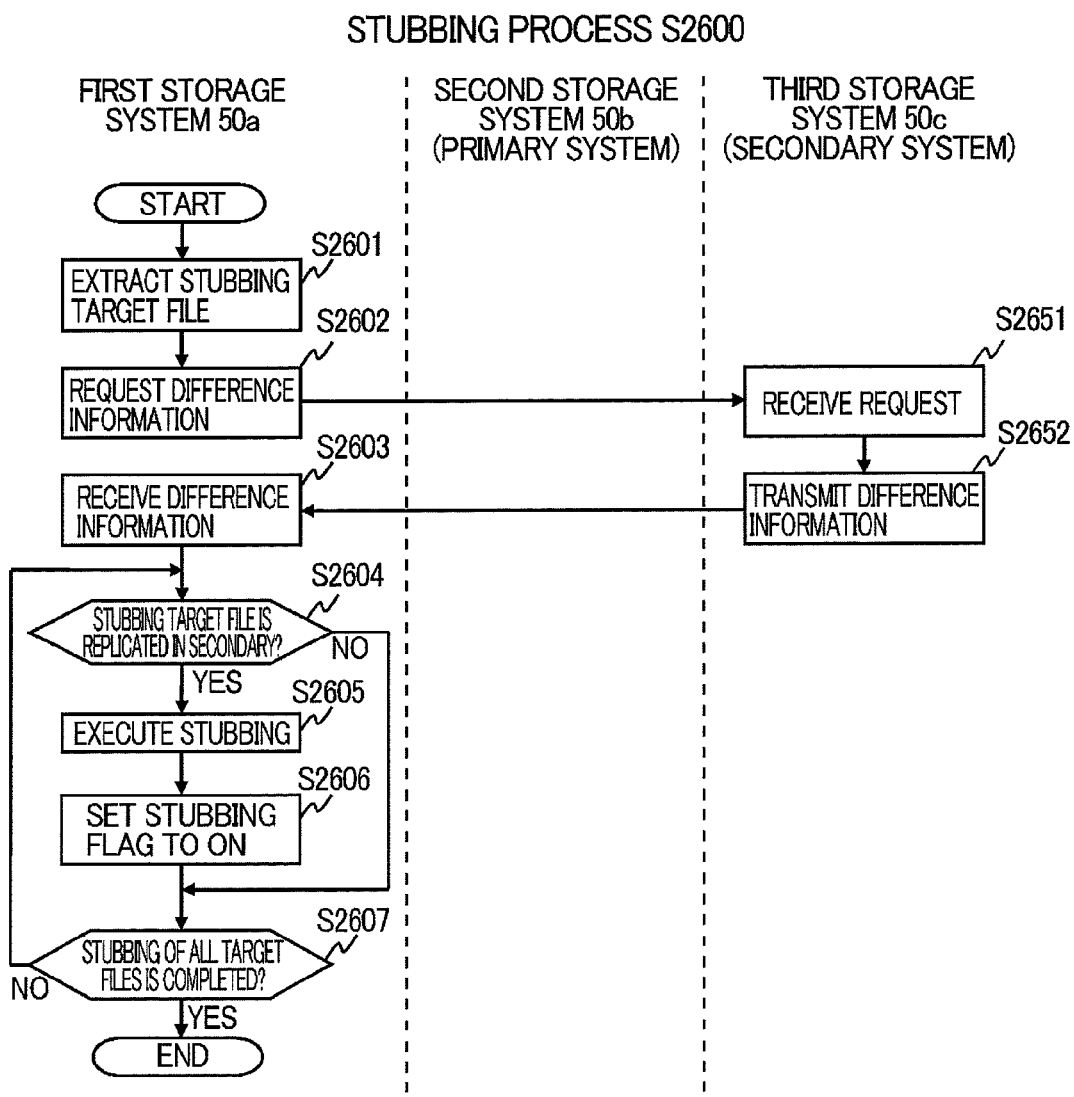
FIG. 26 is a flowchart showing a stubbing process S2600.

FIG. 26 is a flowchart showing another example of a process performed in the information processing system 1 in stubbing of files stored in the storage device 17 of the first storage system 50a (hereinafter referred to as a stubbing process S2600). The trigger for starting stubbing process S2600 is at the same timing as the stubbing process S2500. The stubbing process S2600 is described below with reference to FIG. 26.

First, the first storage system 50a extracts a file as a target of stubbing (hereinafter referred to as a stubbing target file) (S2601). Note that the first storage system 50a, for example, extracts the stubbing target files in the order of the final update date/time (the value in the update date/time 1214) starting from the oldest date/time. Moreover, the first storage system 50a extracts the stubbing target files according to the stubbing priority, for example.

Next, the first storage system 50a requests for difference information 1412 of the stubbing target file from the third storage system 50c (S2602). Upon receipt of the request (S2651), the third storage system 50c transmits the difference information 1412 of the requested file to the first storage system 50a (S2652).

Upon receipt of the difference information 1412 transmitted by the third storage system 50c, the first storage system 50a determines whether or not the entity data of the stubbing target file is already replicated to the third storage system 50c (whether or not "not present" is set in the difference information 1412 of the stubbing target file) based on the difference information 1412 (S2604). If the file data of the stubbing target file is already replicated to the third storage system 50c (S2604: YES), the processing proceeds to S2605. On the other hand, if the file data of the stubbing target file is not replicated yet (S2604: NO), the processing proceeds to S2607.

In S2605, stubbing of the stubbing target file is executed (S2605), and the stubbing flag 1311 of the stubbing target file is set to "ON" (S2606).

In S2607, it is determined whether or not the processing has been performed for all the stubbing target files extracted in S2601 (S2607). If there are unprocessed stubbing target files (S2607: NO), the processing returns to S2604. On the other hand, if there is no more unprocessed stubbing target file (S2607: YES), the stubbing process S2600 is terminated.

As described above, in the stubbing process S2600, the stubbing of files in the first storage system 50a is performed only when it is confirmed that the entity data is replicated to the third storage system 50c (S2604: YES). Thus, the entity data is always retained in the information processing system 1. This makes it possible to avoid a situation in which the entity data is lost, even when a failure occurs in the second storage system 50b, for example.

Moreover, the first storage system 50a acquires beforehand the difference information 1412 of the stubbing target file from the third storage system 50c, and determines whether or not the entity data of the stubbing target file is already replicated to the third storage system 50c. This makes it possible to suppress the load on the second and third storage systems 50b and 50c in the stubbing. Thus, when the first storage system 50a has high processing performance, for example, the load caused by stubbing can be concentrated on the first storage system 50a. As a result, the information processing system 1 can be efficiently and properly operated.

<Failover Process>

Figure 27:
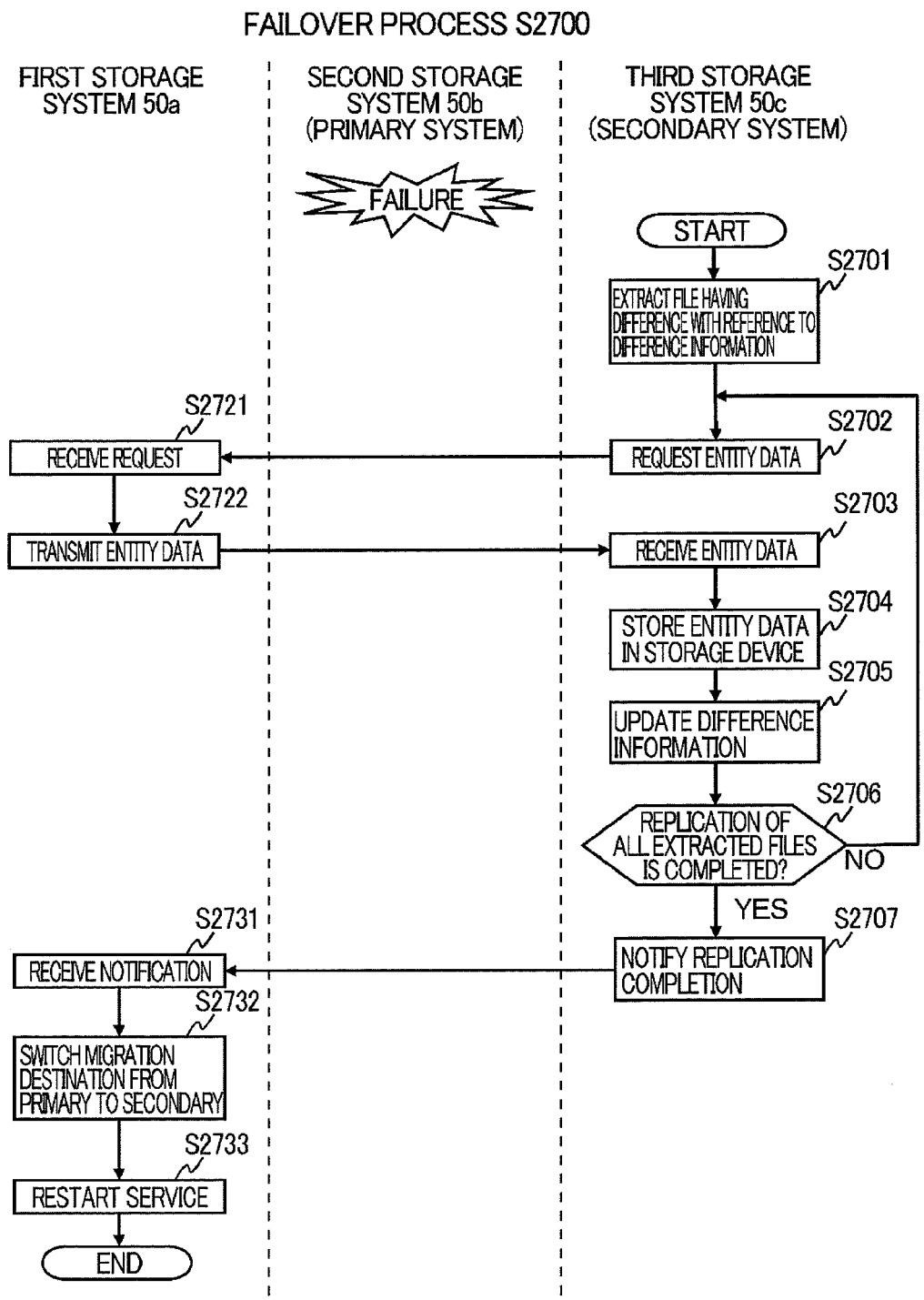
FIG. 27 is a flowchart showing a failover process S2700.

FIG. 27 is a flowchart showing a process performed in the information processing system 1 when a failure occurs in the second storage system 50b (hereinafter referred to as a failover process S2700). The failover process S2700 is described below with reference to FIG. 27.

First, the third storage system 50c extracts all the files having "present" set in the difference information 1412 by referring to the metadata of the files stored in its own storage device 17 (S2701). Next, the third storage system 50c requests for entity data of the extracted files from the first storage system 50a (S2702).

Upon receipt of the request (S2721), the first storage system 50a transmits the entity data of the requested file to the third storage system 50c (S2722).

Upon receipt of the entity data from the first storage system 50a (S2703), the third storage system 50c stores the received entity data in its own storage device 17 (S2704), and sets "not present" in the difference information 1412 of the file (S2705).

Thereafter, the third storage system 50c determines whether or not replication (acquisition) of the entity data is completed for all the files extracted in S2701 (S2706). If replication of the entity data is completed for all the extracted files (S2706: YES), the processing proceeds to S2707. On the other hand, if replication of the entity data is not completed for all the extracted files (S2706: NO), the processing returns to S2702.

In S2707, the third storage system 50c notifies the first storage system 50a that the replication of the entity data has completed for all the files (the difference of the file between the first and third storage systems 50a and 50c is resolved).

Upon receipt of the notification (S2731), the first storage system 50a switches the setting of file migration destination from the second storage system 50b to the third storage system 50c, and then restarts the service to the client apparatus 2

(S2732, S2733). In the above switching, for example, switching the access right to the storage device 17, which was set to the third storage system 50*c*, and the like are performed.

As described above, in the information processing system 1 of the present embodiment, the situation of replicating of the file data from the second storage system 50*b* to the third storage system 50*c* is managed as the difference information 1412 in the third storage system 50*c*. Thus, when the third storage system 50*c* substitutes (performs failover) for the functions of the second storage system 50*b* in which the failure occurs, a difference in file data between the first and third storage systems 50*a* and 50*c* can be easily figured out. As a result, the substitution (failover) of the third storage system 50*c* for the functions of the second storage system 50*b* and preparations (setup) thereof can be quickly done. Thus, the impact on user services can be suppressed.

=Method for Extracting Stubbing Target File=

To extract the stubbing target file in the stubbing process (stubbing process S2500 or stubbing process S2600) described above, there is a method for extracting files in the order of final update date/time (the value in the update date/time 1214) starting from the oldest date/time, for example.

However, in this method, since the stubbing target file is extracted based on only the final update date/time, there is a case where stubbing is not properly performed in terms of securing the capacity or performance of the storage device 17. For example, when the stubbing target file is extracted based on only the final update date/time, many files of small file size may be stubbed. In such a case, the effect of securing the capacity is small, and there is a possibility that recalls occur frequently for the read request. Accordingly, from the viewpoint of maintaining the performance, it cannot necessarily be said that stubbing is properly performed. Moreover, stubbing based on the final update date/time, for example, there is a case where a file that should not necessarily be stubbed, such as a file that is not recently accessed but regularly accessed, is stubbed. In contrast, there is also a case where a file is left unstubbed even though it is preferable to stub the file, such as a file that happens to be recently accessed but is hardly accessed in the long term.

Figure 28:
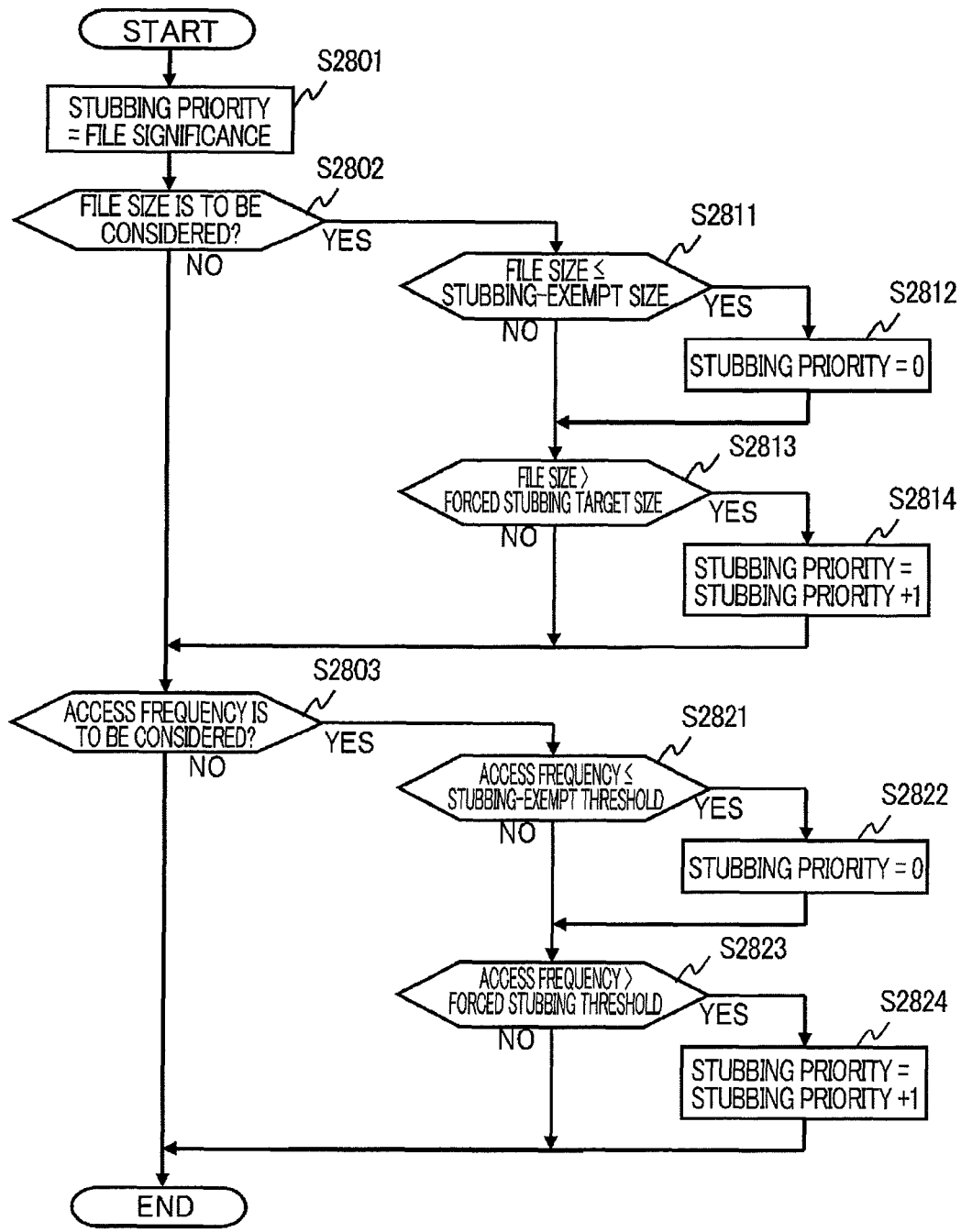
FIG. 28 is a flowchart showing a stubbing priority setting process S2800.

FIG. 28 shows an example of a stubbing priority setting process (hereinafter referred to as a stubbing priority setting process S2800) configured to determine the stubbing priority based on the file significance (the value in the file significance 1316 of the metadata), file size (the value in the size 1215) and the file access frequency (the value in the access frequency 1318) to solve the problem described above. Note that the stubbing priority setting process S2800 is executed regularly or at predetermined timing, for example, by the first storage system 50*a*.

First, the first storage system 50*a* reads the value in the file significance 1316 of the metadata of the file whose stubbing priority is to be determined (hereinafter referred to as a setting target file), and sets the read value as an initial value of the stubbing priority (S2801).

Next, the first storage system 50*a* determines whether or not to take into consideration the file size of the file when determining the stubbing priority of the setting target file. This determination is made, for example, based on the policy 323 set for the setting target file. Note that the policy 323 may be collectively set for a plurality of files or may be individually set for each of the files. If the file size is taken into consideration (S2802: YES), the processing proceeds to S2811. On the other hand, if the file size is not taken into consideration (S2802: NO), the processing proceeds to S2803.

The processing from S2811 to S2814 is performed referring to the stubbing determination table (file size) 324 shown in FIG. 29. As shown in FIG. 29, in the stubbing determination table (file size) 324, three values are registered, including stubbing-exempt size 3241, forced stubbing target size 3242 and readjustment range of stubbing-exempt file size 3243. Note that these values are set, for example, by the user or operator operating the client apparatus 2 or the management apparatus 19.

Among the above three, the stubbing-exempt size 3241 is a threshold to be compared with the file size in order to determine whether or not the setting target file is to be exempt from stubbing. Moreover, the forced stubbing target size 3242 is a threshold to be compared with the file size in order to determine whether or not the setting target file is forced to be a target for stubbing.

The readjustment range of stubbing-exempt file size 3243 is a value (borderline) to be referred to for readjusting the stubbing-exempt size 3241. The first storage system 50*a* appropriately adjusts the value in the stubbing-exempt size 3241 within the readjustment range 3243 of stubbing-exempt file size. For example, when the remaining capacity of the storage device 17 does not exceed the preset threshold even though stubbing is performed, the first storage system 50*a* adjusts the value in the forced stubbing target size 3242 within the readjustment range of stubbing-exempt file size 3243 (e.g., lowers the value in the forced stubbing target size 3242).

In S2811, the first storage system 50*a* determines whether or not the file size (the value in the size 1215) of the setting target file is not more than the stubbing-exempt size 3241. If the file size of the setting target file is not more than the stubbing-exempt size 3241 (S2811: YES), "0" is set to the stubbing priority 1317 of the setting target file, and then the processing proceeds to S2813. On the other hand, if the file size of the setting target file exceeds the stubbing-exempt size 3241 (S2811: NO), the processing proceeds to S2813.

In S2813, the first storage system 50*a* determines whether or not the file size of the setting target file exceeds the forced stubbing target size 3242. If the file size of the setting target file exceeds the forced stubbing target size 3242 (S2813: YES), the value of the stubbing priority 1317 is incremented (+1) (S2814), and then the processing proceeds to S2803. On the other hand, if the file size of the setting target file is not more than the forced stubbing target size 3242 (S2813: NO), the processing proceeds to S2803.

In S2803, the first storage system 50*a* determines whether or not to take into consideration the access frequency of the setting target file when determining the stubbing priority of the setting target file. This determination is made, for example, based on the contents of the policy 323 set for the setting target file. If the access frequency is taken into consideration (S2803: YES), the processing proceeds to S2821. On the other hand, if the access frequency is not taken into consideration (S2803: NO), the processing is terminated.

The processing from S2821 to S2824 is performed referring to the stubbing determination table (access frequency) 325 shown in FIG. 30. As shown in FIG. 30, in the stubbing determination table (access frequency) 325, three values are registered, including measurement period 3251, forced stubbing target threshold 3252 and stubbing-exempt threshold 3253. Note that these values are set, for example, by the user or operator operating the client apparatus 2 or the management apparatus 19.

Among the above three, the measurement period 3251 is a measurement period of access frequency to be determined (access frequency within the measurement period is set to be a target for comparison). The forced stubbing target threshold 3252 is a threshold to be compared with the access frequency in order to determine whether or not the setting target file is forced to be a target for stubbing. Moreover, the stubbing-exempt threshold 3253 is a threshold to be compared with the access frequency in order to determine whether or not the setting target file is to be exempt from stubbing.

In S2821, the first storage system 50a determines whether or not the access frequency (the value in the access frequency 1213) of the setting target file exceeds the stubbing-exempt size threshold 3253. If the access frequency of the setting target file exceeds the stubbing-exempt size threshold 3253 (S2821: YES), "0" is set to the stubbing priority 1317 of the setting target file, and then the processing proceeds to S2823. On the other hand, if the access frequency of the setting target file is not more than the stubbing-exempt size threshold 3253 (S2821: NO), the processing proceeds to S2823.

In S2823, the first storage system 50a determines whether or not the access frequency of the setting target file exceeds the forced stubbing target threshold 3252. If the access frequency of the setting target file exceeds the forced stubbing target threshold 3252 (S2823: YES), the value of the stubbing priority 1317 is incremented (+1) (S2824), and then the processing is terminated. On the other hand, if the access frequency of the setting target file is not more than the forced stubbing target threshold 3252 (S2823: NO), the processing is terminated.

As described above, in the stubbing priority setting process S2800, since the stubbing priority of the file is determined while taking into consideration the file size and the access frequency, stubbing can be properly performed in terms of securing the capacity and performance.

Figure 31:
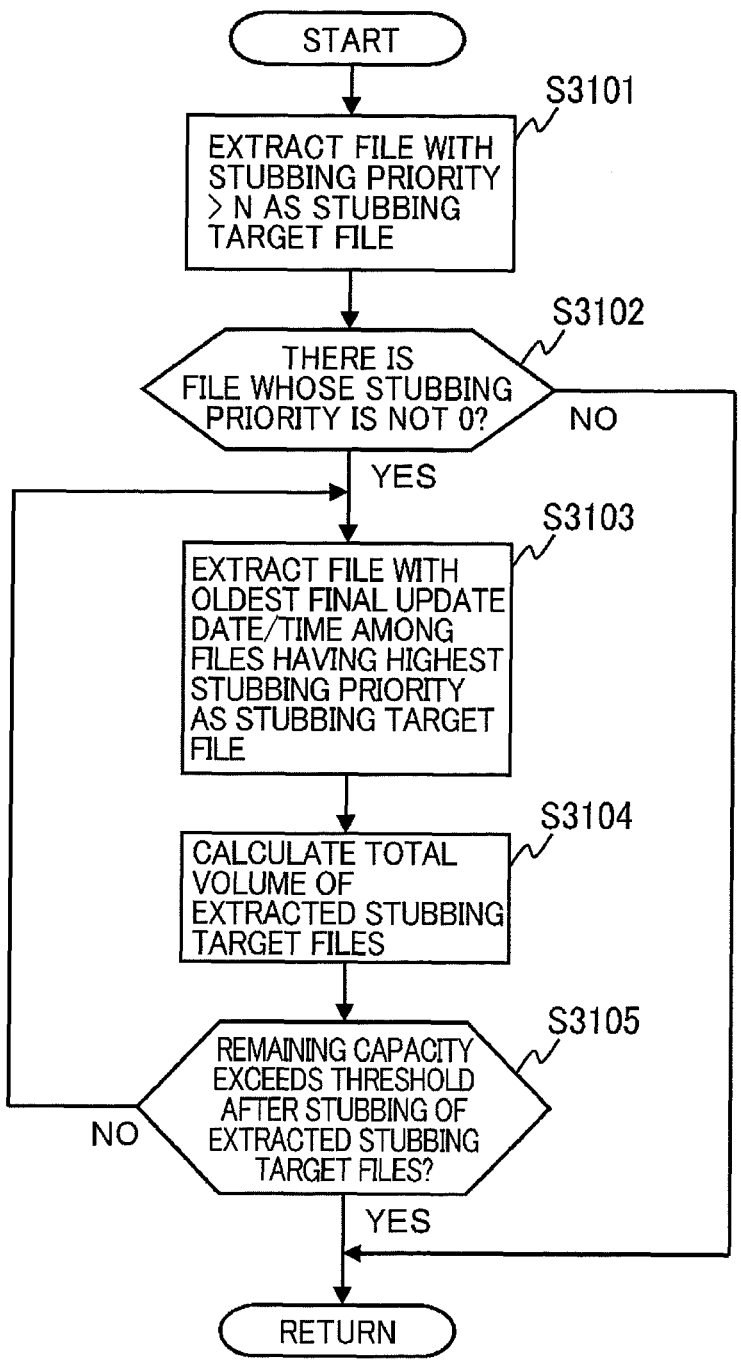
FIG. 31 is a flowchart showing a stubbing target file extraction process S3100.

FIG. 31 is a flowchart showing a process of extracting a stubbing target file based on the stubbing priority set as described above (hereinafter referred to as a stubbing target file extraction process S3100). The stubbing target file extraction process S3100 is executed as a process in S2501 shown in FIG. 25 or as a process in S2601 shown in FIG. 26.

First, the first storage system 50a extracts a file whose stubbing priority exceeds the preset value "N" as a stubbing target file, and writes it into the stubbing execution target list 362 (S3101).

Figures 32, 33:
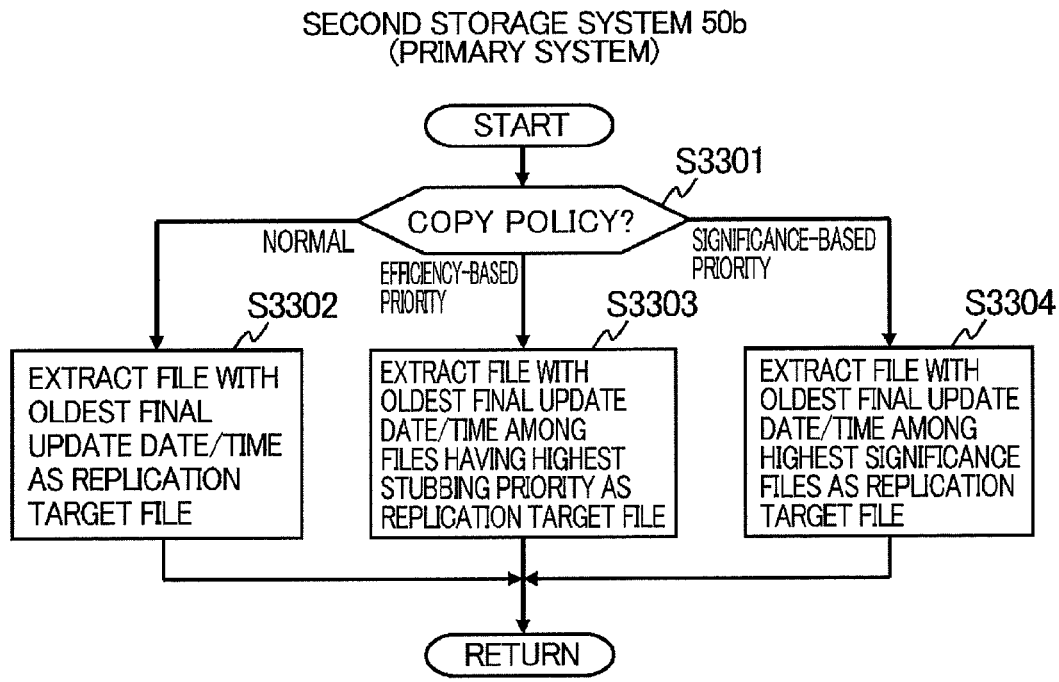
FIG. 32 is a diagram showing an example of a stubbing execution target list 362.
FIG. 33 is a flowchart showing a copy target file extraction process S3300.

FIG. 32 shows an example of the stubbing execution target list 362. As shown in FIG. 32, in the stubbing execution target list 362, information specifying the stubbing target file is set.

In file name 3621, a file name of the stubbing target file is set. In path 3622, a path name indicating a storage location of the stubbing target file is set. In stubbing priority 3623, the stubbing priority of the stubbing target file (the value in the stubbing priority 1317) is set. In size 3624, a file size of the stubbing target file (the value in the size 1215) is set.

Next, the first storage system 50a checks if there exists a file whose stubbing priority is not "0" (hereinafter referred to as a remaining file) in the files other than the files stored in its own storage device 17 and extracted in S3101 (S3102). If there exists such file (S3102: YES), the processing proceeds to S3103. On the other hand, if there is no such file (S3102: NO), the stubbing target file extraction process S3100 is terminated.

In S3103, the first storage system 50a extracts, as a stubbing target file, a file having the highest stubbing priority and the oldest final update date/time (the value in the update date/time 1214) among the remaining files, and writes it into the stubbing execution target list 362 (S3104).

Next, the first storage system 50a adds up the file sizes of the stubbing target files written in the stubbing execution target list 362, and determines whether or not the value obtained by adding the total value to the current remaining capacity of its own storage device 17 (hereinafter referred to as the total remaining capacity) exceeds the preset threshold (S3105). If the total remaining capacity exceeds the threshold described above (S3105: YES), the processing is terminated. On the other hand, if the total remaining capacity is not more than the threshold (S3105: NO), the processing returns to S3103 to extract another file as a stubbing target file and repeats the processing until the total remaining capacity exceeds the threshold.

=Stubbing Priority/Remote Copy According to File Significance=

In replicating of the entity data from the second storage system 50b to the third storage system 50c (remote copy process S2300 in FIG. 23), which is performed by asynchronous transfer in the remote copy function described above, a file to be replicated (hereinafter referred to as a replication target file) can also be extracted according to the value of stubbing priority or file significance.

FIG. 33 is a flowchart showing a process of extracting the replication target file (hereinafter referred to as a replication target file extraction process S3300) in such a case. Note that after the file having the site-to-site replication requiring flag 1411 set to "ON" is extracted in S2301 shown in FIG. 23, the replication target file extraction process S3300 is performed, for example, for the file extracted in S2301 before the entity data is transmitted to the third storage system 50c in S2302. The replication target file extraction process S3300 is described below with reference to FIG. 33.

First, the second storage system 50b examines the contents of the replication policy 353. If "normal" is set in the replication policy 353 (normal: S3301), the processing proceeds to S3302. If "efficiency-based priority" is set in the replication policy 353 (efficiency-based priority: S3301), the processing proceeds to S3303. If "significance-based priority" is set in the replication policy 353 (significance-based priority: S3301), the processing proceeds to S3304.

In S3302, the second storage system 50b extracts a file having the oldest final update date/time (the value in the update date/time 1214), among the files extracted in S2301 shown in FIG. 23, as the replication target file.

In S3303, the second storage system 50b extracts a file having the highest stubbing priority (the value in the stubbing priority 1414) and having the oldest final update date/time (the value in the update date/time 1214), among the files extracted in S2301 shown in FIG. 23, as the copy target file.

Note that, in this case, the file significance (the value in the file significance 1413) may be also taken into consideration and a file having a higher stubbing priority and lower significance may be preferentially extracted as the replication target file. In this way, the stubbing priority order on the upper storage system side is set to be identical to the priority order of replicating by the remote copy function on the lower storage system side. Accordingly, the low-significance file which is stubbed in the upper storage system and has the entity data no longer managed can be preferentially and redundantly managed on the lower storage system side. Thus, low-significance files can also be securely managed.

Moreover, when the stubbing priority order on the upper storage system side is identical to the replication priority order on the lower storage system side as described above, a time difference between the stubbing timing and the replication timing is reduced. Thus, stubbing may be performed for the stubbing target files extracted based on the stubbing priority without checking whether or not the stubbing target file is already replicated to the third storage system 50c in the stubbing process S2500 shown in FIG. 25 or in the stubbing process S2600 shown in FIG. 26. Accordingly, the overhead can be reduced for the time required to check whether or not the stubbing target file is already replicated to the third storage system 50c.

In S3304, the second storage system 50b extracts a file having the highest stubbing significance (the value in the stubbing significance 1413) and having the oldest final update date/time (the value in the update date/time 1214), among the files extracted in S2301 shown in FIG. 23, as the replication target file. Note that, by extracting the files in descending order of file significance as the replication target file as described above, the data of the high-significance file can be securely managed in the lower storage system.

Figures 34, 35:
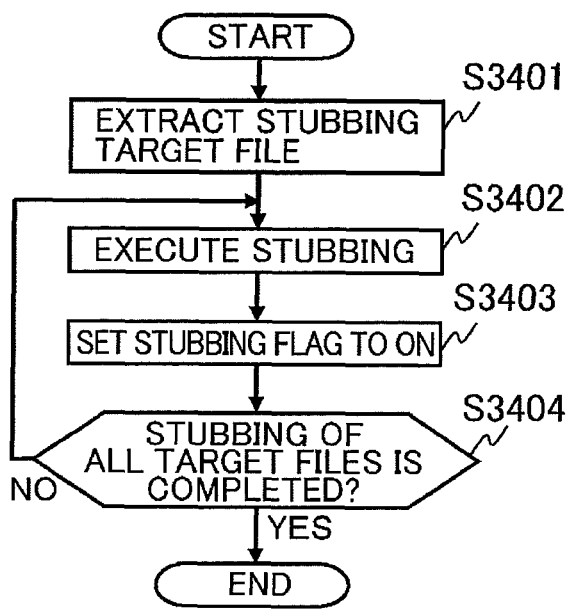
FIG. 34 is a flowchart showing a stubbing process S3400.
FIG. 35 is a diagram showing an example of a migration destination weight setting table 327.

FIG. 34 shows an example of a process performed in the first storage system 50a for stubbing of files in the above case (hereinafter referred to as a stubbing process S3400).

As shown in FIG. 34, the first storage system 50a first extracts a stubbing target file based on the stubbing priority (S3401).

Next, the first storage system 50a executes stubbing of the extracted stubbing target file (S3402), and sets the stubbing flag 1311 of the stubbing target file to "ON" (S3403).

Next, the first storage system 50a determines whether or not all the stubbing target files extracted in S3401 are processed (S3404). If there is any unprocessed stubbing target file (S3404: NO), the processing returns to S3402 to perform stubbing of the unprocessed stubbing target file. On the other hand, if there is no unprocessed stubbing target file (S3404: YES), the stubbing process S3400 is terminated.

=Stubbing Priority Setting According to Migration Destination=

When there is more than one second storage system 50b (primary system) as migration destination for one first storage system 50a, stubbing priority of the file in the first storage system 50a may be set according to the characteristics of the migration destination.

For example, when the number of the second storage systems 50b as the migration destinations of the file is large (i.e., if the redundancy is high), the data is less likely to be lost by stubbing compared with the other files. Thus, the file is set to have higher stubbing priority than the other files. Moreover, for example, when the processing performance of the migration destination (the second storage system 50b) of the file is higher than that of the migration destination of the other file, recall can be quickly performed even if the file is stubbed. Thus, the file is set to have higher stubbing priority than the other files.

On the contrary, for example, when the performance or reliability of the migration destination of the file is lower than that of the migration destination of the other file, the file is set to have lower stubbing priority than the other files.

Note that when the stubbing priority is set according to the migration destination as described above, a weight coefficient is set for each migration destination according to the characteristics (performance, reliability, management cost and the like) of the migration destination of the file, and a total value of the weight coefficients of the migration destination (the second storage system 50b) is set as the stubbing priority of the file.

FIG. 35 shows an example of weight coefficient setting according to the characteristics of the migration destination (migration destination weight setting table 327). In migration destination 3271 in FIG. 35, the identifier of the second storage system 50b is set. In weight coefficient 3272, a weight coefficient set for the migration destination (the second storage system 50b) is set. In remarks 3273, information concerning the characteristics of the migration destination is set. Note that the contents in the migration destination weight setting table 327 are set, for example, by the user or operator operating the client apparatus 2 or the management apparatus 19.

The information processing system 1 extracts a stubbing target file in S2501 of the stubbing process S2500 or in S2601 of the stubbing process S2600 described above, based on the stubbing priority set as described above.

By setting the stubbing priority according to the migration destination, the information processing system 1 as a whole can manage the files securely and efficiently (by effectively using storage resources) while taking into consideration the file redundancy in the entire information processing system 1 or the management conditions of individual files (characteristics of the migration destination).

=Cooperation Between Plurality of Upper Storage Systems=

There is a demand for, for example, wanting data in the first storage system 50a (hereinafter referred to as a main storage system) to be referred to (read) in another first storage system 50a (hereinafter referred to as a sub storage system (another first storage system 50a)). In this case, as shown in FIG. 36, for example, a configuration having a plurality of other first storage systems 50a for one second storage system 50b (lower storage system) can meet such a demand.

Figure 36:
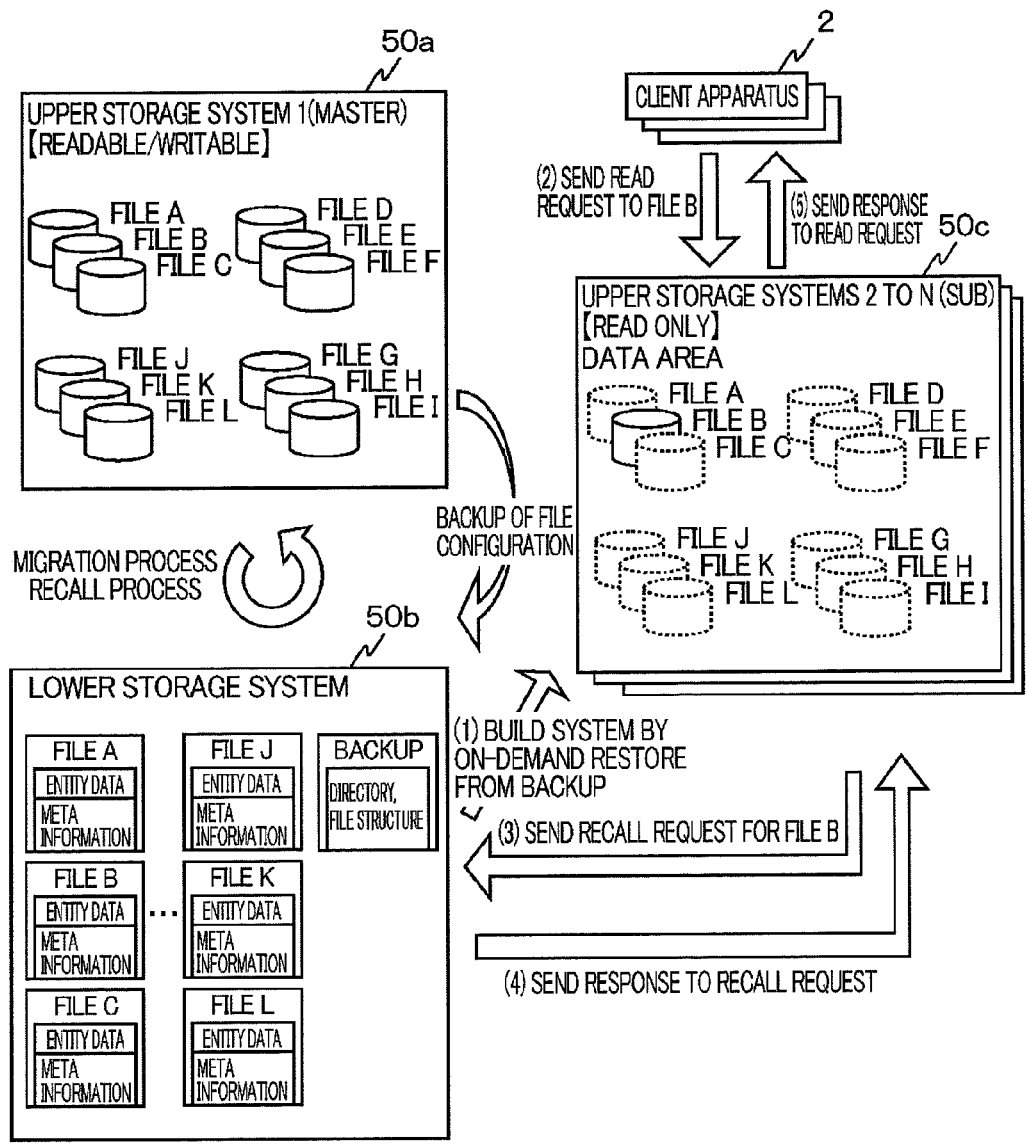
FIG. 36 is a diagram showing one aspect of the configuration of the information processing system 1.

To realize such a configuration, first, backup data of a file (file data) migrated from the main storage system is generated in the second storage system 50b, and the same directory image as that of the first storage system 50a is formed in the sub storage system using the backup data (reference numeral (1) in FIG. 36).

Upon receipt of a file read request from the client apparatus 2 (reference numeral (2)), the sub storage system transmits a recall request for the file as the target of the read request to the second storage system 50b (reference numeral (3)). Then, upon receipt of the entity data of the file from the second storage system 50b, the sub storage system stores the received entity data in its own storage device 17, and uses the entity data to return a response to the read request to the client apparatus 2 (reference numerals (4) and (5)).

Figure 37:
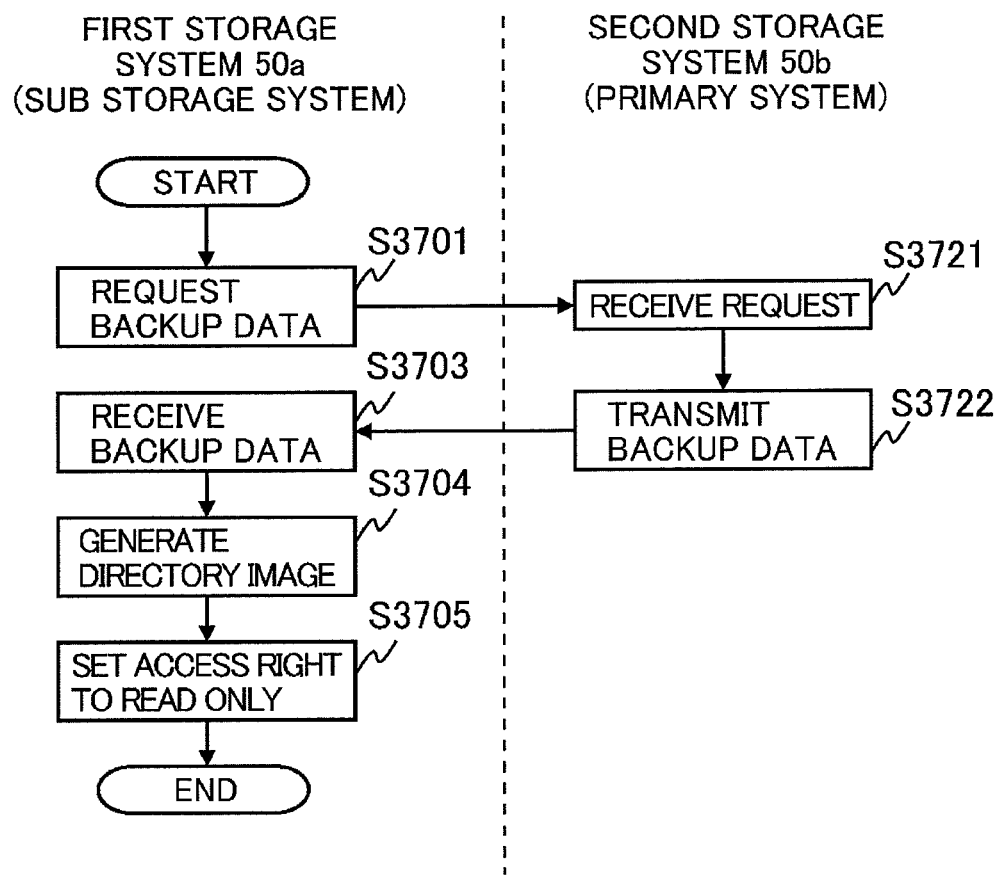
FIG. 37 is a flowchart showing an initial image formation process S3700.

FIG. 37 is a flowchart showing details of the process denoted by reference numeral (1) in FIG. 36 (hereinafter referred to as an initial image formation process S3700).

As shown in FIG. 37, the sub storage system first requests backup data used to form a directory image from the second storage system 50b (S3721).

Upon receipt of the request, the second storage system 50b transmits the backup data to another first storage system 50a (S3722).

Upon receipt of the backup data (S3703), the sub storage system generates a directory image in its own storage device 17 based on the received backup data (S3704). The sub storage system also sets the right of access to the generated directory image from the client apparatus 2 (the value in the access right 1213) to be read-only (S3705).

Figure 38:
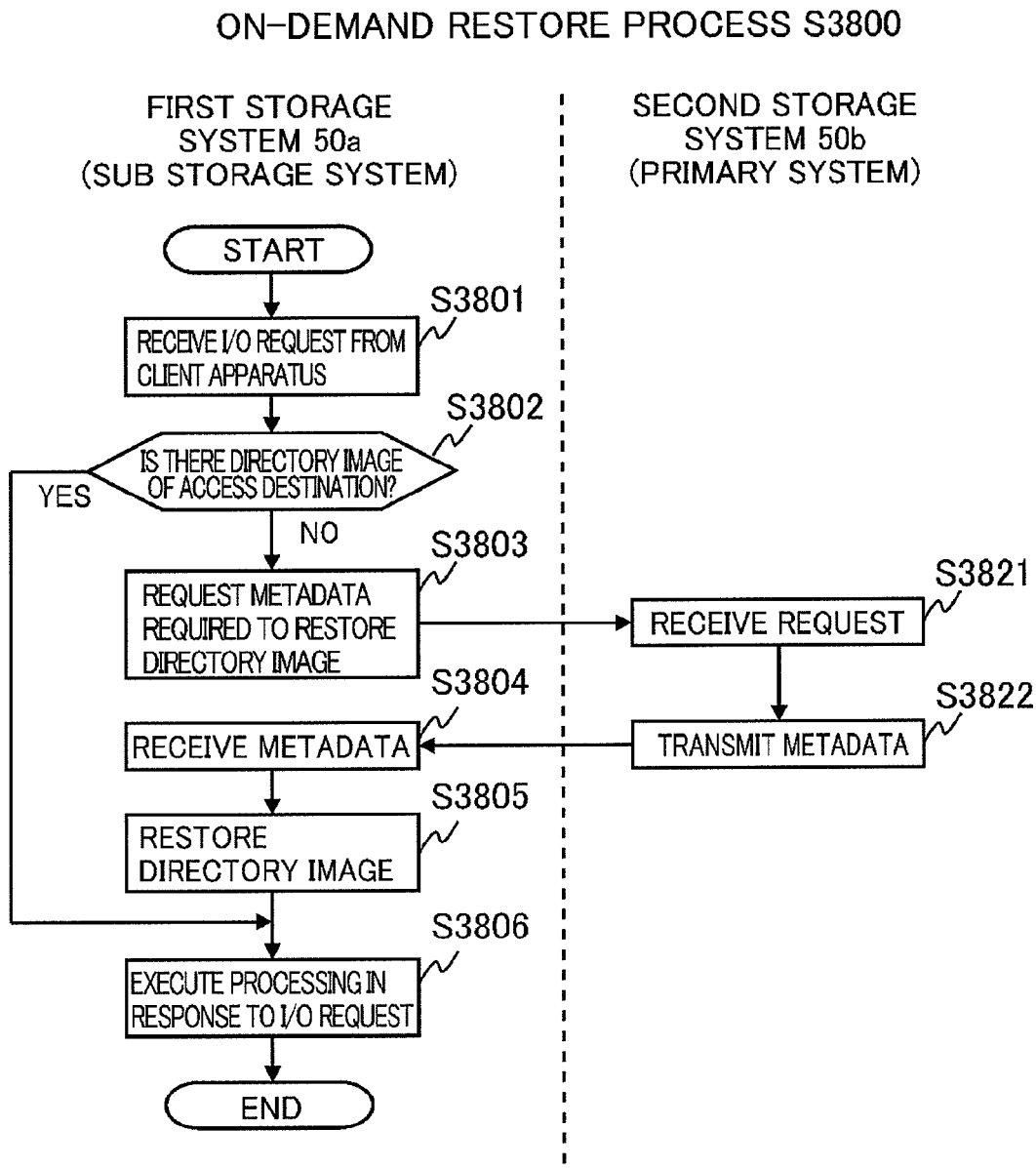
FIG. 38 is a diagram showing a stubbed file entity reference process S3800.

FIG. 38 is a flowchart showing details of the processes denoted by Reference numerals (2) to (5) in FIG. 36 (hereinafter referred to as an on-demand restore process S3800). The on-demand restore process S3800 is described below with reference to FIG. 38.

Upon receipt of an I/O request (read request) from the client apparatus 2 (S3801), the sub storage system determines whether or not a directory image as a target of the received I/O request is present in its own storage device 17 (S3802). If the directory image is present in its own storage device 17 (S3802: YES), the processing proceeds to S3806. On the other hand, if the directory image is not present in its own storage device 17 (S3802: NO), the processing proceeds to S3803.

In S3803, the sub storage system requests for metadata required to restore the directory image as the target of the received I/O request in its own storage device 17, to the second storage system 50*b*.

Upon receipt of the request (S3821), the second storage system 50*b* reads the metadata specified by the request from its own storage device and transmits it to the sub storage system (S3822).

Upon receipt of the metadata from the second storage system 50*b* (S3804), the sub storage system uses the received metadata to restore the directory image in its own storage device 17 (S3805).

In S3806, the sub storage system executes a process (e.g., the read process S1900 described above) in response to the received I/O request (read request). Accordingly, a recall request is transmitted as needed from the sub storage system to the second storage system 50*b*. Thus, the entity data is restored on-demand in the sub storage system.

<Stubbing Priority Setting Considering Cooperation Between Upper Storage Systems>

Meanwhile, when the configuration is realized in which the data in the main storage system can be referred to (read) in the sub storage system as described above, the entity data of the file in the main storage system is stored in the storage device 17 of one or more sub storage systems. This may cause a situation where the entity data is redundantly managed in a plurality of storage systems. Therefore, it is conceivable to set the stubbing priority of the file in the main storage system according to the redundancy of the entity data.

To be more specific, information indicating in which one of the storage systems the entity data of the file is currently stored (the value in the retaining system 1416) is managed in the metadata of the file in the main storage system, for example, and the stubbing priority of the file is set according to the redundancy of the entity data (the value in the number of data retained in system 1415) obtained from the information.

FIG. 39 shows an example of the metadata of the file managed in the main storage system. Note that FIG. 39 shows only information required for explanation.

FIGS. 40 to 43 are flowcharts showing processes performed in the information processing system 1 when the stubbing priority is set in the above manner. The processes are described below with reference to FIGS. 40 to 43.

Figure 40:
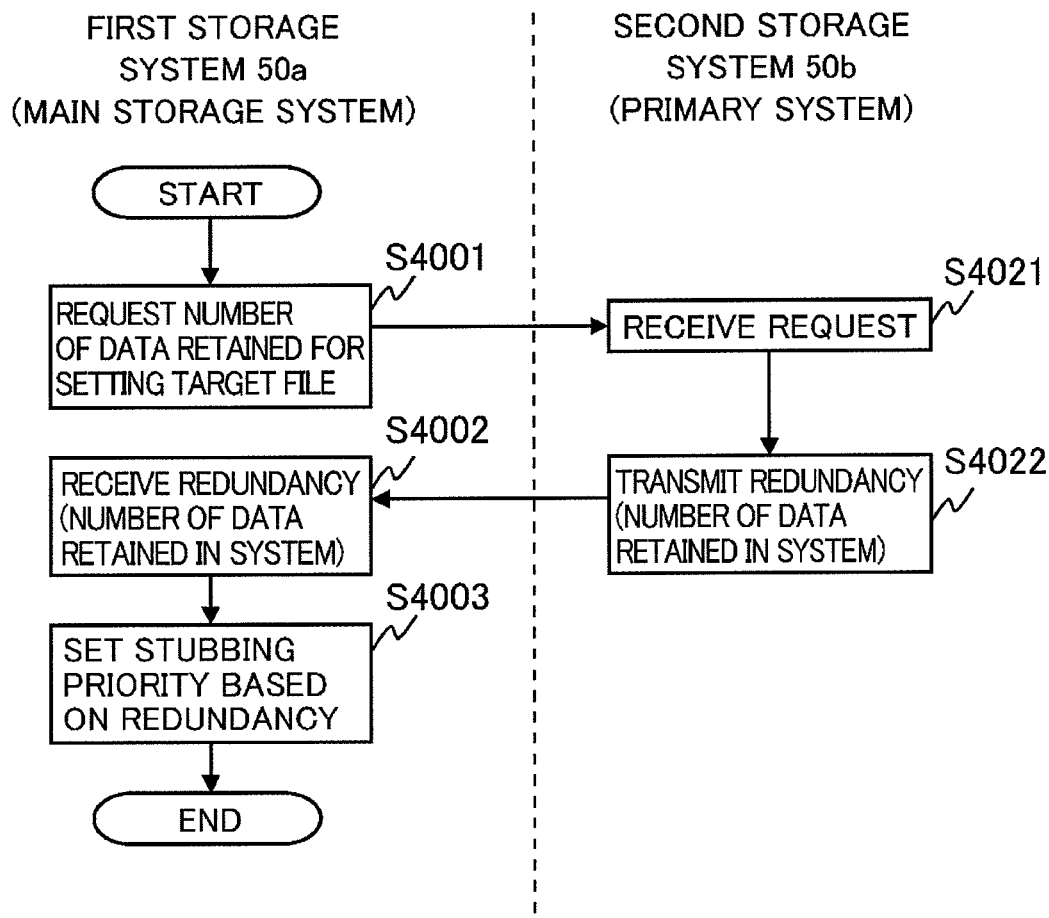
FIG. 40 is a flowchart showing a stubbing priority setting process S4000.

FIG. 40 is a flowchart showing a process of the main storage system setting the stubbing priority of the file stored in its own storage device 17 according to the redundancy of the entity data between the upper storage systems (hereinafter referred to as a stubbing priority setting process S4000).

First, the main storage system requests for redundancy (the value in the number of data retained in system 1415) of a file whose stubbing priority is to be determined (hereinafter referred to as a setting target file) to the second storage system 50*b* (S4001). Upon receipt of the request (S4021), the second storage system 50*b* reads the value of the number of data retained in system 1415 of the metadata of the setting target file, and transmits the read value to the main storage system (S4022).

Upon receipt of the value from the second storage system 50*b* (S4002), the main storage system generates a stubbing priority of the setting target file based on the received value (e.g., the value is set to be the stubbing priority), and sets the generated value as the stubbing priority 1317 of the setting target file (S4003).

Figure 41:
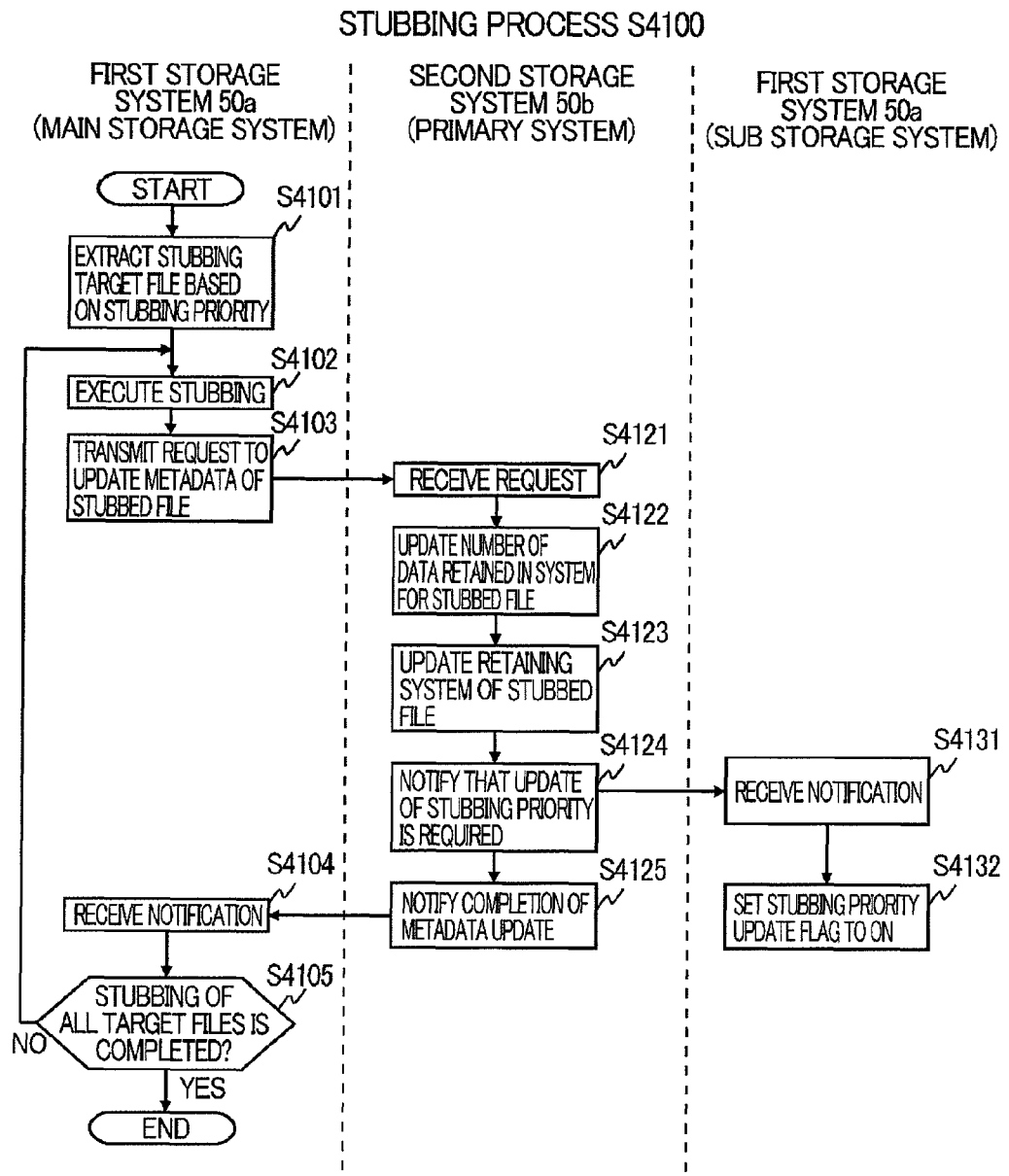
FIG. 41 is a flowchart showing a stubbing process S4100.

FIG. 41 is a flowchart showing a process performed in the information processing system 1 for the main storage system to perform stubbing of the file stored in its own storage device 17 (hereinafter referred to as a stubbing process S4100).

First, the main storage system extracts a file to be stubbed (hereinafter referred to as the stubbing target file) based on the value of each stubbing priority 1317 of the file stored in its own storage device 17 (S4101). Note that the extraction is performed in the same manner as that of the stubbing target file extraction process S3100 shown in FIG. 31, for example.

Next, the main storage system executes stubbing of the extracted stubbing target file (S4102).

After the stubbing, the main storage system transmits an update request for the metadata of the stubbed file (request to update the values in the number of data retained in system 1415 and the retaining system 1416) to the second storage system 50*b* (S4103). Note that the reason why the metadata update request is sent to the second storage system 50*b* is because the entity data is no longer retained in the main storage system after the stubbing, and thus the redundancy of the entity data is lowered.

Upon receipt of the update request (S4121), the second storage system 50*b* updates the values of the number of data retained in system 1415 and the holding system 1416 in the metadata of the stubbed file (S4122, S4123). Thereafter, the second storage system 50*b* transmits, to the sub storage system, a notification to the effect that the stubbing priority needs to be updated (S4124).

Upon receipt of the notification (S4131), the sub storage system set the value of the stubbing priority update flag 328 to "ON" (S4132). Note that when the stubbing priority update flag 328 is set as described later, the sub storage system acquires the stubbing priority of the file stored in its own storage device 17 at predetermined timing (e.g., at predetermined intervals) from the second storage system 50*b* to update the value in the stubbing priority 1414 of the file stored in its own storage device 17. Here, information specifying the timing may be notified to the sub storage system by the main storage system. Moreover, the information specifying the timing may be set by the sub storage system receiving an operation input from the client apparatus 2 or the management apparatus 19.

After transmitting the notification to the effect that the stubbing priority needs to be updated to the sub storage system, the second storage system 50*b* notifies the main storage system that the updating of the metadata is completed (S4125).

Upon receipt of the notification (S4104), the main storage system determines whether or not the processing is completed for all the stubbing target files extracted in S4101 (S4105). If the processing is not completed for all the stubbing target files (S4105: NO), the processing returns to S4102 to repeat the same processing for unprocessed stubbing target files. On the other hand, if the processing is completed for all the stubbing target files (S4105: YES), the stubbing process S4100 is terminated.

Figure 42:
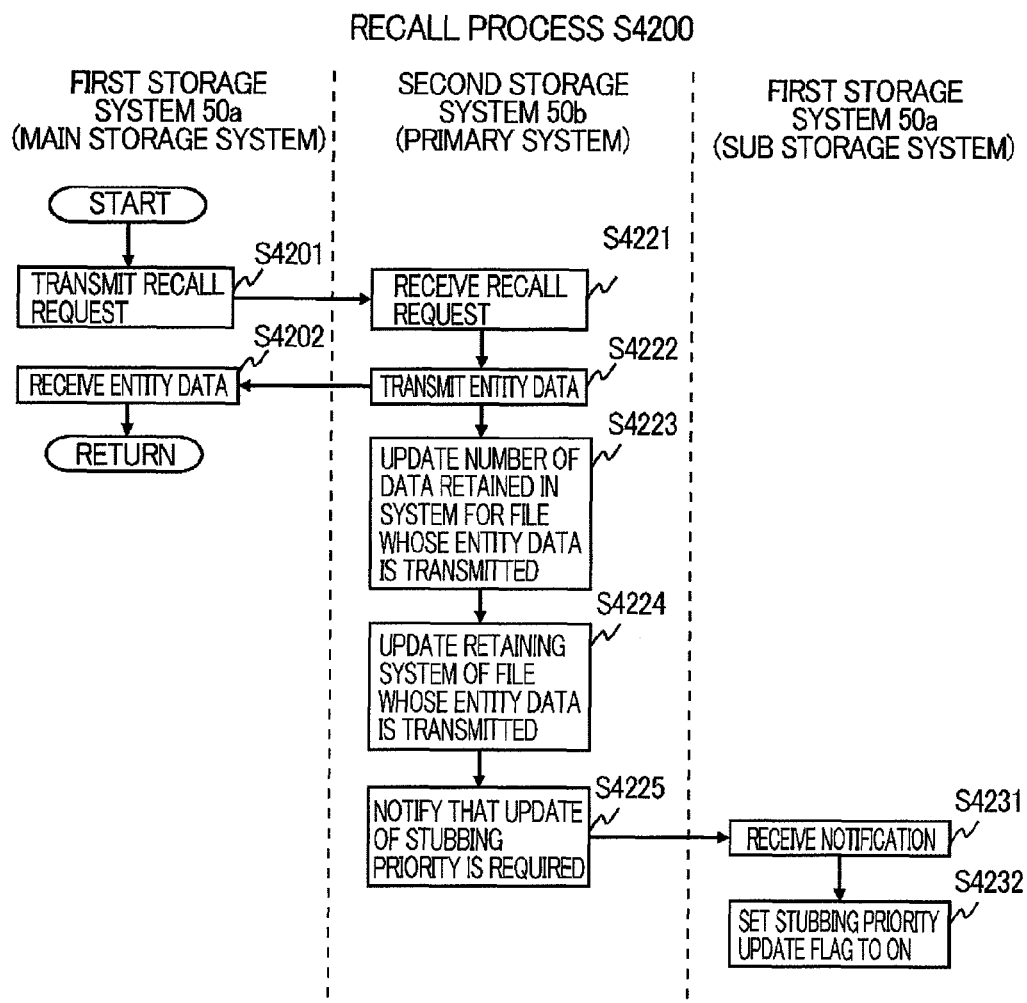
FIG. 42 is a flowchart showing a recall process S4200.

FIG. 42 is a flowchart showing a process performed in the information processing system 1 when a main storage system transmits a recall request to the second storage system 50*b* upon receipt of a write request or a read request from the client apparatus 2 (S1905 shown in FIG. 19, S2005 shown in FIG. 20) (hereinafter referred to as a recall process S4200).

Upon receipt of a recall request from the main storage system (S4201, S4221), the second storage system 50*b* reads entity data specified by the received recall request from its own storage device 17 and transmits the entity data to the main storage system (S4222). Upon receipt of the entity data from the second storage system 50b (S4202), the main storage system then executes the process in response to the I/O request (process S1907 and those thereafter in FIG. 19, process S2007 and those thereafter in FIG. 20).

Meanwhile, after transmitting the entity data to the main storage system, the second storage system 50b updates the values in the number of data retained in system 1415 and the retaining system 1416 of the file corresponding to the entity data (S4223, S4224). Thereafter, the second storage system 50b notifies the sub storage system that the stubbing priority needs to be updated (S4225). Note that the reason why the values in the number of data retained in system 1415 and the retaining system 1416 of the file corresponding to the entity data are updated is because the redundancy of the entity data in the information processing system 1 is increased when the entity data is recalled.

Upon receipt of the notification (S4231), the sub storage system sets the value of the stubbing priority update flag 328 to "ON" (S4232).

Figure 43:
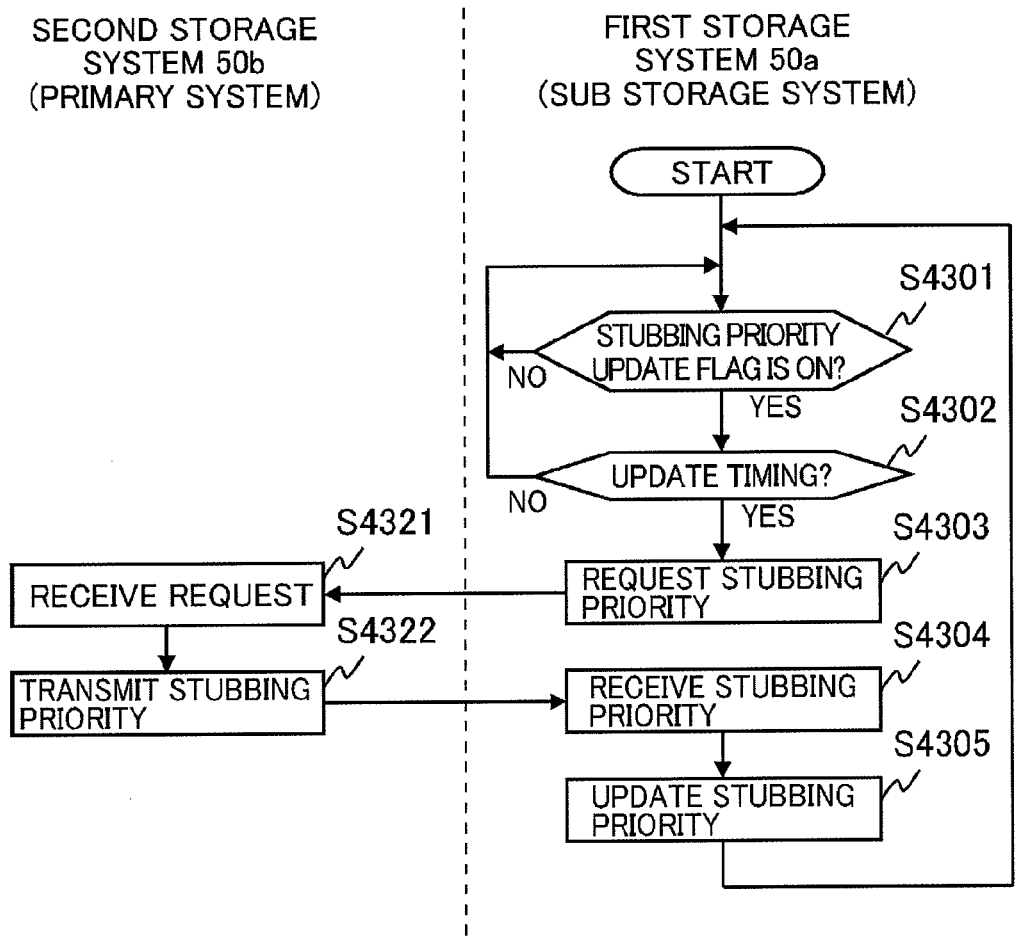
FIG. 43 is a flowchart showing a stubbing priority update process S4300.

FIG. 43 is a flowchart showing a process of the sub storage system acquiring the stubbing priority of the file stored in its own storage device 17 from the second storage system 50b and updating the value of the stubbing priority 1414 (another stubbing priority) of the file stored in its own storage device 17 (hereinafter referred to as a stubbing priority update process S4300).

The sub storage system always monitors whether or not the stubbing priority update flag is set to "ON" (S4301). When detecting that the stubbing priority update flag is set to "ON" (S4301: YES), the sub storage system determines whether or not it is time to update the stubbing priority by referring to the stubbing priority update timing 329 (S4302). Note that the stubbing priority update timing (e.g., at intervals of 30 minutes) is set, for example, by the user, operator or the like using the client apparatus 2 or the management apparatus 19.

If it is time to update the stubbing priority (S4302: YES), the sub storage system requests for the stubbing priority of the file stored in its own storage device 17 from the second storage system 50b (S4303).

Upon receipt of the request (S4321), the second storage system 50b transmits the stubbing priority of the file requested to the sub storage system (S4322).

Upon receipt of the stubbing priority from the second storage system 50b (S4304), the sub storage system updates the stubbing priority 1317 of the file stored in its own storage device 17 to the received stubbing priority (S4305). Thereafter, the processing returns to S4301.

As described above, the information processing system 1 is configured to have multiple sub storage systems for one second storage system 50b (lower storage system), so that the data in the main storage system can be referred to (read) in the sub storage systems. In this case, the stubbing priority can be set based on the redundancy of the entity data of the file in the information processing system 1 as a whole. Accordingly, uniform redundancy can be maintained for the file managed in the information processing system 1 without causing a significant difference in redundancy between the frequently-accessed file and the infrequently-accessed file, for example. Thus, the reliability and serviceability of the file data can be secured while effectively utilizing the storage resources of the information processing system 1.

While the embodiments of the present invention have been described above, the embodiments are intended to facilitate the understanding of the present invention and not to limit the scope thereof. The present invention may be changed and modified without departing from the spirit of the invention, and also includes equivalents thereof.

The invention claimed is:
1. An information processing system comprising:
a first storage system that performs processing for a file stored in a first storage apparatus in response to an I/O request received from a client apparatus;
a second storage system communicatively coupled to the first storage system and performs processing for a file stored in a second storage apparatus; and
a third storage system communicatively coupled to the second storage system and performs processing for a file stored in a third storage apparatus,
wherein the first storage system performs
stubbing by storing metadata of data in a file, stored in the first storage apparatus, into the first storage apparatus and storing entity data of the data in the file into the second storage apparatus, and deleting the entity data from the first storage apparatus to manage the file,
migration by replicating the data of the file stored in the first storage apparatus into the second storage apparatus to perform the stubbing, and
recall by writing the entity data from the second storage apparatus back to the first storage apparatus when receiving the I/O request requiring the entity data from the client apparatus, and
the second storage system performs
remote copy by replicating the metadata in the file replicated from the first storage apparatus by the migration to the third storage apparatus at timing of the migration, and
replicating the entity data in the file replicated from the first storage apparatus by the migration to the third storage apparatus at a timing independent of the timing of the migration,
wherein the first storage system performs the stubbing of a file corresponding to the entity data when replication of the entity data to the third storage apparatus by the remote copy is completed,
the first storage system notifies the second storage system of information specifying a file to be subjected to the stubbing,
the second storage system replicates entity data of the file from the second storage apparatus to the third storage apparatus upon receipt of the notification, and notifies the first storage system of completion of the replication,
the first storage system performs the stubbing of a file corresponding to the entity data upon receipt of the notification,
the third storage system manages difference information that is information indicating whether or not metadata and entity data in a file stored in the third storage apparatus are consistent, and
the first storage system acquires the difference information from the third storage system, and determines based on the acquired difference information whether or not the replication of the entity data to the third storage apparatus by the remote copy is completed,
when a failure occurs in the second storage system,
the third storage system requests the first storage system for the entity data of a file of which the replication of the entity data to the third storage apparatus in the remote copy is not completed, specified based on the difference information,
the first storage system transmits the entity data to the third storage system in response to the request, and
performs failover from the second storage system to the third storage system when the third storage system has no more file having entity data yet to be replicated to the third storage apparatus by the remote copy, the first storage system
sets a stubbing priority for each file stored in the first storage apparatus, the stubbing priority being information indicating a priority order considered in stubbing,
performs the stubbing of the files according to the stubbing priority,
sets the stubbing priority so that the files are stubbed in descending order of file size, sets the stubbing priority so that the files are stubbed in ascending order of access frequency from the client apparatus, sets the stubbing priority so that the files are stubbed in ascending order of file significance, or sets the stubbing priority so that the files are stubbed in descending order of file significance,
performs stubbing of a plurality of files in chronological order of final update date/time of the files when there are a plurality of files having the same stubbing priority in the files stored in the first storage apparatus,
increases the stubbing priority to a file having a file size exceeding a predetermined threshold when the stubbing priority is set so that the files are stubbed in descending order of file size, resets the threshold to be lower within a predetermined range when a remaining capacity exceeding a predetermined remaining capacity cannot be reserved in the first storage apparatus even though the stubbing is executed, when the stubbing priority is set so that the stubbing is performed in descending order of file size, when, a plurality of the second storage systems, to be data replication destinations of the file stored in the first storage apparatus in the migration, exists for the first storage system as a single unit, the first storage system
manages a weight coefficient set for each of the second storage systems, and
sets the stubbing priority of the files according to the weight coefficients of the second storage systems that perform processing in response to the I/O request for a file stored in the second storage apparatus serving as data replication destination of the file stored in the first storage apparatus in the migration, the information processing system includes one or more other first storage systems different from the first storage system, that provides a client apparatus with a file stored in the first storage apparatus, the first storage system sets a stubbing priority for each file stored in the first storage apparatus, the stubbing priority being information indicating a priority order considered in stubbing, and performs the stubbing of the files according to the stubbing priority, and the other first storage system restores the entity data of the file in the first storage apparatus, replicated to the second storage apparatus by the migration, to another first storage apparatus that is the first storage apparatus of its own by performing the recall in a processing of the I/O request received from the client apparatus by the other first storage system, the second storage system manages redundancy of data of a file in the information processing system, the first storage system notifies the second storage system of information specifying the stubbed file in the stubbing of the file stored in the first storage apparatus, the second storage system reduces the redundancy of the data of the stubbed file specified by the information when receiving the notification, the second storage system increases the redundancy of the file when the recall is performed for the file stored in the first storage apparatus, and the first storage system acquires the redundancy of the file stored in the first storage apparatus from the second storage system, and sets the stubbing priority of the file stored in the first storage apparatus based on the acquired redundancy, the first storage system and the other first storage system are communicatively coupled to each other, the other first storage system sets another stubbing priority for each file stored in the first storage apparatus, the stubbing priority being information indicating a priority order considered in stubbing, and performs the stubbing of the files according to the stubbing priority, the second storage system notifies the other first storage system that the other stubbing priority needs to be updated when the redundancy is updated, and the other first storage system acquires the stubbing priority managed by the first storage system from the first storage system upon receipt of the notification, and updates the other stubbing priority managed by itself.

2. The information processing system according to claim 1, wherein the first storage system performs the stubbing of the file corresponding to the entity data, when replication of the entity data to the third storage apparatus by the remote copy is completed.

3. The information processing system according to claim 2, wherein
the first storage system notifies the second storage system of information specifying a file to be subjected to the stubbing,
the second storage system replicates the entity data in the file from the second storage apparatus to the third storage apparatus upon receipt of the notification, and notifies the first storage system of completion of the replication, and
the first storage system performs the stubbing of the file corresponding to the entity data upon receipt of the notification.

4. The information processing system according to claim 2, wherein
the third storage system manages difference information that is information indicating whether or not metadata and entity data in a file stored in the third storage apparatus are consistent, and
the first storage system acquires the difference information from the third storage system, and determines based on the acquired difference information whether or not the replication of the entity data to the third storage apparatus by the remote copy is completed.

5. The information processing system according to claim 1, wherein
the third storage system manages difference information that is information indicating whether or not metadata and entity data in a file stored in the third storage apparatus are consistent, and
when a failure occurs in the second storage system,
the third storage system requests the first storage system for entity data of a file of which the replication of the entity data to the third storage apparatus in the remote copy is not completed, specified based on the difference information, the first storage system transmits the entity data to the third storage system in response to the request, and the first storage system performs failover from the second storage system to the third storage system when the third storage system has no more file having entity data yet to be replicated to the third storage apparatus by the remote copy.

6. The information processing system according to claim 1, wherein the first storage system sets a stubbing priority for each file stored in the first storage apparatus, the stubbing priority being information indicating a priority order considered in stubbing, performs the stubbing of the files according to the stubbing priority, and sets the stubbing priority so that the files are stubbed in descending order of file size.

7. The information processing system according to claim 6, wherein the first storage system performs stubbing of a plurality of files in chronological order of final update date/time of the files when there are a plurality of files having the same stubbing priority in the files stored in the first storage apparatus.

8. The information processing system according to claim 6, wherein the first storage system increases the stubbing priority of a file having a file size exceeding a predetermined threshold, and resets the threshold to be lower within a predetermined range when a remaining capacity exceeding a predetermined remaining capacity cannot be reserved in the first storage apparatus even though the stubbing is executed.

9. The information processing system according to claim 1, wherein the first storage system sets a stubbing priority for each file stored in the first storage apparatus, the stubbing priority being information indicating a priority order considered in stubbing, performs the stubbing of the files according to the stubbing priority, and sets the stubbing priority so that the files are stubbed in ascending order of access frequency from the client apparatus.

10. The information processing system according to claim 1, wherein the first storage system sets a stubbing priority for each file stored in the first storage apparatus, the stubbing priority being information indicating a priority order considered in stubbing, performs the stubbing of the files according to the stubbing priority, and sets the stubbing priority so that the files are stubbed in ascending order of file significance.

11. The information processing system according to claim 1, wherein the first storage system sets a stubbing priority for each file stored in the first storage apparatus, the stubbing priority being information indicating a priority order considered in stubbing, performs the stubbing of the files according to the stubbing priority, and sets the stubbing priority so that the files are stubbed in descending order of file significance.

12. The information processing system according to claim 1, wherein a plurality of the second storage systems, to be data replication destinations of the file stored in the first storage apparatus in the migration, exists for the first storage system as a single unit, and the first storage system sets a stubbing priority for each file stored in the first storage apparatus, the stubbing priority being information indicating the priority order considered in stubbing, performs the stubbing of the files according to the stubbing priority, manages a weight coefficient set for each of the second storage systems, and sets the stubbing priority of the files according to the weight coefficients of the second storage systems that perform processing in response to the I/O request for a file stored in the second storage apparatus serving as data replication destination of the file stored in the first storage apparatus in the migration.

13. The information processing system according to claim 1, wherein the information processing system includes one or more other first storage systems different from the first storage system, that provides a client apparatus with a file stored in the first storage apparatus, the first storage system sets a stubbing priority for each file stored in the first storage apparatus, the stubbing priority being information indicating a priority order considered in stubbing, and performs the stubbing of the files according to the stubbing priority, and the other first storage system restores the entity data of the file in the first storage apparatus, replicated to the second storage apparatus by the migration, to another first storage apparatus that is the first storage apparatus of its own by performing the recall in a processing of the I/O request received from the client apparatus by the other first storage system, the second storage system manages redundancy of data of a file in the information processing system, the first storage system notifies the second storage system of information specifying the stubbed file in the stubbing of the file stored in the first storage apparatus, the second storage system reduces the redundancy of the data of the stubbed file specified by the information when receiving the notification, the second storage system increases the redundancy of the file when the recall is performed for the file stored in the first storage apparatus, and the first storage system acquires the redundancy of the file stored in the first storage apparatus from the second storage system, and sets the stubbing priority of the file stored in the first storage apparatus based on the acquired redundancy.

14. The information processing system according to claim 13, wherein the first storage system and the other first storage system are communicatively coupled to each other, the other first storage system sets another stubbing priority for each file stored in the first storage apparatus, the other stubbing priority being information indicating a priority order considered in stubbing, and performs the stubbing of the files according to the stubbing priority, the second storage system notifies the other first storage system that the other stubbing priority needs to be updated when the redundancy is updated, and the other first storage system acquires the stubbing priority managed by the first storage system from the first storage system upon receipt of the notification, and updates the other stubbing priority managed by itself.

15. A method of controlling an information processing system including a first storage system that performs processing for a file stored in a first storage apparatus in response to an I/O request received from a client apparatus, a second storage system communicatively coupled to the first storage system and performs processing for a file stored in a second storage apparatus, and a third storage system communicatively coupled to the second storage system and performs processing for a file stored in a third storage apparatus, the method comprising the steps of:

the first storage system performing stubbing by storing metadata of data in a file, stored in the first storage apparatus, into the first storage apparatus and storing entity data of the data in the file into the second storage apparatus, and deleting the entity data from the first storage apparatus to manage the file;

migration by replicating the data of the file stored in the first storage apparatus into the second storage apparatus to perform the stubbing; and recall by writing the entity data from the second storage apparatus back to the first storage apparatus when receiving the I/O request requiring the entity data from the client apparatus, and the second storage system performs remote copy by replicating the metadata in the file replicated from the first storage apparatus by the migration to the third storage apparatus at timing of the migration, and replicating the entity data in the file replicated from the first storage apparatus by the migration to the third storage apparatus at a timing independent of the timing of the migration, wherein the first storage system performs the stubbing of a file corresponding to the entity data when replication of the entity data to the third storage apparatus by the remote copy is completed, the first storage system notifies the second storage system of information specifying a file to be subjected to the stubbing, the second storage system replicates entity data of the file from the second storage apparatus to the third storage apparatus upon receipt of the notification, and notifies the first storage system of completion of the replication, the first storage system performs the stubbing of a file corresponding to the entity data upon receipt of the notification, the third storage system manages difference information that is information indicating whether or not metadata and entity data in a file stored in the third storage apparatus are consistent, and the first storage system acquires the difference information from the third storage system, and determines based on the acquired difference information whether or not the replication of the entity data to the third storage apparatus by the remote copy is completed, when a failure occurs in the second storage system, the third storage system requests the first storage system for the entity data of a file of which the replication of the entity data to the third storage apparatus in the remote copy is not completed, specified based on the difference information, the first storage system transmits the entity data to the third storage system in response to the request, and performs failover from the second storage system to the third storage system when the third storage system has no more file having entity data yet to be replicated to the third storage apparatus by the remote copy, the first storage system sets a stubbing priority for each file stored in the first storage apparatus, the stubbing priority being information indicating a priority order considered in stubbing, performs the stubbing of the files according to the stubbing priority, sets the stubbing priority so that the files are stubbed in descending order of file size, sets the stubbing priority so that the files are stubbed in ascending order of access frequency from the client apparatus, sets the stubbing priority so that the files are stubbed in ascending order of file significance, or sets the stubbing priority so that the files are stubbed in descending order of file significance, performs stubbing of a plurality of files in chronological order of final update date/time of the files when there are a plurality of files having the same stubbing priority in the files stored in the first storage apparatus, increases the stubbing priority to a file having a file size exceeding a predetermined threshold when the stubbing priority is set so that the files are stubbed in descending order of file size, resets the threshold to be lower within a predetermined range when a remaining capacity exceeding a predetermined remaining capacity cannot be reserved in the first storage apparatus even though the stubbing is executed, when the stubbing priority is set so that the stubbing is performed in descending order of file size, when, a plurality of the second storage systems, to be data replication destinations of the file stored in the first storage apparatus in the migration, exists for the first storage system as a single unit, the first storage system manages a weight coefficient set for each of the second storage systems, and sets the stubbing priority of the files according to the weight coefficients of the second storage systems that perform processing in response to the I/O request for a file stored in the second storage apparatus serving as data replication destination of the file stored in the first storage apparatus in the migration, the information processing system includes one or more other first storage systems different from the first storage system, that provides a client apparatus with a file stored in the first storage apparatus, the first storage system sets a stubbing priority for each file stored in the first storage apparatus, the stubbing priority being information indicating a priority order considered in stubbing, and performs the stubbing of the files according to the stubbing priority, and the other first storage system restores the entity data of the file in the first storage apparatus, replicated to the second storage apparatus by the migration, to another first storage apparatus that is the first storage apparatus of its own by performing the recall in a processing of the I/O request received from the client apparatus by the other first storage system, the second storage system manages redundancy of data of a file in the information processing system, the first storage system notifies the second storage system of information specifying the stubbed file in the stubbing of the file stored in the first storage apparatus, the second storage system reduces the redundancy of the data of the stubbed file specified by the information when receiving the notification, the second storage system increases the redundancy of the file when the recall is performed for the file stored in the first storage apparatus, and the first storage system acquires the redundancy of the file stored in the first storage apparatus from the second storage system, and sets the stubbing priority of the file stored in the first storage apparatus based on the acquired redundancy, the first storage system and the other first storage system are communicatively coupled to each other, the other first storage system sets another stubbing priority for each file stored in the first storage apparatus, the stubbing priority being information indicating a priority order considered in stubbing, and performs the stubbing of the files according to the stubbing priority, the second storage system notifies the other first storage system that the other stubbing priority needs to be updated when the redundancy is updated, and the other first storage system acquires the stubbing priority managed by the first storage system from the first storage system upon receipt of the notification, and updates the other stubbing priority managed by itself.

16. The method for controlling an information processing system, according to claim 15, wherein the first storage system performs the stubbing of the file corresponding to the entity data, when replication of the entity data to the third storage apparatus by the remote copy is completed.

17. The method for controlling an information processing system, according to claim 16, wherein the first storage system notifies the second storage system of information specifying a file to be subjected to the stubbing, the second storage system replicates the entity data in the file from the second storage apparatus to the third storage apparatus upon receipt of the notification, and notifies the first storage system of completion of the replication, and the first storage system performs the stubbing of the file corresponding to the entity data upon receipt of the notification.

18. The method for controlling an information processing system, according to claim 16, wherein the third storage system manages difference information that is information indicating whether or not the metadata and entity data in a file stored in the third storage apparatus are consistent, and the first storage system acquires the difference information from the third storage system, and determines based on the acquired difference information whether or not the replication of the entity data to the third storage apparatus by the remote copy is completed.

19. The method for controlling an information processing system, according to claim 15, wherein the third storage system manages difference information that is information indicating whether or not metadata and entity data, in a file stored in the third storage apparatus, are consistent, and when a failure occurs in the second storage system, the third storage system requests the first storage system for entity data of a file of which the replication of the entity data to the third storage apparatus in the remote copy is not completed, specified based on the difference information, the first storage system transmits the entity data to the third storage system in response to the request, and the first storage system performs failover from the second storage system to the third storage system when the third storage system has no more file having entity data yet to be replicated to the third storage apparatus by the remote copy.

\* \* \* \* \*